United States Patent
Tsurumaki et al.

(10) Patent No.: US 8,612,309 B2
(45) Date of Patent: Dec. 17, 2013

(54) PREFERENCE INFORMATION COLLECTING SYSTEM, DEVICE, METHOD, AND PROGRAM

(75) Inventors: Kimiko Tsurumaki, Kanagawa (JP); Takuji Maekawa, Kanagawa (JP); Kotaro Jinushi, Kanagawa (JP); Hirokazu Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1430 days.

(21) Appl. No.: 11/547,254

(22) PCT Filed: Apr. 8, 2005

(86) PCT No.: PCT/JP2005/007277
§ 371 (c)(1),
(2), (4) Date: Oct. 3, 2006

(87) PCT Pub. No.: WO2005/098673
PCT Pub. Date: Oct. 20, 2005

(65) Prior Publication Data
US 2007/0150452 A1    Jun. 28, 2007

(51) Int. Cl.
*G06Q 30/00*    (2012.01)
(52) U.S. Cl.
USPC ......................................... 705/26.7; 705/26.8
(58) Field of Classification Search
USPC ...................... 705/26, 27, 26.1, 27.1, 26.8
See application file for complete search history.

(56) References Cited

U.S. PATENT DOCUMENTS

| | | | | |
|---|---|---|---|---|
| 6,266,649 B1 * | 7/2001 | Linden et al. | ................. | 705/7.29 |
| 6,397,040 B1 | 5/2002 | Titmuss et al. | | |
| 6,587,835 B1 * | 7/2003 | Treyz et al. | ................. | 705/14.64 |

FOREIGN PATENT DOCUMENTS

| JP | 11-55726 | 2/1999 |
|---|---|---|
| JP | 3096344 | 8/2000 |
| JP | 2001-282834 | 10/2001 |
| JP | 2001-519951 | 10/2001 |
| JP | 2002 15199 | 1/2002 |
| JP | 2002-251555 | 9/2002 |
| JP | 2002-258874 | 9/2002 |
| JP | 2002 300614 | 10/2002 |

(Continued)

OTHER PUBLICATIONS

Personalization versus Privacy: An Empirical Examination of the Online Consumer's Dilemma (Chellappa, Ramnath; Sin, Raymond; Information Technology and Management 6, 181-202, Apr. 2005).*

(Continued)

*Primary Examiner* — Courtney Stopp
(74) *Attorney, Agent, or Firm* — Oblon, Spivak, McClelland, Maier & Neustadt, L.L.P.

(57) ABSTRACT

A preference-information gathering system is capable of gathering information on every commodity and/or every service, which are each of interest to a user, as user's preference information. The preference-information gathering system includes a user portable terminal (102) capable of storing a user identifier uniquely identifying the user, an information searching apparatus (104) and a preference-information management apparatus (114) for managing the information on preferences with the user. The information searching apparatus (104) has a search-information inputting unit (108) for requesting a user to enter search information to be used in a process to search for information desired by the user and a user-identifier acquisition unit (110) for acquiring a user identifier. The information searching apparatus (104) transmits information found in a search process requested by the user as the desired information on a commodity and/or a service and the user identifier to the preference-information management apparatus by associating the information and the identifier with each other.

9 Claims, 29 Drawing Sheets

(56) References Cited

FOREIGN PATENT DOCUMENTS

| | | |
|---|---|---|
| JP | 2002-300614 | 10/2002 |
| JP | 2002-366843 | 12/2002 |
| JP | 2003-108588 | 4/2003 |
| JP | 2003 108588 | 4/2003 |
| JP | 2003 173415 | 6/2003 |
| JP | 2003 248774 | 9/2003 |
| JP | 2003 308267 | 10/2003 |
| JP | 2003-323374 | 11/2003 |
| JP | 2004-94659 | 3/2004 |
| WO | WO 02/099710 A1 | 12/2002 |

OTHER PUBLICATIONS

U.S. Appl. No. 11/912,593, filed Oct. 25, 2007, Maekawa, et al.
U.S. Appl. No. 11/993,554, filed Dec. 21, 2007, Hattori, et al.
U.S. Appl. No. 11/993,125, filed Dec. 19, 2007, Maekawa, et al.
U.S. Appl. No. 11/917,786, filed Dec. 17, 2007, Hattori, et al.
Gift type mobile prepaid settlement, Research papers of business model, First edition, Japan, Japan Information Processing Development Foundation, Electronic commerce promotion center, Mar. 31, 2004, First edition, pp. 23-50.

* cited by examiner

FIG. 3
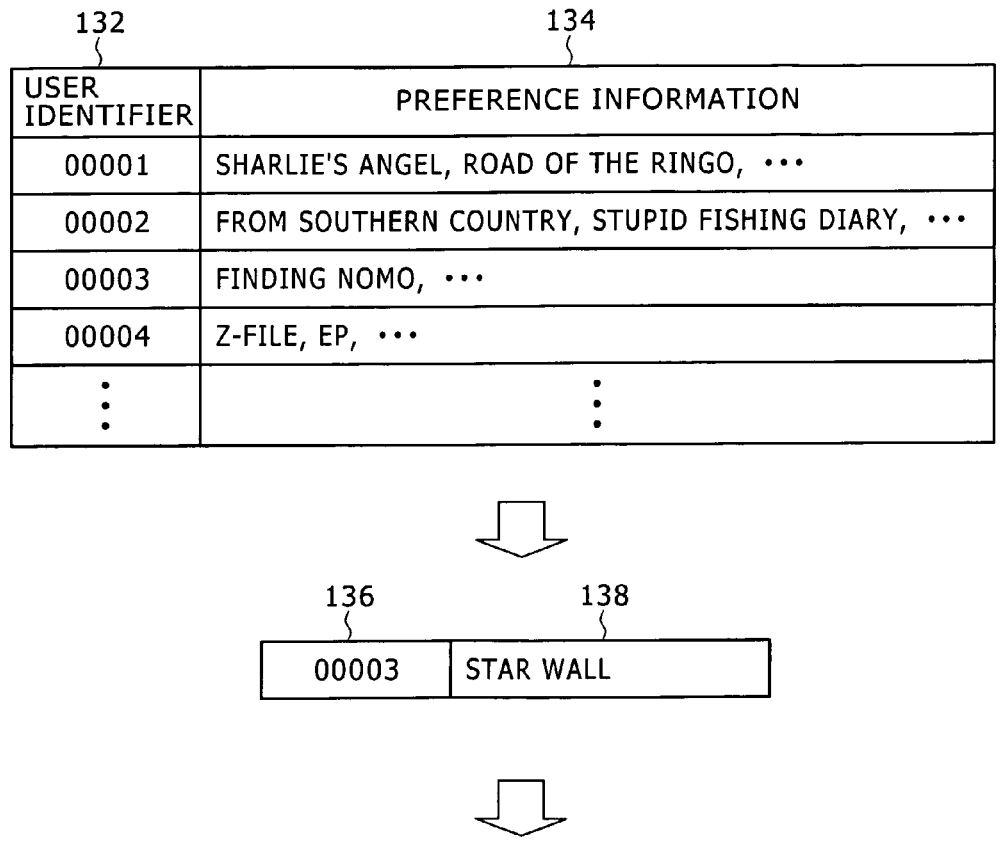

FIG. 4
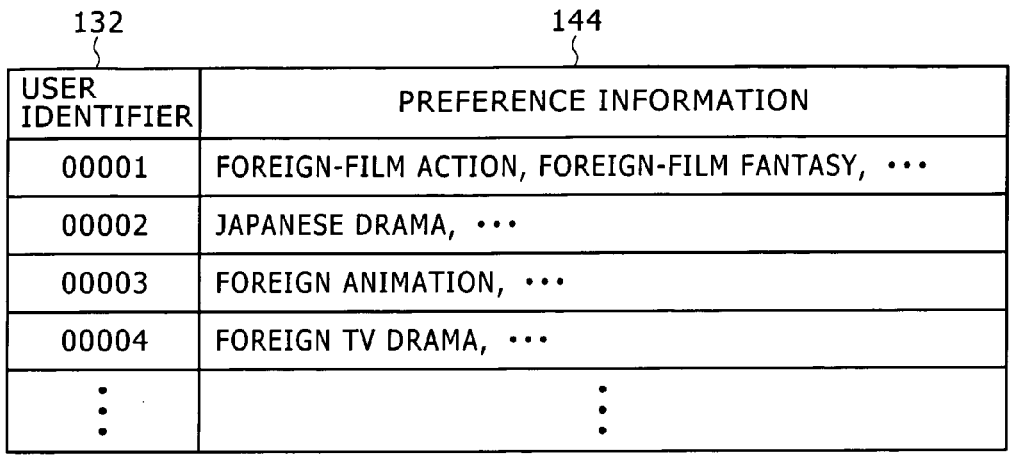
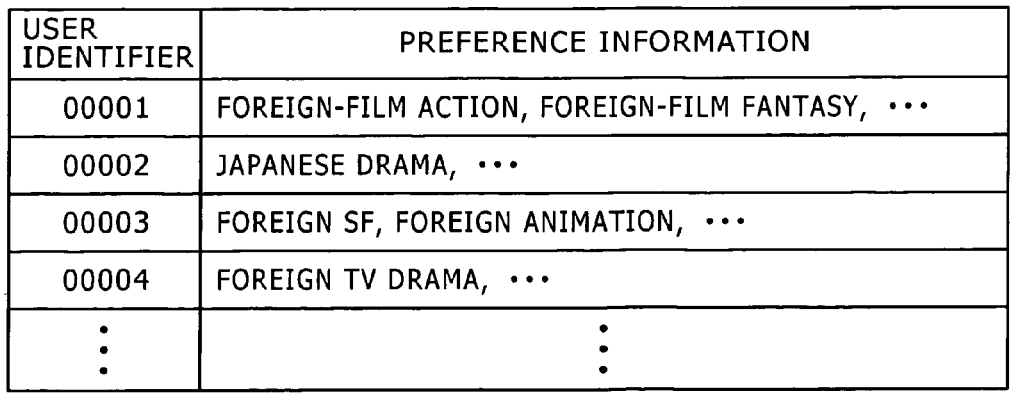

FIG. 8
230
| USER IDENTIFIER (232) | PREFERENCE INFORMATION (COMMODITY CODES) (234) |
|---|---|
| 00001 | SR10112, PB32215, SW03357, ··· |
| 00002 | CY23456, PR25843, ··· |
| 00003 | KT35112, SR22111, ··· |
| 00004 | TZ00001, SW03357, ··· |
| ⋮ | ⋮ |
| 00002 (236) | SW25533 (238) |
|---|---|
| USER IDENTIFIER | PREFERENCE INFORMATION (COMMODITY CODES) |
|---|---|
| 00001 | SR10112, PB32215, SW03357, ··· |
| 00002 | SW25533, CY23456, PR25843, ··· |
| 00003 | KT35112, SR22111, ··· |
| 00004 | TZ00001, SW03357, ··· |
| ⋮ | ⋮ |

| USER IDENTIFIER (232) | PREFERENCE INFORMATION (244) |
|---|---|
| 00001 | SWEETER (RED), PANT (BLACK), SHIRT (WHITE), ··· |
| 00002 | HAT (YELLOW), PANT (RED), ··· |
| 00003 | CAMISOLE (BROWN), SKIRT (RED), ··· |
| 00004 | BELT (SILVER), STOLE (WHITE), ··· |
| ⋮ | ⋮ |

⇩

| 236 | 238 |
|---|---|
| 00002 | SW25533 |

⇔

227

| IDENTIFIER (250) | COMMODITY CATEGORY (252) |
|---|---|
| SR10112 | SWEETER (RED) |
| CY23456 | HAT (YELLOW) |
| ⋮ | ⋮ |
| SW25533 | SWEETER (WHITE) |
| ⋮ | ⋮ |

⇩

| USER IDENTIFIER | PREFERENCE INFORMATION |
|---|---|
| 00001 | SWEETER (RED), PANT (BLACK), SHIRT (WHITE), ··· |
| 00002 | SWEETER (WHITE), HAT (YELLOW), PANT (RED), ··· |
| 00003 | CAMISOLE (BROWN), SKIRT (RED), ··· |
| 00004 | BELT (SILVER), STOLE (WHITE), ··· |
| ⋮ | ⋮ |

| USER IDENTIFIER (1150) | PREFERENCE INFORMATION (1152) |
|---|---|
| 00001 | FOREIGN-FILM ACTION, FOREIGN-FILM FANTASY, ··· |
| 00002 | JAPANESE DRAMA, JAPANESE-FILM ACTION, ··· |
| 00003 | ANIMATION, MUSIC, ··· |
| 00004 | FIGHT, FOREIGN-FILM ACTION, ··· |
| 00005 | SPORT, FITNESS, ··· |
| ⋮ | ⋮ |

| APPARATUS IDENTIFIER | CLASSIFICATION CODE | CLASSIFICATION SUBSTANCE |
|---|---|---|
| 00001 | S01 | SOUTH GATE OF SHINJUKU STATION |
| 00002 | Y01 | YOTSUYA 3 CHOME |
| 00003 | S22 | HACHIKO GATE OF SHIBUYA STATION |
| 00004 | B03 | OX BOOKS |
| 00005 | V12 | T VIDEO STORE |
| ⋮ | ⋮ | ⋮ |

| CLASSIFICATION CODE | COMMODITIES/SERVICES INFORMATION | | |
|---|---|---|---|
| S01 | INFORMATION ON NEW ARRIVALS AT I DEPARTMENT STORE | INFORMATION ON S CAMERA SERVING AS NEW COMMODITY | DISCOUNT COUPONS OF M RESTAURANT |
| Y01 | DISCOUNT COUPONS OF S COFFEE SHOP | DISCOUNT COUPONS OF M BREAD STORE | DISCOUNT COUPONS OF A CONVENIENCE STORE |
| S22 | INFORMATION ON DELAY OF T ELECTRIC RAILROAD | INFORMATION ON LIVE PROGRAMS OF A STUDIO | DISCOUNT COUPONS OF M DEPARTMENT STORE |
| B03 | INFORMATION ON NEW EDITION OF WOMAN MAGAZINE | INFORMATION ON NEW EDITION OF PICTURE COLLECTION PUBLICATION | DISCOUNT COUPONS FOR LEARNING REFERENCES |
| V12 | ANIMATION INSTALLATION PLACE | INFORMATION ON NEW FOREIGN-ACTION WORK | DISCOUNT COUPONS FOR NEW WORKS |
| ... | ... | ... | ... |

1262　　　　　　　　　　　　　　　　　1270

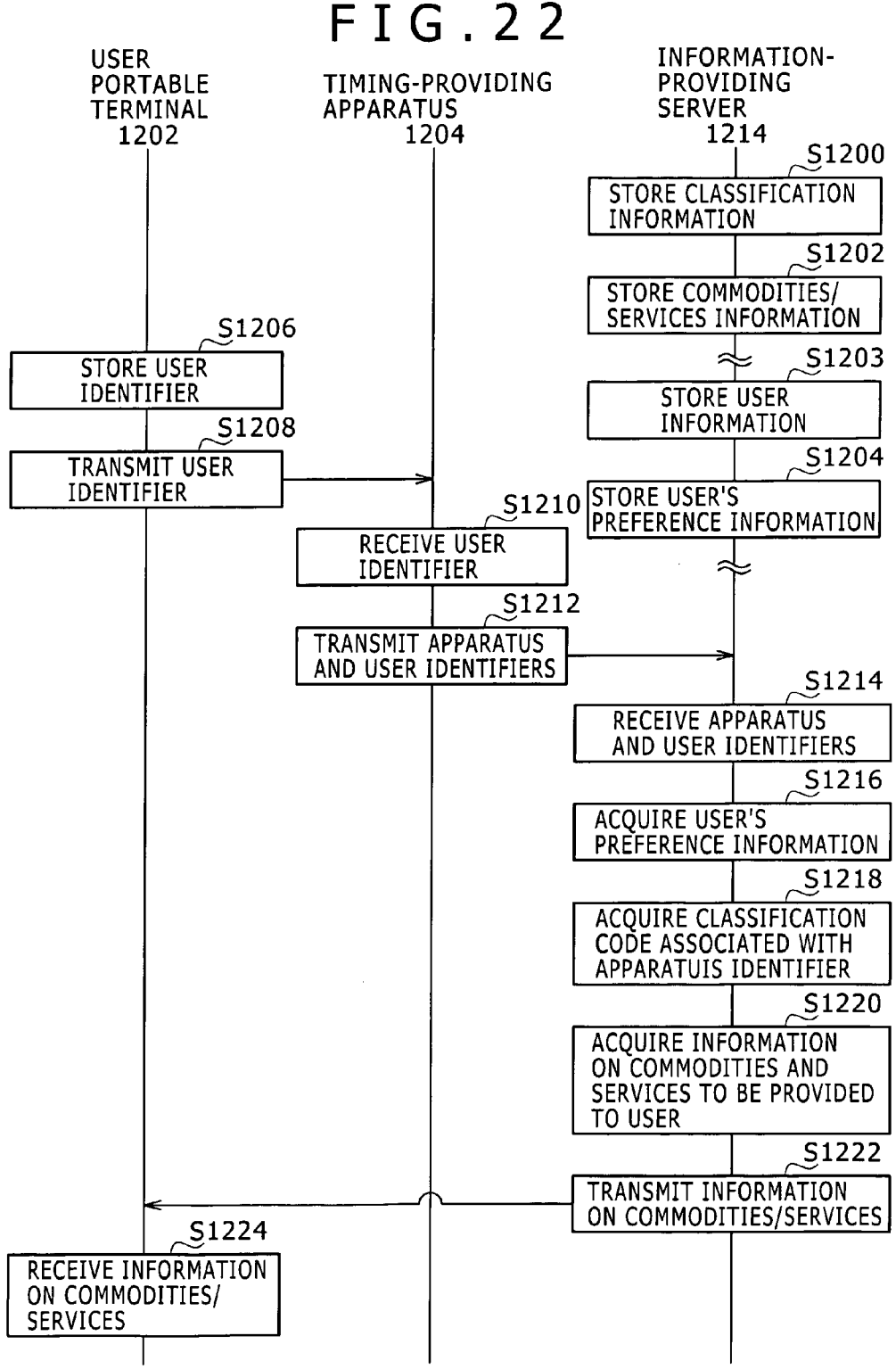

FIG. 24
2156
| USER IDENTIFIER (2160) | PREFERENCE INFORMATION (2162) |
|---|---|
| 00001 | FOREIGN-FILM ACTION, FOREIGN-FILM FANTASY, ⋯ |
| 00002 | JAPANESE DRAMA, ⋯ |
| 00003 | FOREIGN ANIMATION, ⋯ |
| 00004 | FOREIGN TV DRAMA, FOREIGN SF, ⋯ |
| ⋮ | ⋮ |
| 2163 | 2164 | 2168 |
|---|---|---|
| 00004 | 00003 | FOREIGN SF |
| USER IDENTIFIER | PREFERENCE INFORMATION |
|---|---|
| 00001 | FOREIGN-FILM ACTION, FOREIGN-FILM FANTASY, ⋯ |
| 00002 | JAPANESE DRAMA, ⋯ |
| 00003 | FOREIGN SF, FOREIGN ANIMATION, ⋯ |
| 00004 | FOREIGN TV DRAMA, ⋯ |
| ⋮ | ⋮ |

FIG. 25

| IDENTIFIER | SERVICE | ELECTRONIC VALUE | | | |
|---|---|---|---|---|---|
| S01 | J STORE | BREAD HALF-PRICE COUPONS | N KYOU MILK DISCOUNT COUPONS | TOFU 30% DISCOUNT COUPONS | |
| S12 | T STORE | DISCOUNT COUPONS FOR BEER INTRODUCED AS NEW COMMODITY | WINE DISCOUNT COUPONS | SWISS-MADE CHEESE VOUCHER | |
| D22 | S DEPARTMENT STORE | BEDCLOTHES 20%-OFF COUPONS | TOY DISCOUNT COUPONS | STATIONARY DISCOUNT COUPONS | |
| B03 | A BOOKSTORE | LEARNING-REFERENCE DISCOUNT COUPONS | | | |
| V12 | T VIDEO STORE | NEW-VIDEO DISCOUNT COUPONS | JAPANESE-ANIMATION DISCOUNT COUPONS | | |
| ... | ... | ... | ... | ... | |

2122

| IDENTIFIER | ELECTRONIC VALUE | | |
|---|---|---|---|
| S12 | WINE DISCOUNT COUPONS | NEW-VIDEO DISCOUNT COUPONS | ... |
| V12 | JAPANESE-ANIMATION DISCOUNT COUPONS | | ... |
| ... | ... | | ... |

FIG. 28

| USER IDENTIFIER | ELECTRONIC VALUE | | |
|---|---|---|---|
| 0001 | BREAD HALF-PRICE COUPONS | L-SIZE EGG 20% DISCOUNT COUPONS | |
| 0002 | NEW-VIDEO DISCOUNT COUPONS | | NEW-VIDEO DISCOUNT COUPONS |
| 0003 | WINE DISCOUNT COUPONS | BEDCLOTHES 20%-OFF COUPONS | |
| 0004 | SPRING MAKEUP COUPONS | | |
| 0005 | STATIONARY DISCOUNT COUPONS | | |
| ... | ... | ... | ... |

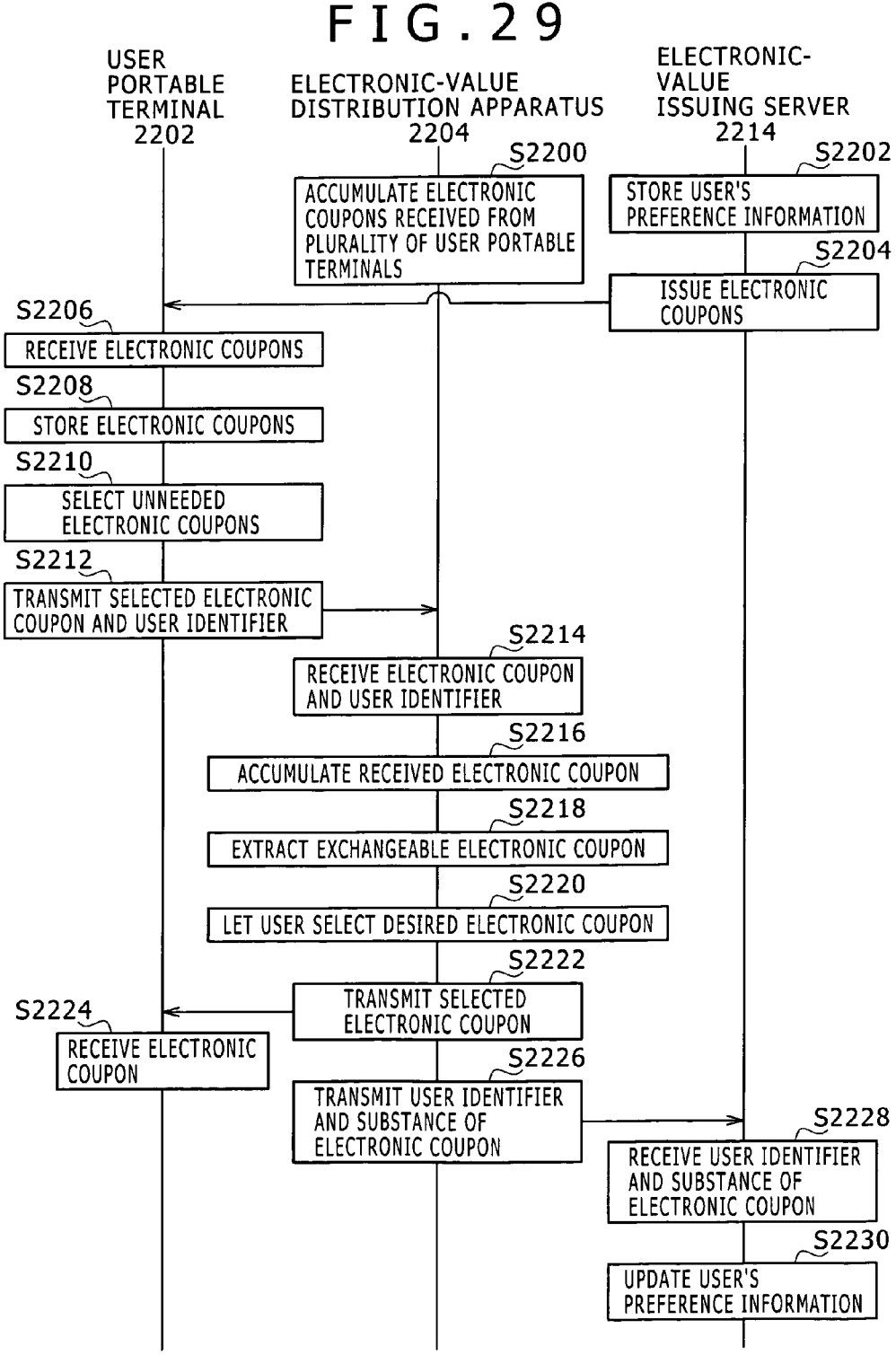

PREFERENCE INFORMATION COLLECTING SYSTEM, DEVICE, METHOD, AND PROGRAM

TECHNICAL FIELD

The present invention relates to a preference-information gathering system, an information searching apparatus, a user portable terminal, a passed-place-information sender apparatus, a preference-information gathering method, and a computer program.

BACKGROUND ART

In the past, generally, enterprises or other institutions producing commodities and/or services provide customers with information on the commodities and/or the services by using typically leaflets, direct mails, electronic mails, and/or web advertisements. The information on commodities, and/or services includes discount coupons, information on new commodities, and information on discounted sales in order to promote the purchasing will of the customers. In order to promote the purchasing will of the customers, however, distribution of information tailored to preferences with specific customers to the specific customers is more effective than distribution of the same information to all the customers. In order to distribute information tailored to preferences with specific customers to the customers, it is necessary to provide a system for inferring the preferences with the customers from purchasing records of the customers and provide the customers with information tailored to the preferences. For more information on such a system, the reader is suggested to refer to references such as Japanese Patent Laid-open No. 2003-248774 and Japanese Patent Laid-open No. 2003-308267.

This system provides customers with information on commodities, to which a coupon is applicable, in accordance with purchasing records of the customers and electronic coupons each showing a discount rate. Thus, a customer can obtain a coupon showing a higher discount rate for a commodity purchased by the customer frequently.

In the system described above, however, the only criterion used for determining a preference with a customer in a process to issue a coupon to the customer is the purchasing records of the customer. That is to say, a preference with a customer is determined on the basis of commodities purchased before by the customer. Thus, the criterion used for determining a preference with a customer does not include consideration of a commodity not purchased by the customer before even though the commodity may be of interest to the customer.

It is thus an object of the present invention, which addresses the problem described above, to provide a preference-information gathering system, an information searching apparatus, a user portable terminal, a passed-place-information sender apparatus, a preference-information gathering method, and a computer program capable of gathering information on every commodity and/or every service, which are each of interest to the customer, as information on customer's preferences.

DISCLOSURE OF INVENTION

In order to solve the problem described above, in accordance with an aspect of the present invention, there is provided a preference-information gathering system capable of gathering user's preference information. The preference-information gathering system has:

an information searching apparatus capable of searching for information on every commodity and/or every service, which are each desired by the users; and a preference-information management server connected by a communication network to the information searching apparatus and used for managing the information on preferences with the users.

The information searching apparatus includes:

a commodity/service-information storage unit for storing information on commodities and/or services;

a search-information inputting unit for requesting a user to enter search information;

a search-result acquisition unit for searching the commodity/service-information storage unit for information desired by the user on the basis of the search information;

a user-identifier acquisition unit for acquiring a user identifier identifying the user entering the search information to the search-information inputting unit; and a search-result sender unit for transmitting a search result acquired by the search-result acquisition unit and the user identifier to the preference-information management server by associating the search result and the user identifier with each other.

On the other hand, the preference-information management server includes:

a preference-information storage unit for storing the user's preference information for each of the users;

a search-result receiver unit for receiving the search result and the user identifier from the information searching apparatus; and a preference-information updating unit for updating user-preference information stored in the preference-information storage unit on the basis of the search result and the user identifier, which are received by the search-result receiver unit.

In accordance with the preference-information gathering system provided by the present invention as described above, information found in a search process carried out by the information searching apparatus at a request made by the user as information on a commodity or a service can be managed by the preference-information management server as user's preference information. In addition, information of interest to a user can be gathered as user's preference information.

In order to solve the problem described above, in accordance with another aspect of the present invention, there is provided a preference-information gathering system for gathering user's preference information. The preference-information gathering system has:

a user portable terminal, which can be carried by a user; and a preference-information management server connected by a communication network to the user portable terminal and used for managing the user's preference information.

The user portable terminal includes:

a commodity/service-identifier inputting unit for inputting an identifier identifying a commodity and/or a service;

a commodity/service-identifier storage unit for storing the commodity/service identifier; and a commodity/service-information sender unit for transmitting the commodity/service identifier and a user identifier identifying the user to the preference-information management server by associating the commodity/service identifier and the user identifier with each other.

On the other hand, the preference-information management server includes:

a preference-information storage unit for storing the user's preference information for each of the users;

a commodity/service-information receiver unit for receiving the commodity/service identifier and the user identifier from the user portable terminal; and a preference-information updating unit for updating user-preference information stored in the preference-information storage unit on the basis of the commodity/service identifier and the user identifier, which are received by the commodity/service-information receiver unit.

In accordance with the preference-information gathering system provided by the present invention as described above, the user enters an identifier identifying a commodity or service of interest to the user to the commodity/service-identifier inputting unit employed in the user portable terminal. The user then operates the user portable terminal to transmit the commodity/service identifier to the preference-information management server along with a user identifier identifying the user. The commodity/service identifier and the user identifier enable the preference-information management server to manage information on a commodity and/or a service, which are of interest to the user identified by the user identifier, as user's preference information by handling the commodity and/or service identified by the commodity/service identifier as a commodity or service of interest to the user.

In order to solve the problem described above, in accordance with a further aspect of the present invention, there is provided a preference-information gathering system for gathering user's preference information. The preference-information gathering system includes:

a user portable terminal, which can be carried by a user;

a passed-place-information sender apparatus carrying out communications with the user portable terminal; and a preference-information management server connected by a communication network to the passed-place-information sender apparatus and used for managing the user's preference information.

The user portable terminal has a user-identifier storage unit for storing a user identifier identifying the user.

The passed-place-information sender apparatus includes:

a user-identifier acquisition unit for acquiring the user identifier from the user portable terminal; and a passed-place-information sender unit for transmitting an apparatus identifier identifying the passed-place-information sender apparatus and the user identifier to the preference-information management server by associating the apparatus identifier and the user identifier with each other.

The preference-information management server includes:

a preference-information storage unit for storing the user's preference information for each of the users;

a passed-place-information receiver unit for receiving the apparatus identifier and the user identifier from the passed-place-information sender apparatus; and a preference-information updating unit for updating user-preference information stored in the preference-information storage unit on the basis of the apparatus identifier and the user identifier, which are received by the passed-place-information receiver unit.

According to the present invention as described above, the user takes the user portable terminal to such a place that the passed-place-information sender apparatus is capable of recognizing the user identifier stored in the user portable terminal. Then, the passed-place-information sender apparatus transmits the recognized user identifier to the preference-information management server along with an apparatus identifier identifying the passed-place-information sender apparatus. In this way, the preference-information management server is capable of managing information on the passed-place-information sender apparatus identified by the apparatus identifier as user's preference information identified by the user identifier.

In order to solve the problem described above, in accordance with a further aspect of the present invention, there are provided preference-information gathering methods for implementing the preference-information gathering systems described above.

In order to solve the problem described above, in accordance with a further aspect of the present invention, there is provided an information searching apparatus, which is connected by a communication network to a preference-information management server for managing user's preference information and is used for providing information to be reflected in the user's preference information to the preference-information management server. The information searching apparatus includes:

a commodity/service-information storage unit for storing information on commodities and/or services;

a search-information inputting unit for requesting a user to enter search information;

a search-result acquisition unit for searching the commodity/service-information storage unit for information desired by the user on the basis of the search information;

a user-identifier acquisition unit for acquiring a user identifier identifying the user entering the search information to the search-information inputting unit; and a search-result sender unit for transmitting a search result acquired by the search-result acquisition unit and the user identifier to the preference-information management server by associating the search result and the user identifier with each other.

According to the present invention as described above, the search-information inputting unit requests a user to enter search information and the search-result acquisition unit searches the commodity/service-information storage unit for a search result representing information desired by the user on the basis of the search information. Then, the search-result sender unit transmits the search result and the user identifier identifying the user acquired by the search-result acquisition unit to the preference-information management server by associating the search result and the user identifier with each other. In this way, the commodity/service information obtained as a result of a search process requested by the user can be transmitted to the preference-information management server. In other words, information inferred to be information of interest to the user can be transmitted to the preference-information management server. It is to be noted that the commodity/service-information storage unit can also be provided in a computer external to the information searching apparatus. In this case of such a configuration, the information searching apparatus searches the commodity/service-information storage unit provided in the computer through a communication network or the like for information desired by the user.

In the information searching apparatus described above, information stored in the commodity/service-information storage unit is a digital content including a text, a stationary picture, a moving picture, and a sound, which are related to the commodity and/or the service.

The information searching apparatus described above may be configured to further have a search-result outputting unit for outputting the search result. With such a configuration, in a process to gather information on preferences with the user, the information searching apparatus is capable of showing information desired by the user to the user.

The search-information inputting unit can also be configured to receive the search information from a user portable terminal having the search information stored in a memory employed in the user portable terminal. With such a configuration, the user can typically create search information and store the search information in advance in the user portable terminal. Then, the information searching apparatus receives the search information from the user portable terminal and uses the search information to search for desired information. Thus, the information searching apparatus provides convenience to the user.

The user-identifier acquisition unit can also be configured to receive the user identifier from a user portable terminal having the user identifier stored in a memory employed in the user portable terminal. With such a configuration, the user does not have to memorize the user identifier of its own. Thus, the information searching apparatus provides convenience to the user.

The search-result sender unit employed can also be configured to transmit the search information itself to the preference-information management server if the search-result acquisition unit is not capable of acquiring information desired by the user from the commodity/service-information storage unit on the basis of the search information. With such a configuration, even if information on a commodity and/or a service, which are desired by the user, is not stored in the commodity/service-information storage unit, the search information entered by the user can be transmitted to the preference-information management server as information on a commodity and/or a service, which are of interest to the user.

In order to solve the problem described above, in accordance with a further aspect of the present invention, a user portable terminal is connected by a communication network to a preference-information management server for managing user's preference information and is used for providing information to be reflected in the user's preference information to the preference-information management server. The user portable terminal includes:

a commodity/service-identifier inputting unit for inputting an identifier identifying a commodity and/or a service;

a commodity/service-identifier storage unit for storing the commodity/service identifier; and a commodity/service-information sender unit for transmitting the commodity/service identifier and a user identifier identifying the user to the preference-information management server by associating the commodity/service identifier and the user identifier with each other.

According to the present invention as described above, the commodity/service-identifier inputting unit inputs an identifier identifying a commodity or a service and stores the identifier in the commodity/service-identifier storage unit. Then, the commodity/service-information sender unit transmits the commodity/service identifier and a user identifier identifying the user to the preference-information management server. That is to say, information acquired by the user as information on a commodity or a service can be transmitted to the preference-information management server. In other words, information inferred to be information of interest to the user can be transmitted to the preference-information management server. It is to be noted that the commodity/service-identifier inputting unit may also input the commodity/service identifier as an identifier entered manually by the user. For example, the commodity/service-identifier inputting unit inputs the commodity/service identifier by reading out the identifier from a two-dimensional barcode or the like. As an alternative, the commodity/service-identifier inputting unit inputs the commodity/service identifier by receiving the identifier from an IC tag or the like.

In order to solve the problem described above, in accordance with a further aspect of the present invention, a passed-place-information sender apparatus, which is connected by a communication network to a preference-information management server for managing user's preference information, is used for carrying communications with a user portable terminal a user can carry and is used for providing information to be reflected in the user's preference information to the preference-information management server. The passed-place-information sender apparatus includes:

a user-identifier acquisition unit for acquiring a user identifier identifying the user from the user portable terminal; and a passed-place-information sender unit for transmitting an apparatus identifier identifying the passed-place-information sender apparatus and the user identifier to the preference-information management server by associating the apparatus identifier and the user identifier with each other.

According to the present invention as described above, the user-identifier acquisition unit acquires a user identifier from the user portable terminal. The passed-place-information sender unit is thus capable of transmitting an apparatus identifier identifying the passed-place-information sender apparatus and the user identifier to the preference-information management server by associating the apparatus identifier and the user identifier with each other. In other words, the identifier by which the user identifies the passed-place-information sender apparatus can be sent to the preference information management server.

The user-identifier acquisition unit described above may also be configured to acquire the user identifier from the user portable terminal by adoption of a non-contact communication. The non-contact communication is a communication in which the user portable terminal is not brought into physical contact with the passed-place-information sender apparatus or, even if the user portable terminal is brought into physical contact with the passed-place-information sender apparatus, the user portable terminal is not brought into electrical contact with the passed-place-information sender apparatus. A user portable terminal having such a configuration is convenient for the user in that the user needs only to take the user portable terminal to a location in close proximity to the passed-place-information sender apparatus. Thus, the non-contact communication is a radio communication. It is desirable to mainly carry out a non-contact communication only within a narrow range of the order of about 10 cm in conformity with NFC (Near Field Communication) standards specifying an RF carrier frequency of 13.56 MHz and a maximum communication speed of 212 Kbps.

The passed-place-information sender apparatus described above may also be configured to further have a transmission determining unit for determining whether or not to transmit the user identifier acquired by the user-identifier acquisition unit to the preference-information management server on the basis of the user identifier itself. With such a configuration, the transmission determining unit may make a decision of not transmitting the user identifier of a user to the preference-information management server in accordance a request made by the user in advance as a request not to transmit the identifier.

In addition, there are also provided computer programs to be executed by their respective computers functioning respectively as the information searching apparatus, the user portable terminal, and the passed-place-information sender apparatus, which have been described above. On the top of that, there are also provided recording mediums used for recording the computer programs in such a format that the programs can be read out by the computers.

As described above, in accordance with the present invention, it is possible to provide, among others, a preference-information gathering system capable of gathering information on each commodity and/or a service, which are of interest to a user, as user's preference information.

BRIEF DESCRIPTION OF DRAWINGS

FIG. 3 is an explanatory diagram showing a typical preference-information storage unit in the same embodiment.

FIG. 4 is an explanatory diagram showing a typical preference-information storage unit in the same embodiment.

FIG. 8 is an explanatory diagram showing a typical preference-information storage unit in the same embodiment.

FIG. 9 is an explanatory diagram showing a typical preference-information storage unit in the same embodiment.

FIG. 16 is an explanatory diagram showing a typical preference-information storage unit in the same embodiment.

FIG. 20 is an explanatory diagram showing typical classified information stored in a classified information storage unit in the same embodiment.

FIG. 21 is an explanatory diagram showing a typical provided-information storage unit in the same embodiment.

FIG. 22 shows a flowchart representing processing to provide the user with information in the same embodiment.

FIG. 24 is an explanatory diagram showing a typical preference-information storage unit in the same embodiment.

FIG. 25 is an explanatory diagram showing a typical electronic-value accumulation unit and an electronic-value storage unit in the same embodiment.

FIG. 28 is an explanatory diagram showing typical information stored in an electronic value temporary storage unit in the same embodiment.

FIG. 29 shows a flowchart representing processing to transmit an electronic value to the user in the same embodiment.

BEST MODES FOR CARRYING OUT THE INVENTION

Figure 1:
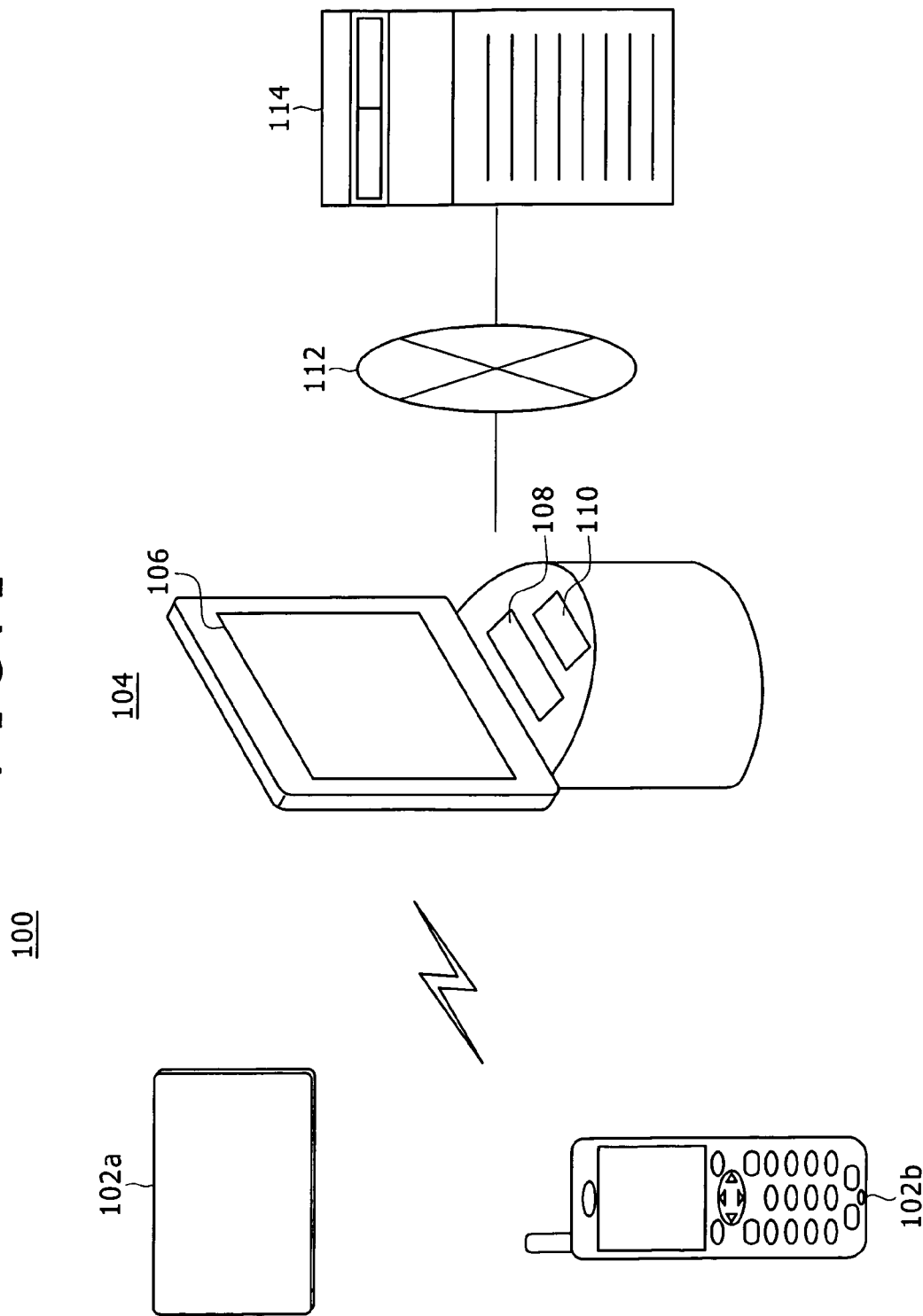
FIG. 1 is an explanatory diagram showing the overall configuration of a preference-information gathering system according to an embodiment of the present invention as well as an information providing system and an electronic-value distribution system, which are related to the preference-information gathering system.

Preferred embodiments of the present invention are explained by referring to diagrams as follows. It is to be noted that configuration elements having essentially the same functional configuration are denoted by the same reference numeral throughout this patent specification and the diagrams in order to avoid duplications of explanation.

The preference-information gathering system according to an embodiment is capable of gathering not only information based on purchasing records of the user as user's preference information, but also information on commodities/services that were not purchased by the user before but are of interest to the user. The user's preference information is utilized in an operation to provide the user with information. It is thus possible to provide an information providing system related to the embodiment.

In accordance with the conventional information providing system, timing to provide the user with commodity/service information is determined arbitrarily by a service providing company. Thus, in many cases, the user cannot effectively utilize the information even if the user receives the information. For example, even if a discount coupon issued for a commodity has been provided to a user, the user forgets to bring the coupon to a store or the like when the user visits the store so that the user cannot take advantage of the discount provided by the coupon. As another example, information on sales has been given to a user but, when the user actually visits a store providing the information, the sales season has ended. In such cases, the user cannot possibly take advantage of the information provided by the service providing company and, at the same time, it is quite within the bounds of possibility that the service providing company is also incapable of promoting the sales effectively because the user does not utilize the information. In addition, as disclosed in Japanese Patent Laid-open No. 2003-308267, there has been developed a system for providing information desired by a user to the user with timing also desired by the user. In accordance with this system, when an IC tag or the like having an identifier used for uniquely identifying a user is brought to a position in close proximity to an advertisement/announcement media having a function to read out information from the IC tag or the like, information such as a coupon managed by being associated with the advertisement/announcement media is transmitted as an email to typically the mobile telephone of the user identified by the identifier read out from the electronic tag or the like. In accordance with this system, however, the service providing company merely provides the user with information on commodities or the like requested by the user with timing also requested by the user, but the service providing company is not capable of providing information not requested by the user. Thus, the system has a problem that the information provided by the service providing company to the user hardly promotes sales.

In order to solve this problem, an information providing system according to an embodiment is capable of providing the user with information proper for the user with timing also suitable for the user. In order to provide the user with information proper for the user with timing also suitable for the user, the information providing system is provided with a timing providing apparatus for notifying a server of timing to provide information to the user. To put it concretely, the timing providing apparatus is used for carrying out communications with both a user portable terminal that can be carried by the user and an information providing server for providing the user with commodity/service information. The timing providing apparatus includes:

a user-identifier receiver unit for receiving the user identifier from the user portable terminal;

a timing-information sender unit for transmitting the user identifier to the information providing server right after the user-identifier receiver unit receives the identifier; and a provided-information relay unit for receiving commodity/service information from the information providing server and passing on the information to the user portable terminal. Other information such as a more concrete configuration and a more concrete method will be described later.

In accordance with a preference-information gathering system implemented by an embodiment and an information providing system provided as a system related to the preference-information gathering system, it is possible to gather information of interest to a user as user's preference information and provide the user with the preference information as information suitable for the user with timing appropriate for the user. In addition, if the service providing company is capable of knowing whether or not the user has taken advantage of the information provided to the user after receiving the information, the company is capable of confirming the user's preference.

In the past, however, a user utilized a coupon issued to the user as typical information provided by the service providing company by bringing the coupon to a store. As an alternative, the user showed the coupon to an employee working in the store by displaying the coupon on a display screen of a mobile telephone or the like. By using a coupon in this way, nevertheless, the service providing company serving as the main institution issuing the coupon as a kind of commodity/service information is not capable of knowing a person using the coupon after the issuance of the coupon. For example, a coupon issued to a specific user may be used by a person other than the specific user to whom the coupon has been specially issued in some cases. In such cases, the service providing company is not capable of knowing the transfer of the issued coupon to the person other than the specific user. Thus, the service providing company may issue another coupon to the person already using the coupon. As a result, it is difficult to promote sales. In addition, as disclosed in a reference such as Japanese Patent Laid-open No. 2003-248774, there has been developed a system for acquiring information on a customer taking advantage of an electronic coupon and determining the type of a coupon to be issued next to the customer on the basis of the utilization of the coupon. In accordance with this system, an electronic coupon made from a two-dimensional code is presented to the mobile telephone or the like of a user and information on the user is acquired by acquiring the two-dimensional code when the coupon is used. Then, the type of a coupon to be issued next to the user is determined on the basis of the information on the user. Nevertheless, the system is capable of merely acquiring the information on utilization of an electronic coupon when the user purchases a commodity for which the coupon has been issued, but by no means capable of acquiring the state of distribution of the coupon in case the coupon has been transferred from the recipient of the coupon to another person.

In order to solve the above problem, in accordance with an embodiment, there has been provided an electronic-value distribution system in which an electronic-value providing company is capable of acquiring distribution information of electronic values including electronic coupons. In order to allow an electronic-value providing company to acquire distribution information of electronic values, the electronic-value distribution system is provided with an electronic-value distribution apparatus. To put it concretely, the electronic-value distribution apparatus allows electronic values issued by an electronic-value issuing server as electronic values related to a commodity and/or a service or a plurality of commodities/services to be exchanged among user portable terminals. The electronic-value distribution apparatus includes:

an electronic-value receiver section for receiving an electronic value from a user portable terminal; and an electronic-value sender section for transmitting an electronic value to a user portable terminal.

The electronic-value distribution apparatus allows an electronic value to be exchanged among a plurality of aforementioned user portable terminals. Other information such as a more concrete configuration and a more concrete method will be described later.

The preference-information gathering system, the information providing system, and the electronic-value distribution system are configured as a system 100, which has a configuration typically including user portable terminals 102a, 102b, and so on, an information processing apparatus 104, a communication network 112 as well as a server 114 as shown in FIG. 1. The user portable terminals 102, the information processing apparatus 104, the communication network 112, and the server 114 each have different functions bringing about a variety of effects in each of the systems. In order to make the following description of each of the systems easy to understand, the information processing apparatus 104 and the server 114 are each denoted by a unique technical term reflecting characteristics of each of the systems. To put it concretely, in the preference-information gathering system, the information processing apparatus 104 is referred to as an information searching apparatus 104 and the server 114 is referred to as a preference-information management apparatus 114. By the same token, in the information providing system, the information processing apparatus 104 and the server 114 are referred to as a timing providing apparatus 104 and an information providing server 114 respectively. In the same way, in the electronic-value distribution system, the information processing apparatus 104 and the server 114 are referred to as an electronic-value distribution apparatus 104 and an electronic-value distribution server 114 respectively. In addition, in the following description of each of the systems, an output unit 106, an input unit 108, and a communication unit 110, which are employed in the information processing apparatus 104, are each denoted by a unique technical term reflecting characteristics of each of the systems. To put it concretely, in the preference-information gathering system, the output unit 106, the input unit 108, and the communication unit 110 are referred to as a search-result outputting unit 106, a search-information inputting unit 108, and a user-identifier acquisition unit 110 respectively. By the same token, in the information providing system, the output unit 106 and the communication unit 110 are referred to as a presented-information outputting unit 106 and a user-identifier receiver unit 110 respectively. In the same way, in the electronic-value distribution system, the output unit 106, the input unit 108, and the communication unit 110 are referred to as a display unit 106, an electronic-coupon selection unit 108, and a non-contact communication unit 110 respectively. On the top of that, in the following description of each of the systems, the system 100 is denoted by a unique technical term reflecting characteristics of each of the systems. To put it concretely, in the descriptions of the preference-information gathering system, the information-providing system, and the electronic-value distribution system, reference numeral 100 denotes different systems, i.e., a preference-information gathering system 100, an information providing system 100, and an electronic-value distribution system 100 respectively.

1. Preference-Information Gathering System

First Embodiment

A first embodiment implements a preference-information gathering system 100 capable of gathering commodity/service information as user's preference information. The commodity/service information is obtained as a result of a process to search for commodity/service information on the basis of user's preference.

First of all, the entire configuration of the preference-information gathering system 100 according to the embodiment is explained by referring to FIG. 1. As shown in the figure, the preference-information gathering system 100 has a configuration typically including user portable terminals 102a, 102b, and so on, an information searching apparatus 104, a communication network 112 as well as a preference-information management server 114. In this embodiment, in order to effectively provide a user registered as a member in advance with commodity/service information as information showing member's preference, the information searching apparatus 104 according to the embodiment gathers the information on every commodity/service, which is the member's interest.

The user portable terminals 102a, 102b, and so on are each an information terminal used for storing a user identifier for uniquely identifying the user making use of the preference-information gathering system 100. The user portable terminals 102a, 102b, and so on are each referred to hereafter simply as a user portable terminal 102 in the followings. The user portable terminal 102 of a user is capable of driving the information searching apparatus 104 to be described later to recognize the user identifier in the process carried out by the user to search for information on every commodity/service. The user identifier is typically a user ID assigned to the user in a process to register the user as a member. It is desirable to provide a user portable terminal 102 that has such a size and such a weight that the user portable terminal 102 can be carried by the user with ease. Examples of the user portable terminal 102 are a magnetic card, an IC card, a mobile telephone, a PDA (Personal Digital Assistant), a watch having an embedded IC chip, and an accessory including such a chip.

In addition to the user identifier, the user portable terminal 102 is also used for storing search information. Thus, the user portable terminal 102 has a configuration not only capable of driving the information searching apparatus 104 to recognize the user identifier, but also capable of transmitting search information stored therein to the information searching apparatus 104. To put it concretely, for example, the user portable terminal 102 is either of a mobile telephone, a PDA, and the like, which each have an input function. In this case, the user enters a keyword or the like in advance as search information to the user portable terminal 102 to be stored in a memory employed in the user portable terminal 102. Then, the user can operate the user portable terminal 102 to transmit the search information to the information searching apparatus 104 by a radio or an infrared communication.

It is to be noted that, if the user memorizes the identifier of its own, the user portable terminal 102 can be removed from the system.

The information searching apparatus 104 is connected to the preference-information management server 114 for managing user's preference by the communication network 112. The information searching apparatus 104 is an information processing apparatus capable of providing information to be reflected in user's preference information. The information searching apparatus 104 has a configuration typically including a search-result outputting unit 106, a search-information inputting unit 108, and a user-identifier acquisition unit 110.

The search-information inputting unit 108 is an input unit capable of receiving and selecting search information to be used for obtaining information on every commodity/service, which is desired by the user. Typically, the search-information inputting unit 108 includes a keyboard, a mouse, and a touch panel. In addition, the search-information inputting unit 108 may have a configuration allowing the user to enter a voice input to the search-information inputting unit 108. The search information is typically a search key used by the information searching apparatus 104 in a process to search for information on every commodity/service, which are each desired by the user. If the user wants to obtain information on a movie desired by the user, for example, the search information can be the title and/or genre of the movie or the names of an actor and/or actress of the movie.

In a system where the user transmits search information from the user portable terminal 102 to the information searching apparatus 104, the search-information inputting unit 108 is provided with a function for receiving the search information by a radio or infrared communication.

The user-identifier acquisition unit 110 is a unit for acquiring the user identifier from a user portable terminal 102. To put it concretely, the user-identifier acquisition unit 110 reads out the user identifier from a magnetic card, receives the user identifier from an IC card, a watch having an IC chip embedded therein, an accessory including such a chip, or a mobile telephone by a radio communication, or receives the user identifier from a mobile telephone by an infrared communication. As an alternative, the user-identifier acquisition unit 110 may request the user to directly enter the user identifier via a keyboard or a touch panel.

The search-result outputting unit 106 is a unit for displaying information obtained as a result of a search process requested by the user. To put it concretely, when the search-result outputting unit 106 receives the title of a movie from the search-information inputting unit 108, for example, the search-result outputting unit 106 displays, among others, an outline of the movie, information on performers of the movie, and a location of video information representing the movie on a display screen. In addition to the display screen, the search-result outputting unit 106 may also have an audio output sub-unit in a configuration allowing the movie obtained as a result of a search process to be displayed on a trial basis or a piece of music also obtained as a result of a search process to be heard by the user also on a trial basis.

The information searching apparatus 104 transmits a user identifier acquired by the user-identifier acquisition unit 110 and a result of a search process requested by the user identifier to the preference-information management server 114 by way of the communication network 112 by associating the identifier with the result of the search. A detailed configuration of the information searching apparatus 104 will be described later.

The communication network 112 is a network having a function to transmit information typically including the user identifier and the result of a search process. Examples of the communication network 112 are a telephone line, a dedicated line, and the Internet, which are capable of carrying out communications in two directions. The communication network 112 can be a wire-communication or a radio-communication network.

The preference-information management server 114 is an information processing apparatus for managing user's preference information utilizing the preference-information gathering system 100. The preference-information management server 114 receives a user identifier and a search process-result, which are transmitted by the information searching apparatus 104 through the communication network 112, and manages the result of the search process as information, which is inferred to be information of interest to the user.

In accordance with the preference-information gathering system 100 having the configuration described above, the preference-information management server 114 is capable of managing information, which is obtained as a result of a search process carried out by the information searching apparatus 104 at a request made by the user as commodity/service information, as user's preference information. Thus, the preference-information management server 114 is also capable of gathering information of interest to the user as user's preference information. As a result, the user can obtain information on each commodity and/or each service, which have been searched for by the user by using the information searching apparatus 104, from a commodity/service providing company or the like.

Figure 2:
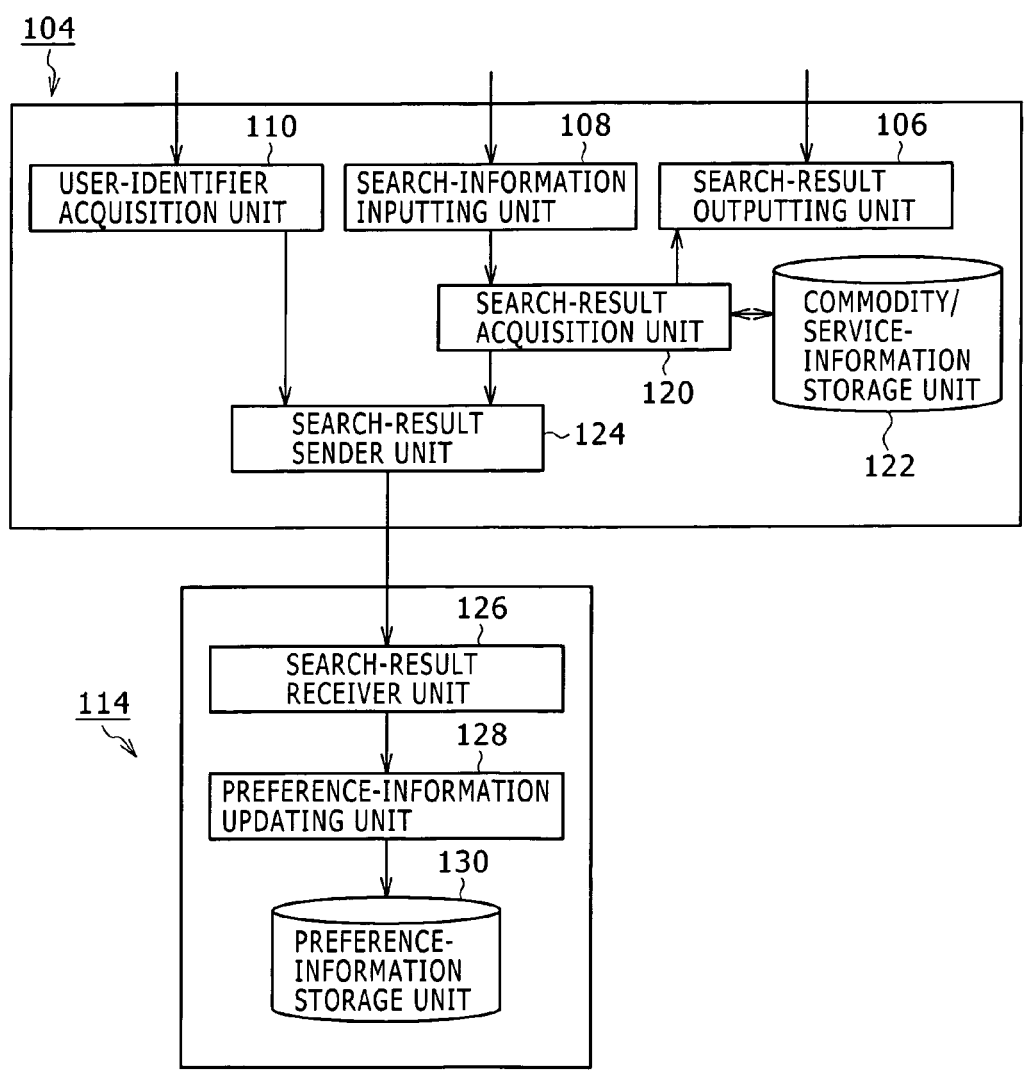
FIG. 2 is a block diagram showing the configurations of an information searching apparatus and a preference-information management server, which are employed in a first embodiment implementing the preference-information gathering system.

The entire configuration of the preference-information gathering system 100 has been described so far. Next, the functional configurations of the information searching apparatus 104 and the preference-information management server 114 are explained by referring to FIG. 2.

First of all, the hardware configurations of the information searching apparatus 104 and the preference-information management server 114 are described briefly. Typically, the information searching apparatus 104 and the preference-information management server 114 each have a CPU, a ROM, a RAM, and a hard disk.

The CPU is a section functioning as a processing unit as well as a control unit, which are capable of controlling processes carried out by other components employed in the information searching apparatus 104 or the preference-information management server 114. The ROM and the RAM are memories for temporarily storing information such as data related to processing carried out by the CPU and a program executed by the CPU.

The hard disk is configured typically as a hard-disk drive or a flash memory to serve as a storage unit used for storing information including an OS (Operating System) and a variety of application programs. The hard disk has a configuration typically including a commodity/service-information storage unit 122 and a preference-information storage unit 130, which are to be described later. It is to be noted that each of the commodity/service-information storage unit 122, the preference-information storage unit 130, and other memory portions can also be implemented as a ROM and/or a RAM instead of a portion of the hard disk.

Next, the functional configurations of the information searching apparatus 104 and the preference-information management server 114 are explained. The information searching apparatus 104 has a configuration typically including the user-identifier acquisition unit 110, the search-information inputting unit 108, the search-result outputting unit 106, a search-result acquisition unit 120, the commodity/service-information storage unit 122, and a search-result sender unit 124.

As described above, the user-identifier acquisition unit 110 functions as a unit for acquiring the user identifier from a user portable terminal 102. The user-identifier acquisition unit 110 passes on the acquired user identifier to the search-result sender unit 124. As explained earlier, the search-information inputting unit 108 functions as a unit for requesting the user to enter search information. As described before, the search-result outputting unit 106 functions as a unit for displaying a result of a search process or outputting the result as an audio signal in order to present the result to the user.

The commodity/service-information storage unit 122 functions as a unit for storing information on every commodity/service, which is presentable to the user. The commodity/service information is typically information provided by a commodity/service providing company, which uses the preference-information gathering system 100 to gather user's preference information. If a commodity provided by the commodity/service providing company is a rental video, the contents of the information on the commodity are the location offering the rental video, an overview of the video, and pictures obtained as a result of trial reproduction of the video.

The search-result acquisition unit 120 functions as a unit for searching the commodity/service-information storage unit 122 for information on a commodity/service corresponding to a search key entered to the search-information inputting unit 108 and supplying the information obtained as a result of the search process to the search-result sender unit 124. In addition, the search-result acquisition unit 120 also functions as a unit for supplying the information obtained as a result of the search process to the search-result outputting unit 106 to be presented to the user. To put it concretely, let us assume for example that the search-result acquisition unit 120 receives the title of a movie from the search-information inputting unit. In this case, the search-result acquisition unit 120 searches the commodity/service-information storage unit for a video content representing the movie and supplies the video content to the search-result outputting unit 106 as a result of the search process to be presented to the user. At that time, the search-result acquisition unit 120 supplies the title of the movie to the search-result sender unit 124. In place of the title of the movie, the search-result acquisition unit 120 may supply the genre to which the movie pertains to the search-result sender unit 124.

In addition, if the search-result acquisition unit 120 searches the commodity/service-information storage unit 122 for information on a commodity/service corresponding to a search key entered to the search-information inputting unit 108 but fails to obtain the information as a result of the search process, the search-result acquisition unit 120 may pass on the search key itself to the search-result sender unit 124. With this configuration, if information has not been stored in the commodity/service-information storage unit 122 as information on a commodity/service desired by the user, the search key entered by the user can be transmitted to the preference-information management server 114 as information on a commodity/service of interest to the user.

The search-result sender unit 124 functions as a unit for transmitting a user identifier received from the user-identifier acquisition unit 110 and a search-process result received from the search-result acquisition unit 120 to the preference-information management server 114 by associating the user identifier and the search-process result with each other.

The preference-information management server 114 has a configuration typically including a search-result receiver unit 126, a preference-information updating unit 128, and a preference-information storage unit 130. The search-result receiver unit 126 functions as a unit for receiving a search-process result transmitted by the information searching apparatus 104 by way of the communication network 112.

The preference-information updating unit 128 functions as a unit for updating information stored in the preference-information storage unit 130 as user's preference information on the basis of a search-process result received by the search-result receiver unit 126. The preference-information storage unit 130 functions as a memory used for storing user's preference information. The preference-information storage unit 130 is explained in detail by referring to FIGS. 3 and 4 as follows.

As shown in FIG. 3, the preference-information storage unit 130 is used for storing the identifiers of users and pieces of user's preference information by associating each of the identifiers with one of the pieces of information. To put it concretely, the user IDs of users each registered as a member are put in advance on a user-identifier column 132. On the other hand, search-process results received by the search-result receiver unit 126 from the information searching apparatus 104 are put by associating each specific one of the results with the received user identifier along with the specific result. That is to say, the preference-information storage unit 130 is used for storing commodity/service information for each of the user identifier. The stored commodity/service information is information obtained as a result of a search process carried out in the information searching apparatus 104 at a request made by a user identified by the user identifier associated with the information. In other words, for each of the user identifier, the preference-information storage unit 130 is used for storing information on every commodity/service, which is probably the user's interest.

As described above, information stored in the preference-information storage unit 130 is updated by the preference-information updating unit 128. Let us assume for example that, 'Star Wall' is received by the search-result receiver unit 126 from the information searching apparatus 104 as a search-process result representing information on a commodity and/or a service along with a user identifier of '00003', as shown in an example of FIG. 3. In this case, the search-process result of 'Star Wall' is added to the preference-information column 134 by being put on a row corresponding to the user identifier of '00003' as shown in the figure.

As shown in the example of FIG. 3, the information stored in the preference-information storage unit 130 as user's preference information is unmodified search-process results each representing commodity/service information. In place of the commodity/service information, the preference-information storage unit 130 can also be used for storing keywords including results of search processes. As shown in an example of FIG. 4, the keyword is typically the genre of a commodity and/or a service, which have been found in a search process. To put it concretely, in place of the title of a movie found in a search process, for example, the genre of the movie is added to a preference-information column 144, being associated with the user-identifier column 132 as shown in FIG. 4. In addition, a search-process result received by the search-result receiver unit 126 from the information searching apparatus 104 can be the title of a movie found in a search process as shown in FIG. 3 or the genre of the movie as shown in FIG. 4.

Figure 5:
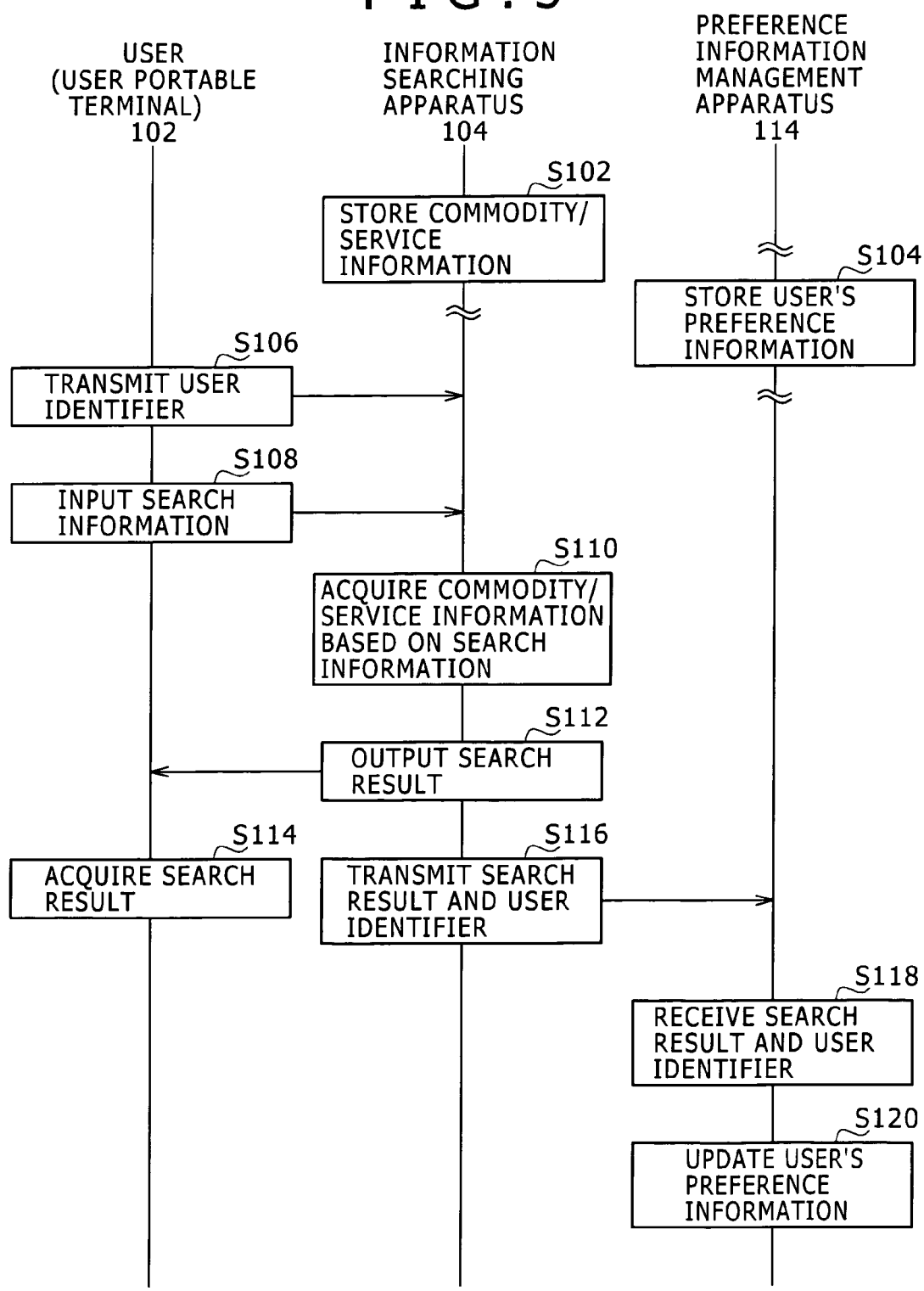
FIG. 5 shows a flowchart representing processing to gather preference information in the same embodiment.

So far, the functional configurations of the information searching apparatus 104 and the preference-information management server 114 have been described. Next, processing carried out in the preference-information gathering system 100 according to the embodiment to gather user's preference information is explained by referring to a flowchart shown in FIG. 5.

The flowchart begins with a step S102 at which the information searching apparatus 104 stores commodity/service information as information that can be presented to the user (S102). In addition, at a step S104, the preference-information management server 114 stores user's preference information (S104). To put it concretely, for example, when the user is registered as a member, initial user's preference are inferred from answers each given by the user as a response to a questionnaire or the like and stored in the preference-information storage unit 130.

Then, the user operates the user portable terminal 102 to transmit the user identifier to the information searching apparatus 104 (S106). Subsequently, the user enters search information to the information searching apparatus 104 in a process to search for information on predetermined commodities and/or predetermined services (S108).

Then, the information searching apparatus 104 searches the commodity/service-information storage unit 122 on the basis of the entered search information in order to acquire the information corresponding to the search information (S110). Subsequently, the information searching apparatus 104 outputs the acquired information as a result of the search process in order to present the information to the user (S112). Then, the user is capable of obtaining the information on predetermined commodities and/or predetermined services as the result of the search process (S114).

In addition, at a step S116, the information searching apparatus 104 transmits the user identifier and the result of the search process to the preference-information management server 114 by associating the user identifier and the result of the search process (S116) with each other. Subsequently, the preference-information management server 114 receives the user identifier and the result of the search process (S118). Then, the preference-information management server 114 updates the user's preference information identified by the received user identifier on the basis of the received result of the search process (S120).

The above description has explained the flowchart representing the processing carried out by the preference-information gathering system 100 to gather user's preference information.

By providing the preference-information gathering system 100 according to the first embodiment with the configuration described above, the preference-information management server 114 is capable of managing information, which is found as information on commodities/services desired by a user in a search process carried out by the information searching apparatus 104 at a request made by the user, as user's preference information. That is to say, information on every commodity/service, which is the user's interest even though probably not to be purchased by the user, can be collected as user's preference information.

Second Embodiment

The following description explains a second embodiment implementing a preference-information gathering system 200 in which information used for recognizing every commodity/service, which is the user's interest, is accumulated in a user portable terminal owned by the user and the accumulated information is then transmitted to a preference-information management server in order to gather user's preference information.

Figure 6:
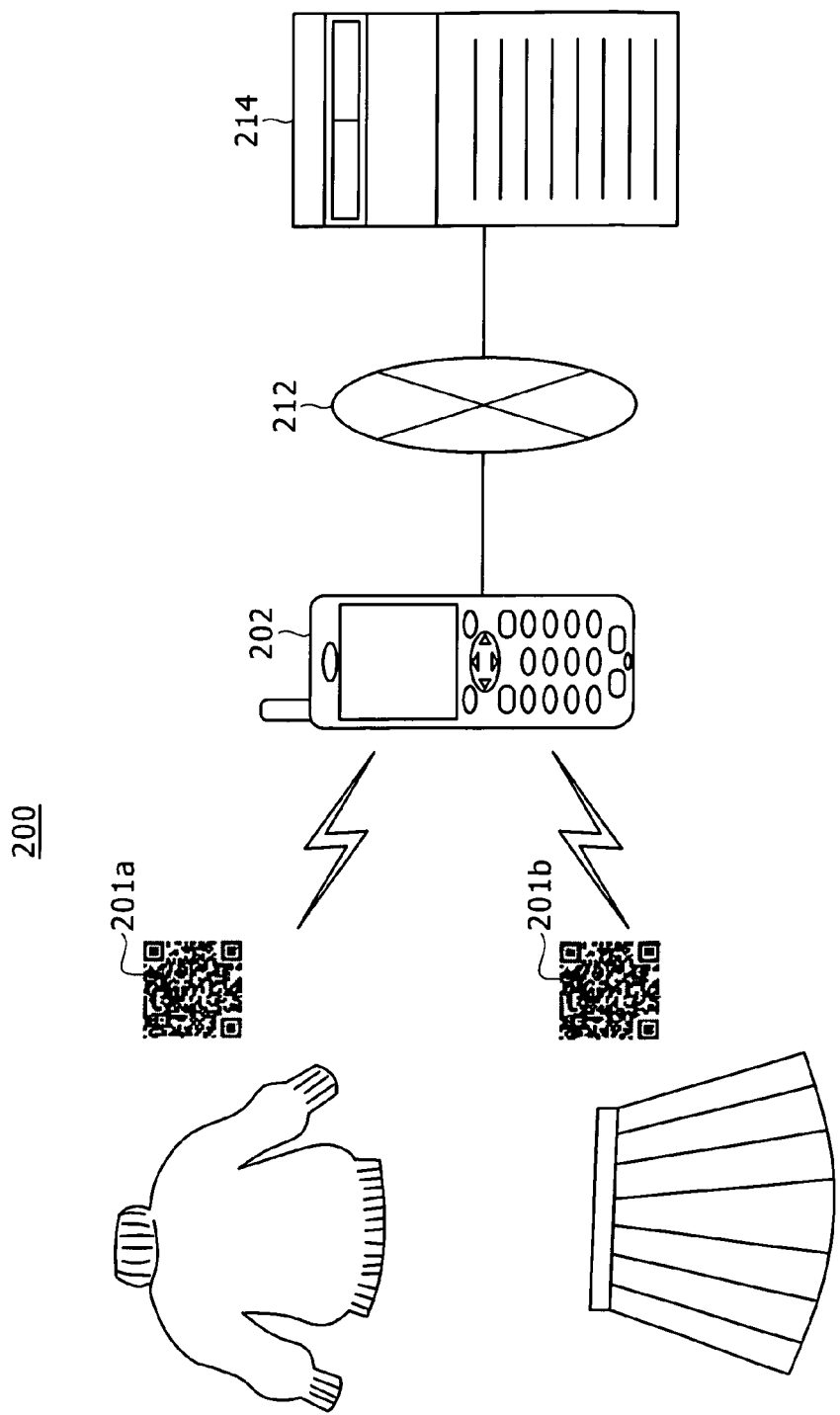
FIG. 6 is an explanatory diagram showing the overall configuration of a preference-information gathering system according to a second embodiment.

First of all, the entire configuration of the preference-information gathering system 200 according to this embodiment is explained by referring to FIG. 6. As shown in the figure, the preference-information gathering system 200 has a configuration typically including commodity/service recognition tags 201a, 201b, and so on, a user portable terminal 202, a communication network 212 as well as a preference-information management apparatus 214. In this embodiment, in order to effectively provide a user registered in advance as a member with commodity/service information as information showing member's preference, the commodity/service recognition tags 201a, 201b, and so on as well as the user portable terminal 202, which are provided by the embodiment, are used for gathering information on every commodity/service, which are each of interest to the user.

The commodity/service recognition tags 201a, 201b, and so on are each used for recording a commodity/service identifier used by the preference-information management apparatus 214 to be described later for uniquely identifying a commodity and/or a service. In the following description, the commodity/service recognition tags 201a, 201b, and so on are each referred to simply as a commodity/service tag 201. Examples of the commodity/service tag 201 are a two-dimensional barcode, an IC tag, and a magnetic card.

The user portable terminal 202 is an information terminal used for storing an identifier for uniquely identifying the user making use of the preference-information gathering system 200. The user portable terminal 202 is an information terminal capable of reading out the commodity/service identifier from the commodity/service tag 201 and capable of transmitting the commodity/service identifier along with the user identifier to the preference-information management apparatus 214 by way of the communication network 112 by associating the commodity/service identifier and the user identifier with each other. The user identifier is typically a user ID assigned to the user in a process to register the user as a member. It is desirable to provide a user portable terminal 202 that has such a size and such a weight that the user portable terminal 202 can be carried by the user with ease. Examples of the user portable terminal 202 are a mobile telephone, a PDA (Personal Digital Assistant).

The user portable terminal 202 functions as a unit for reading out the commodity/service identifier from a commodity/service tag 201. Let us assume for example that the commodity/service tag 201 is a two-dimensional barcode. In this case, the user portable terminal 202 has the function of a barcode reader. If the commodity/service tag 201 is an IC tag, the commodity/service tag 201 has the function of an IC-tag reader. In addition, the user portable terminal 202 may have another function suitable for the type of the commodity/service tag 201. Examples of the other function are the function of a magnetic-card reader, an infrared communication function, and a radio communication function.

If the commodity/service tag is a two-dimensional barcode, the user is capable of reading out the barcode by using the user portable terminal 202 even if the barcode is displayed on the screen of a PC (Personal Computer). Thus, the user is capable of reading out commodity/service identifiers of commodities actually lined up in a store or the like from the commodity/service identification tags 201 each attached to one of the commodities by using the user portable terminal 202. In addition, while the user is viewing a web content displayed typically on the screen of a PC at the home of the user, for example, the user is also capable of reading out the commodity/service identifiers of a commodity and/or a service, which are of interest to the user, from the commodity/service identification tags 201 each displayed on the PC as the commodity/service identification tag 201 of each of the commodity and/or the service by associating the commodity/service identification tag 201 with the commodity and/or the service by using the user portable terminal 202.

It is to be noted that the user portable terminal 202 is also capable of saving each commodity/service identifier read out from the commodity/service tag 201 in a memory and later collectively transmitting a plurality of such identifiers stored in the memory to the preference-information management server 214. If the user portable terminal 202 is capable of transmitting a plurality of commodity/service identifiers to the preference-information management server 214 at one time, the transmission cost can be reduced to a small one in comparison with a case in which a commodity/service identifier is transmitted to the preference-information management server 214 every time the identifier is read out from a commodity/service tag 201.

The communication network 212 is a network having a function to transmit the user identifier and the commodity/service identifier. Examples of the communication network 212 are a telephone line, a dedicated line, and the Internet, which are capable of carrying out communications in two directions. The communication network 212 can be a wire-communication or a radio-communication network.

The preference-information management apparatus 214 is an information processing apparatus for managing user's preference information utilizing the preference-information gathering system 200. The preference-information management apparatus 214 receives a user identifier and a commodity/service identifier, which are transmitted by the user portable terminal 202 by way of the communication network 212. The preference-information management apparatus 214 manages the commodity/service identifiers as information inferred to be possible information of interest to users each identified by a received user identifier.

In the configuration described above, the user utilizes the user portable terminal 202 to read out the commodity/service identifier from a commodity/service tag 201 attached to either of the commodity or the service, which are of interest to the user, and transmit the identifier of its own along with the identifier of the commodity or the service from the user portable terminal 202 to the preference-information management apparatus 214. The preference-information management apparatus 214 handles the commodity/service identified by the commodity/service identifier as a commodity/service of interest to the user identified by a user identifier received along with the commodity/service identifier, and manages the commodity and/or the service as user's preference. As a result, the user can receive information on a commodity/service identified by a commodity/service identifier transmitted to the preference-information management apparatus 214 from a commodity/service providing company or the like.

Figure 7:
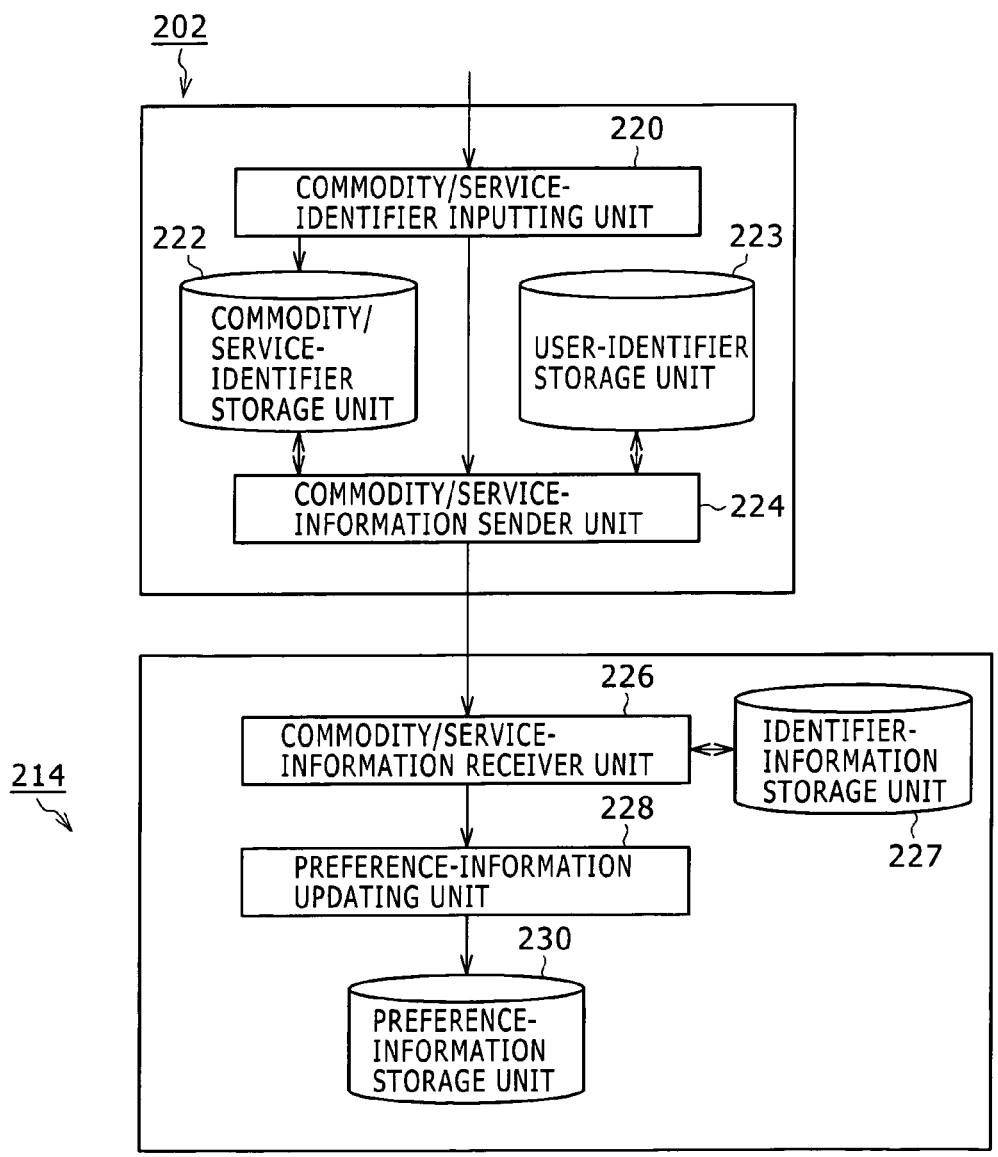
FIG. 7 is a block diagram showing the configurations of a user portable terminal and a preference-information management server, which are included in the same embodiment.

The entire configuration of the preference-information gathering system 200 has been explained above. Next, the functional configurations of the user portable terminal 202 and the preference-information management server 214 are described by referring to FIG. 7 as follows.

First of all, the hardware configurations of the user portable terminal 202 and the preference-information management server 214 are described briefly. Since the hardware configuration of the preference-information management server 214 is all but the same as that of the corresponding one according to the first embodiment, no explanation of the hardware configuration of the preference-information management server 214 is given. Typically, the user portable terminal 202 has a CPU, a ROM, a RAM, and a hard disk.

The CPU is a section functioning as a processing unit as well as a control unit, which are capable of controlling processes carried out by other components employed in the user portable terminal 202. The ROM and the RAM are memories for temporarily storing information such as data related to processing carried out by the CPU and a program executed by the CPU.

The hard disk is configured typically as a hard-disk drive or a flash memory to serve as a storage unit used for storing information including an OS (Operating System) and a variety of application programs. The hard disk has a configuration typically including a commodity/service-identifier storage unit 222 and a user-identifier storage unit 223, which will be described later. It is to be noted that each of the commodity/service-identifier storage unit 222, the user-identifier storage unit 223, and other memory portions can also be implemented as a ROM and/or a RAM instead of a portion of the hard disk.

If the user portable terminal 202 is a mobile telephone having IC chips or the like, an EEPROM is employed. In this case, the commodity/service-identifier storage unit 222 and the user-identifier storage unit 223 can be included in the EEPROM.

Next, the functional configurations of the user portable terminal 202 and the preference-information management server 214 are explained. The user portable terminal 202 has a configuration typically including a commodity/service-identifier inputting unit 220, the commodity/service-identifier storage unit 222, the user-identifier storage unit 223, and a commodity/service-information sender unit 224.

The commodity/service-identifier inputting unit 220 functions as a unit for acquiring the commodity/service identifiers from commodity/service tags 201 and transmitting the acquired identifiers to the commodity/service-information sender unit 224 as described above. In addition, the commodity/service-identifier inputting unit 220 is also capable of saving the acquired commodity/service identifiers in the commodity/service-identifier storage unit 222. If the commodity/service tag 201 is a tag showing the commodity/service identifier as an identifier that can be recognized by the user in place of a two-dimensional bar code or an IC tag as described above, the user may enter the commodity/service identifier to the user portable terminal 202 via typically input means employed in the user portable terminal 202. Examples of the input means are a keyboard and a touch panel.

The commodity/service-identifier storage unit 222 functions as a memory used for storing identifiers acquired by the commodity/service-identifier inputting unit 220 as the commodity/service identifiers. On the other hand, the user-identifier storage unit 223 functions as a memory used for storing user identifiers each used for uniquely identifying a user in the preference-information gathering system 200.

The commodity/service-information sender unit 224 functions as a unit for transmitting a commodity/service identifier received from the commodity/service-identifier inputting unit 220 or read out from the commodity/service-identifier storage unit 222 and a user identifier stored in the user-identifier storage unit 223 to the preference-information management apparatus 214 by associating the commodity/service identifier with the user identifier. It is to be noted that the commodity/service-information sender unit 224 can also be configured to be capable of selecting the identifier of a desired commodity or a desired service from commodity/service identifiers stored in the commodity/service-identifier storage unit and transmitting the selected identifier to the preference-information management apparatus 214.

The preference-information management apparatus 214 has a configuration including a commodity/service-information receiver unit 226, an identifier/information storage unit 227, a preference-information updating unit 228, and a preference-information storage unit 230. The commodity/service-information receiver unit 226 functions as a unit for receiving information transmitted by the user portable terminal 202 by way of the communication network 112 as commodity/service information.

The preference-information updating unit 228 functions as a unit for updating information stored in the preference-information storage unit 230 as user's preference information on the basis of information received by the commodity/service-information receiver unit as commodity/service information. The identifier/information storage unit 227 functions as a memory used for storing commodity/service identifiers as well as storing information as information on every commodity/service, which are each identified by the identifiers. The preference-information storage unit 230 functions as a memory used for storing user's preference information. The preference-information storage unit 230 and the identifier/information storage unit 227 are explained in detail by referring to FIGS. 8 and 9 as follows.

FIG. 8 is an explanatory diagram showing typical information stored in the preference-information storage unit 230. As shown in the figure, the preference-information storage unit 230 is used for storing the identifiers of users and pieces of user's preference information by associating each of the identifiers with one of the pieces of information. To put it concretely, the user IDs of users each registered as a member are put in advance on a user-identifier column 232. On a preference-information column 234, for each of the user identifier, commodity/service identifiers are recorded by associating the commodity/service identifiers with the user identifier received by the commodity/service-information receiver unit 226 from the user portable terminal 202 along with the commodity/service identifiers. That is to say, for each of the user identifier, the preference-information storage unit 230 is used for storing commodity/service identifiers each read out from a commodity/service tag 201 by using the user portable terminal 202 operated by a user identified by the user identifier and transmitted to the preference-information management apparatus 214. In other words, the commodity/service identifiers stored in the preference-information storage unit 230 are the identifiers of every commodity/service, which are each probably of interest to a user identified by the user identifier.

As described above, information stored in the preference-information storage unit 230 is updated by the preference-information updating unit 228. Let us assume for example that, a commodity/service identifier of SW25533 is received by the commodity/service-information receiver unit 226 from the user portable terminal 202 along with a user identifier of 00002 as shown in an example of FIG. 8. In this case, the commodity/service identifier of SW25533 is added to the preference-information column 234 by being put on a row corresponding to the user identifier of '00002' as shown in the figure.

In addition, in a process to store the commodity/service identifier in the preference-information storage unit 230, the identifier may be converted into information on the commodity or service identified by the identifier as shown in an example of FIG. 9. In accordance with the example shown in FIG. 9, information on the commodity or service identified by a commodity/service identifier transmitted by the user from the user portable terminal 202 to the preference-information management apparatus 214 is stored in the preference-information column 244 by being put on a row corresponding to a user identifier 232 transmitted along with the commodity/service identifier. The identifier/information storage unit 227 has a commodity/service-identifier column 250 for storing the commodity/service identifiers and a commodity/service-category column 252 used for storing pieces of information on a commodity or service identified by one of the identifiers.

After receiving the commodity/service identifier from the user portable terminal 202, the commodity/service-information receiver unit 226 refers to the identifier/information storage unit 227 in order to convert the identifier into information on the commodity or the service and, then, supplies the information to the preference-information updating unit 228. In the case of the example shown in FIG. 9, the commodity/service-information receiver unit 226 receives a user identifier of 00002 along with a commodity/service identifier of SW25533 from the user portable terminal 202. As shown in the figure, the commodity/service-information receiver unit 226 then acquires commodity/service information, which is a sweeter (white), from the commodity/service-category column 252 as information corresponding to the commodity/service identifier of SW25533. Subsequently, the commodity/service-information receiver unit 226 adds the acquired information on the commodity to the preference-information column 244 by being put on a row corresponding to the user identifier of 00002.

Figure 10:
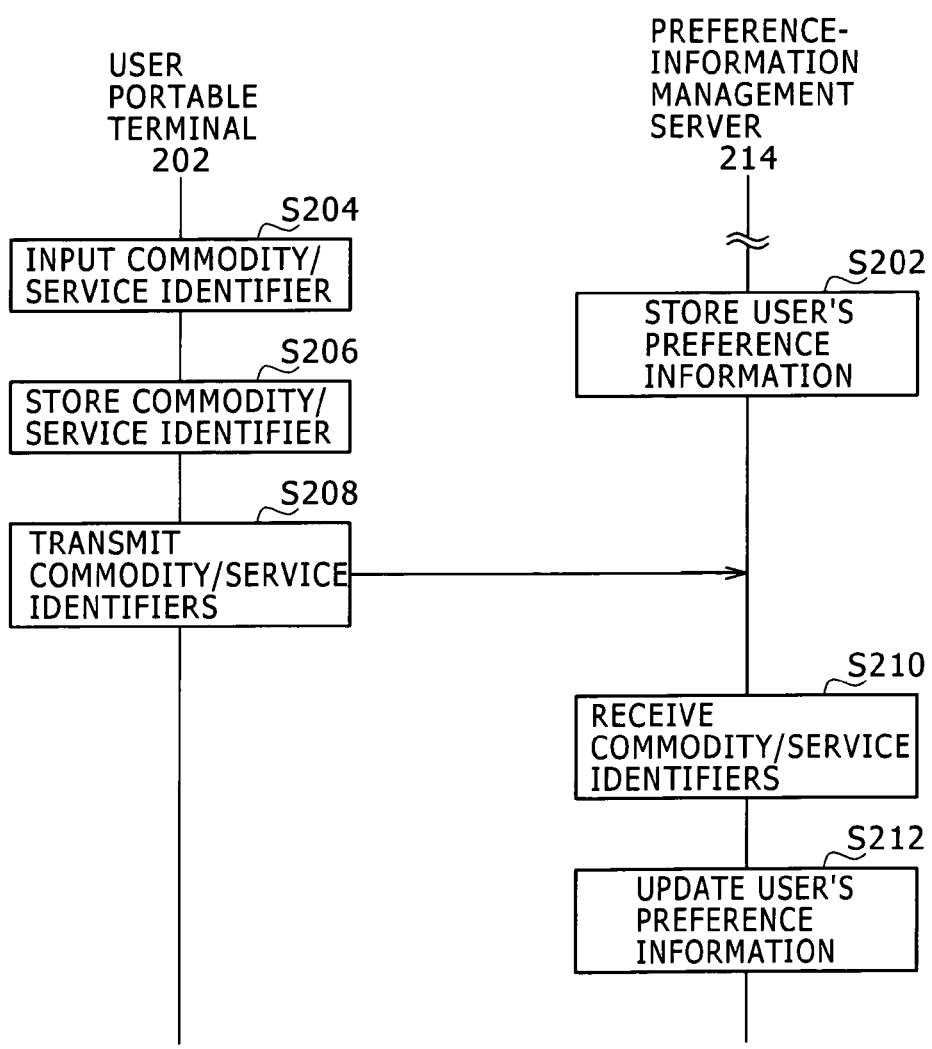
FIG. 10 shows a flowchart representing processing to gather preference information in the same embodiment.

The functional configurations of the user portable terminal 202 and the preference-information management apparatus 214 have been described above. By referring to a flowchart shown in FIG. 10, the following description explains processing carried out in the preference-information gathering system 200 according to the embodiment to gather user's preference information.

The flowchart begins with a step S202 at which the preference-information management apparatus 214 stores user's preference information (S202). To put it concretely, for example, when a user is registered as a member, initial user's preference are inferred from answers each given by the user as a response to a questionnaire or the like and stored in the preference-information storage unit 230.

Then, at a step S204, the user operates the user portable terminal 202 in order to acquire the commodity/service identifier from a commodity/service tag 201 (S204). Subsequently, at the next step S206, the acquired commodity/service identifier is stored in the commodity/service-identifier storage unit 222 (S206). Then, at the step S208, the user portable terminal 202 transmits stored commodity/service identifiers to the preference-information management apparatus 214 along with the user identifier (S208). It is to be noted that the user may operate the user portable terminal 202 in order to select the identifier of a desired commodity or a desired service from the stored commodity/service identifiers and transmit the identifier of the desired commodity or the desired service to the preference-information management apparatus 214 along with the user identifier. As an alternative, after the user operates the user portable terminal 202 in order to acquire the commodity/service identifier at the step S204, the identifier is transmitted to the preference-information management apparatus 214 automatically along with the user identifier.

The preference-information management apparatus 214 receives commodity/service identifiers and the user identifier from the user portable terminal 202 (S210). Then, the preference-information management apparatus 214 updates information, which is associated with the received user identifier as user's preference information, on the basis of the received commodity/service identifiers (S212).

The above description has explained the flowchart representing the processing carried out in the preference-information gathering system 200 to gather user's preference information.

By configuring the preference-information gathering system 200 according to the second embodiment as described above, the preference-information management apparatus 214 can be used for managing commodity/service identifiers, which are acquired by the user portable terminal 202 operated by the user from commodity/service recognition tags 201, as user's preference information. That is to say, information on every commodity/service, which is the user's interest even though probably not to be purchased by the user, can be collected as user's preference information.

Third Embodiment

The following description explains a third embodiment implementing a preference-information gathering system 300 capable of gathering user's preference information by transmitting information on places or the like frequently passed through or visited by the user to a preference-information management server 314.

Figure 11:
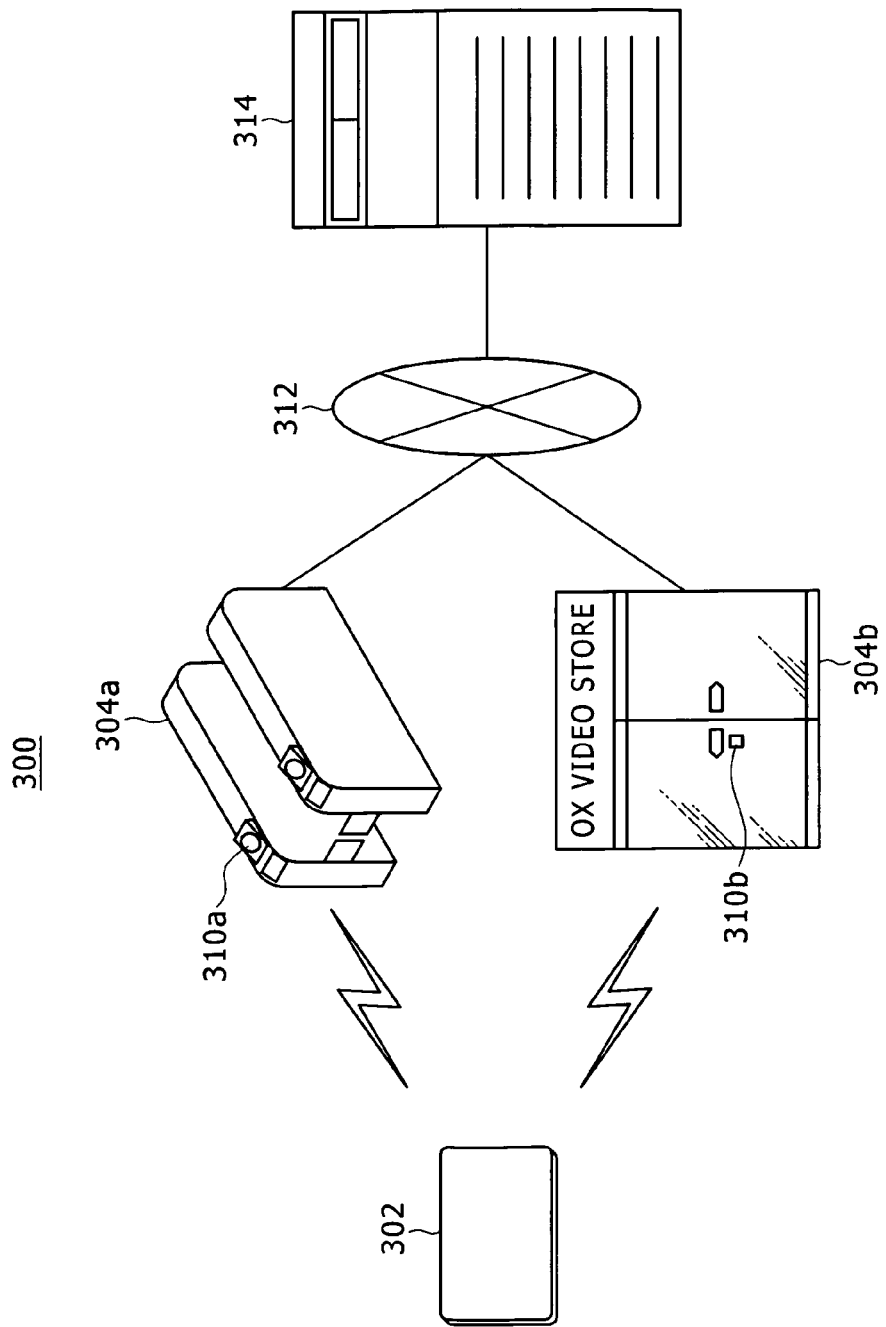
FIG. 11 is an explanatory diagram showing the overall configuration of a preference-information gathering system according to a third embodiment.

First of all, the entire configuration of the preference-information gathering system 300 according to this embodiment is explained by referring to FIG. 11. As shown in the figure, the preference-information gathering system 300 has a configuration typically including a user portable terminal 302, passed-place-information sender apparatus 304a, 304b, and so on, a communication network 312 as well as a preference-information management server 314. In this embodiment, in order to effectively provide a user registered in advance as a member with commodity/service information as information showing member's preference, the passed-place-information sender apparatus 304a, 304b, and so on as well as the user portable terminal 302, which are provided by the embodiment, are used for gathering information on places or the like passed through or visited by the user frequently.

The user portable terminal 302 is an information terminal used for storing an identifier for uniquely identifying the user making use of the preference-information gathering system 300. The user portable terminal 302 is capable of driving each of the passed-place-information sender apparatus 304a, 304b, and so on, which will be described later, to recognize the user identifier. The user identifier is typically a user ID assigned to the user in a process to register the user as a member. It is desirable to provide a user portable terminal 302 that has such a size and such a weight that the user portable terminal 302 can be carried by the user with ease. Examples of the user portable terminal 302 are a magnetic card, an IC card, a mobile telephone, a PDA (Personal Digital Assistant), a watch having an IC chip embedded therein, and an accessory including such a chip. In particular, if the user portable terminal 302 is a terminal capable of carrying out non-contact communications with the passed-place-information sender apparatus 304a, 304b, and so on in order to transmit the user identifier to the passed-place-information sender apparatus 304a, 304b, and so on, such a user portable terminal 302 is convenient for the user in that the user needs only to hold the user portable terminal 302 over a location in close proximity to any of the passed-place-information sender apparatus 304a, 304b, and so on. Examples of such a user portable terminal 302 are an IC card, a mobile telephone having IC chips embedded therein, a watch including such chips, and an accessory including such chips. It is to be noted that the non-contact communication is a communication in which the user portable terminal 302 is not brought into physical contact with the passed-place-information sender apparatus 304a, 304b, and so on. Even if the user portable terminal 302 is brought into physical contact with the passed-place-information sender apparatus 304a, 304b, and so on, the user portable terminal 302 is not brought into electrical contact with the passed-place-information sender apparatus 304a, 304b, and so on. Thus, the non-contact communication is a radio communication. It is desirable to mainly carry out a non-contact communication only within a narrow range of the order of about 10 cm in conformity with NFC (Near Field Communication) standards specifying an RF carrier frequency of 13.56 MHz and a maximum communication speed of 212 Kbps.

The passed-place-information sender apparatus 304a, 304b, and so on, which are each referred to hereafter simply as a passed-place-information sender apparatus 304, are connected to the preference-information management server 314, which is a server for managing user's preference information, by the communication network 312. The user portable terminal 302 is an information processing apparatus capable of providing the preference-information management server 314 with information to be reflected in the user's preference information. To put it concretely, the passed-place-information sender apparatus 304 is incorporated as a part of an automatic ticket gate of a station, an entrance door of a store, or the like as shown in the figure. As an alternative, the passed-place-information sender apparatus 304 is installed for example at a children's clothing section of a department store or at the entrance of a special-commodity sales section of a store. By placing the passed-place-information sender apparatus 304 at such a place, the passed-place-information sender apparatus 304 is capable of acquiring the user identifier from the user portable terminal 302 when the user passes through or visits the place and notifying the preference-information management apparatus 214 that the user has passed through or visited the place. The passed-place-information sender apparatus 304 employs user-identifier acquisition units 310a, 310b, and so on.

The user-identifier acquisition units 310a, 310b, and so on, which are each referred to hereafter simply as a user-identifier acquisition unit 310, are each a unit for acquiring the user identifier from the user portable terminal 302. To put it concretely, for example, the user-identifier acquisition unit 310 reads out the user identifier from a magnetic card. As an alternative, the user-identifier acquisition unit 310 receives a user identifier transmitted by either of an IC card, a watch including an IC chip embedded therein, an accessory, a portable phone, and the like, through a radio communication. As another alternative, the user-identifier acquisition unit 310 receives a user identifier transmitted by a mobile telephone or the like, through an infrared communication.

The communication network 312 is a network having a function to transmit a user identifier or the like used in the embodiment. Examples of the communication network 312 include the Internet. The communication network 312 can be a wire-communication or a radio-communication network.

The preference-information management server 314 is an information processing apparatus managing user's preference information making use of the preference-information gathering system 300. The preference-information management server 314 receives information transmitted by the passed-place-information sender apparatus 304 by way of the communication network 312. The information typically includes a user identifier and an apparatus identifier identifying the passed-place-information sender apparatus 304. The preference-information management server 314 regards a place used for installing the passed-place-information sender apparatus 304 identified by an apparatus identifier as a place passed through or visited by a user identified by a user identifier, and manages information on such places as user's preference information. In addition, the preference-information management server 314 also regards every commodity/service, which are each relevant to a place for installing a passed-place-information sender apparatus 304, respectively as a commodity and/or a service, which are of interest to a user, and manages information on such commodities/services as user's preference information.

It is to be noted that information on every place passed through or visited by a user is not immediately managed as user's preference information. Instead, for a user identifier, the preference-information management server 314 is typically provided with a counter for counting the number of times the same apparatus identifier are received by the preference-information management server 314 along with the user identifier. Then, the preference-information management server 314 manages information identified by an apparatus identifier as user's preference information only if the value of a counter provided for the user identifier indicates that the number of times the apparatus identifier have been received along with the user identifier is greater than a predetermined value. By providing the configuration described above, it is possible to manage information on only places each passed through and/or visited by a user as well as only every commodity/service, which are relevant to the place, as user's preference information. Thus, user's preference can be inferred more properly.

By virtue of the configuration described above, the user can request the passed-place-information sender apparatus 304 to recognize a user identifier stored in the user portable terminal 302 and transmit the user identifier recognized by the passed-place-information sender apparatus 304 to the preference-information management server 314 along with the identifier of the passed-place-information sender apparatus 304. Thus, the preference-information management server 314 is capable of managing a place used for installing the passed-place-information sender apparatus 304 identified by the apparatus identifier as a place frequently passed through or visited by a user identified by a user identifier. In addition, the preference-information management server 314 is capable of regarding information on every commodity/service, which are each relevant to the place, as respectively a commodity and/or a service, which are of interest to a user, and managing information on such commodities/services as user's preference information. As a result, the user can receive the information about the place where the user passes through or visits frequently and the information about the commodities and services related to the place.

Figure 12:
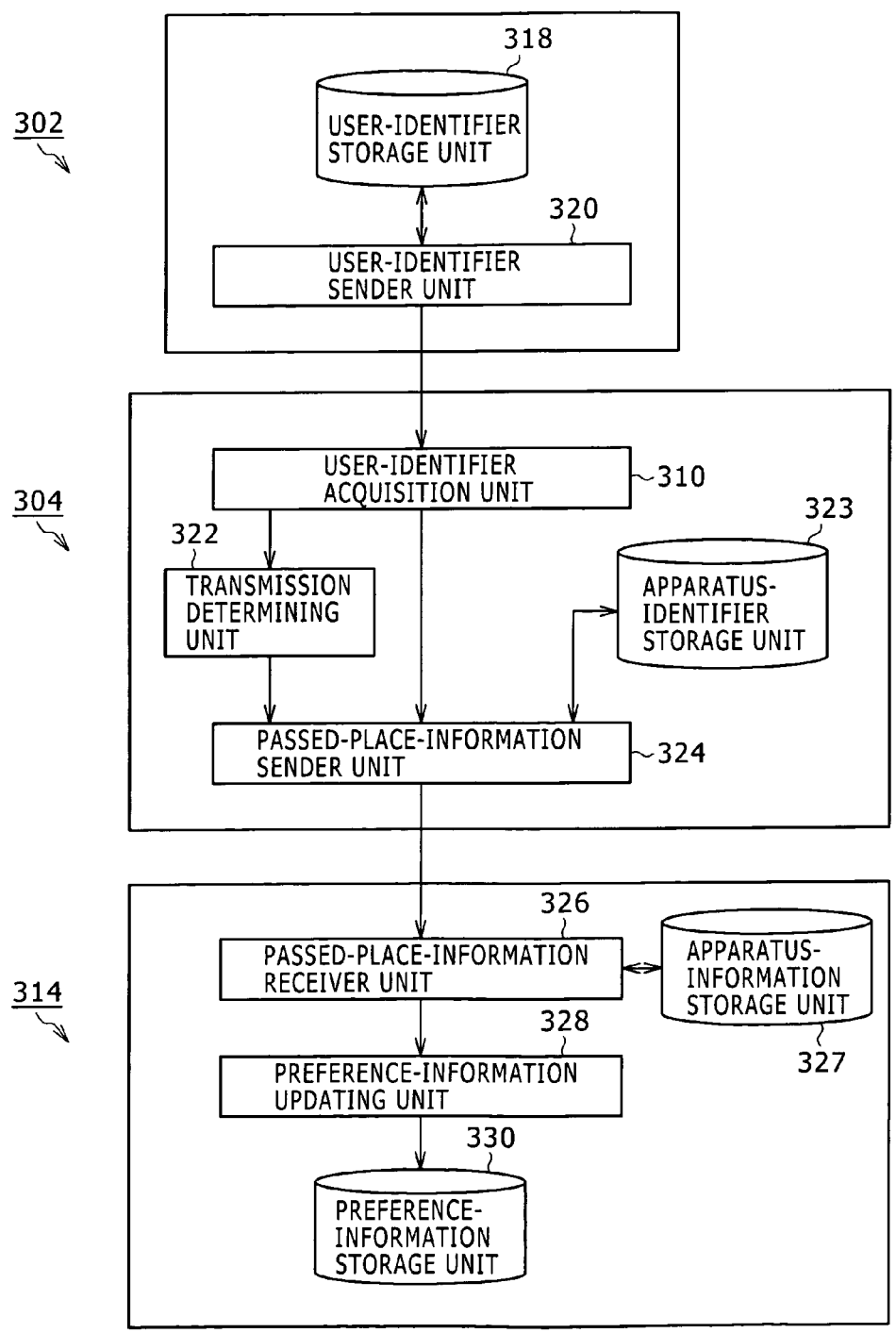
FIG. 12 is a block diagram showing the configurations of a user portable terminal, a passed-place-information sender apparatus, and a preference-information management server, which are included in the same embodiment.

The entire configuration of the preference-information gathering system 300 has been described above. Next, by referring to FIG. 12, the following description explains the functional configurations of the user portable terminal 302, the passed-place-information sender apparatus 304, and the preference-information management server 314. It is to be noted that, since the hardware configurations of the first and the second embodiment are the same, no explanation of the hardware configurations of the second embodiment is given.

The user portable terminal 302 has a configuration typically including a user-identifier storage unit 318 and a user-identifier sender unit 320. The user-identifier storage unit 318 functions as a memory used for storing a user identifier uniquely identifying a user in the preference-information gathering system 300. The user-identifier sender unit 320 functions as a unit for acquiring the user identifier from the user-identifier storage unit 318 and transmitting the identifier to the passed-place-information sender apparatus 304.

The passed-place-information sender apparatus 304 has a configuration typically including a user-identifier acquisition unit 310, an identifier-transmission determining unit 322, an apparatus-identifier storage unit 323, and a passed-place-information sender apparatus 324.

The user-identifier acquisition unit 310 functions as a unit for receiving the user identifier transmitted by the user portable terminal 302 as described above. The user-identifier acquisition unit 310 passes on the received user identifier to the identifier-transmission determining unit 322 or the passed-place-information sender apparatus 324.

The identifier-transmission determining unit 322 functions as a unit for examining the user identifier received from the user-identifier acquisition unit 310 in order to produce a result of determination as to whether or not to transmit the user identifier to the preference-information management server 314. The identifier-transmission determining unit 322 passes on the user identifier to the passed-place-information sender apparatus 324 only if the result of the determination indicates that the user identifier is an identifier to be transmitted to the preference-information management server 314. To put it concretely, when a user is registered as a member, for example, the user is typically requested to confirm that information on a place passed through or visited by the user can be gathered. Then, the confirmation result indicating whether or not the information on the place can be transmitted is stored in a memory in advance along with the user identifier. Thus, the result of the confirmation can be used in a process to produce a result of determination as to whether or not to transmit the user identifier to the preference-information management server 314.

The apparatus-identifier storage unit 323 functions as a memory used for storing an apparatus identifier uniquely identifying the passed-place-information sender apparatus in the preference-information gathering system 300.

The passed-place-information sender apparatus 324 functions as a unit for transmitting a user identifier received from the user-identifier acquisition unit 310 or the identifier-transmission determining unit 322 and the apparatus identifier read out from the apparatus-identifier storage unit 323 to the preference-information management server 314 by associating the user identifier with the apparatus identifier with each other.

The preference-information management server 314 has a configuration typically including a passed-place-information receiver apparatus 326, a place-information storage unit 327, a preference-information updating unit 328, and a preference-information storage unit 330. The passed-place-information receiver apparatus 326 functions as a unit for receiving a user identifier and an apparatus identifier, which are transmitted by the passed-place-information sender apparatus 304 by way of the communication network 312.

The preference-information updating unit 328 functions as a unit for using a user identifier and an apparatus identifier, which are received by the passed-place-information receiver apparatus 326, to update information stored in the preference-information storage unit 330 as user's preference information. For each apparatus identifier, the place-information storage unit 327 is used for storing information on a place for installing a passed-place-information sender apparatus 304 identified by the identifier or information on every commodity/service, which are relevant to the place or the passed-place-information sender apparatus 304, by associating the information with the identifier. The preference-information storage unit 330 functions as a memory used for storing information on every user's preference. The preference-information storage unit 330 is explained in detail by referring to FIGS. 13 and 4.

Figure 13:
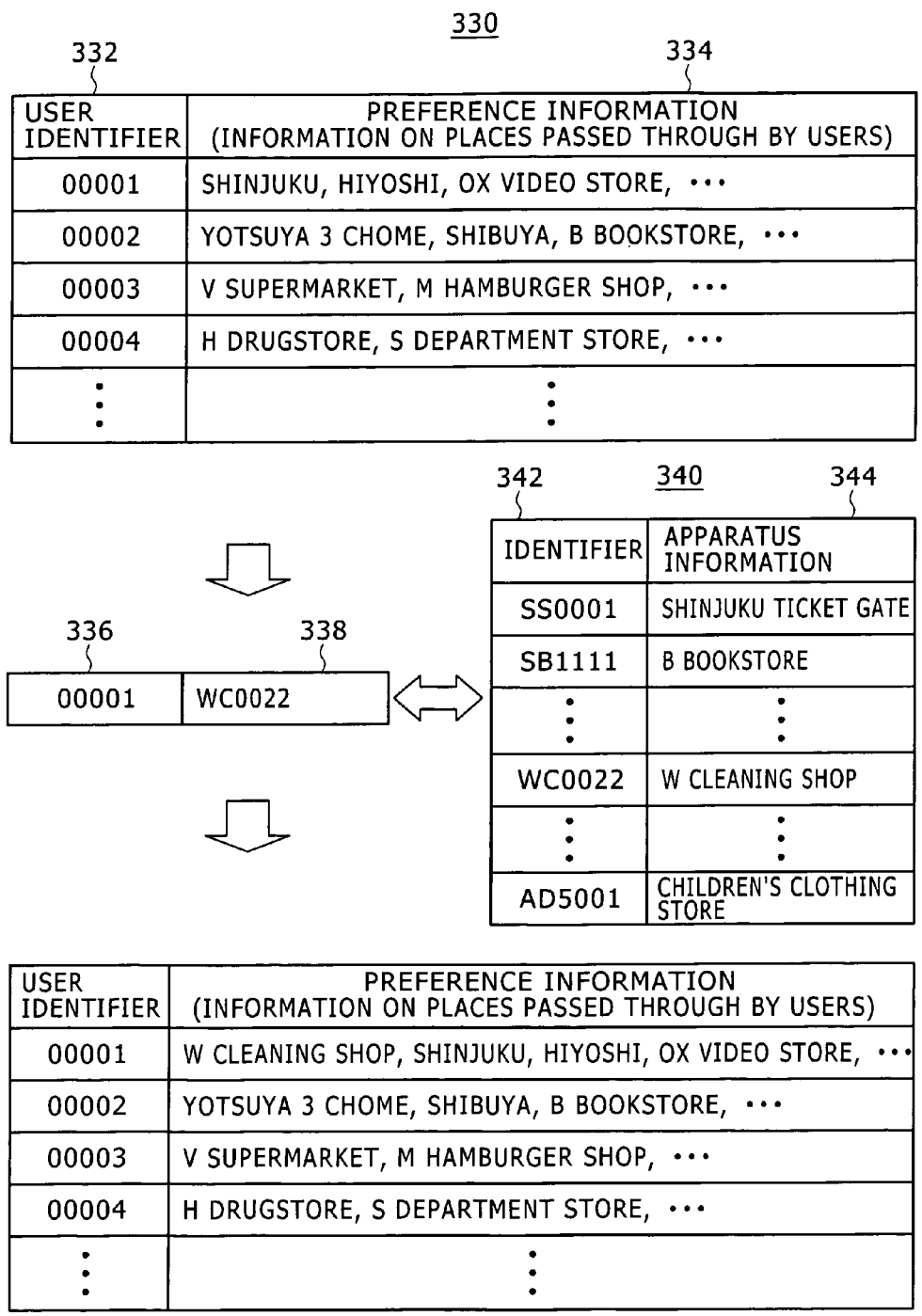
FIG. 13 is an explanatory diagram showing a typical preference-information storage unit in the same embodiment.

As shown in FIG. 13, the preference-information storage unit 330 is used for storing user's preference information by associating the information with the user identifier. To put it concretely, a user-identifier column 332 is used for storing each user ID identifying a user registered as a member in advance. A preference-information column 334 is used for storing information related to an apparatus identifier received by the passed-place-information receiver unit 326 from the passed-place-information sender apparatus 304 by associating the information with the user identifier transmitted by the passed-place-information sender apparatus 304. That is to say, for each user identifier, the preference-information storage unit 330 is used for storing information related to a passed-place-information sender apparatus 304 installed at a place passed through or visited frequently by a user identified by a user identifier. In other words, the preference-information storage unit 330 is used for storing information inferred to be probably information of interest to the user.

An apparatus-information storage unit 340 has an identifier column 342 used for storing apparatus identifiers each identifying a passed-place-information sender apparatus 304 and an apparatus-information column 344 used for storing information on places identified by an apparatus identifier or used for storing information on every commodity/service After receiving the identifier of an apparatus from the passed-place-information sender apparatus 304, the passed-place-information receiver apparatus 326 refers to the apparatus-information storage unit 340 in order to convert the identifier into the apparatus information and supplies the information to the preference-information updating unit 328. In the case of an example shown in FIG. 13, the passed-place-information receiver apparatus 326 receives a user identifier of 00001 and an apparatus identifier of WCO022 from the passed-place-information sender apparatus 304. In this case, as shown in the figure, the passed-place-information receiver apparatus 326 acquires apparatus information "W cleaning store" corresponding to the received apparatus identifier of WCO022 from the apparatus-information column 344. Then, the passed-place-information receiver apparatus 326 adds the information to the preference-information column 334 corresponding to the received user identifier of 00001.

Figure 14:
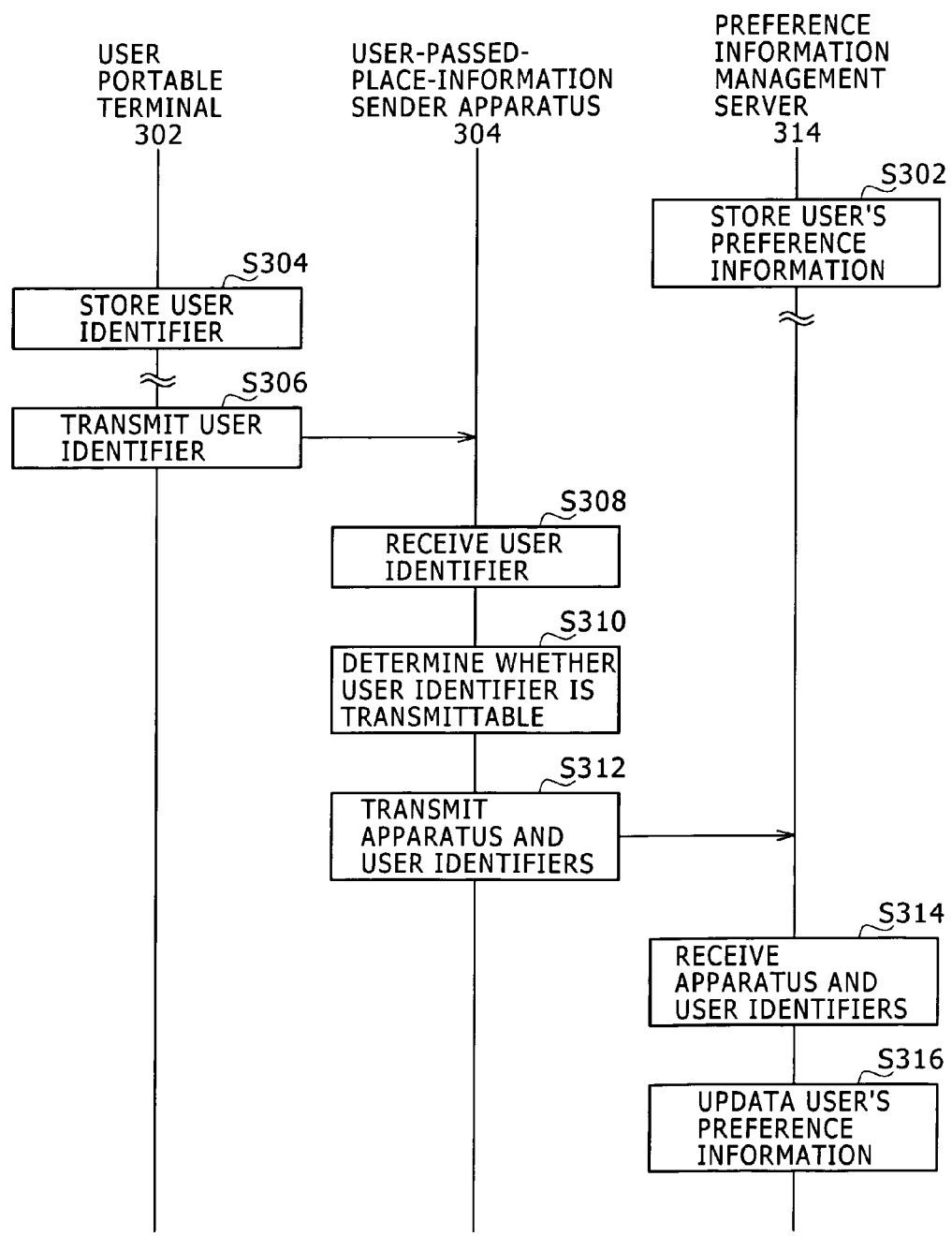
FIG. 14 shows a flowchart representing processing to gather preference information in the same embodiment.

The functional configurations of the user portable terminal 302, the passed-place-information sender apparatus 304, and the preference-information management server 314 have been described above. Next, by referring to a flowchart shown in FIG. 14, the following description explains processing carried out in the preference-information gathering system 300 according to the embodiment to gather user's preference information.

The flowchart begins with a step S302 at which the preference-information management server 314 stores user's preference information (S304). To put it concretely, for example, when a user is registered as a member, initial user's preference are inferred from answers each given by the user as a response to a questionnaire or the like and stored in the preference-information storage unit 330. Then, the user portable terminal 302 stores a user identifier issued typically in a process to register the user as a member in the user-identifier storage unit 318 (S304).

Subsequently, at the next step S306, the user typically holds the user portable terminal 302 in order to let the user portable terminal 302 transmit the user identifier to the passed-place-information sender apparatus 304 (S306).

At a step S308, the passed-place-information sender apparatus 304 receives the user identifier from the user portable terminal 302 (S308). Then, at the next step S310, the passed-place-information sender apparatus 304 produces a result of determination as to whether or not the user identifier can be transmitted to the preference-information management server 314 (S310). If the result of the determination indicates that the user identifier is allowed to transmit information on a place passed through or visited by the user, the flow of the processing goes on to a step S312. The passed-place-information sender apparatus 304 transmits the user identifier and an apparatus identifier identifying the passed-place-information sender apparatus 304 to the preference-information management server 314 by associating the user identifier and apparatus identifiers with each other (S314).

At a step S314, the preference-information management server 314 receives the user identifier and the identifier of the passed-place-information sender apparatus 304 (S314). Subsequently, by using the received identifier of the passed-place-information sender apparatus 304, the preference-information management server 314 updates information associated with the received user identifier as user's preference information (S316).

The above description has explained the flowchart representing the processing carried out in the preference-information gathering system 300 according to the embodiment to gather user's preference information.

By providing the preference-information gathering system 300 according to the third embodiment with the configuration described above, it is possible to use the preference-information management server 314 to manage information on a place passed through or visited frequently by a user or information on every commodity/service, which are related to such a place, as user's preference information. The preference-information gathering system 300 has been described so far. Next, an information providing system 100 is explained.

2. Information Providing System

First Embodiment

A first embodiment implements an information providing system 100 in which, when a specific user visits a store offering commodities/services to users, information on the specific user's preference is selected from information, that can be provided by the store to all users as commodity/service information, and given to the specific user.

First of all, the entire configuration of the information providing system 100 according to the embodiment is explained by referring to FIG. 1. As shown in the figure, the information providing system 100 has a configuration typically including user portable terminals 102a and 102b, a timing providing apparatus 104, a communication network 112 as well as an information providing server 114.

The user portable terminals 102a, 102b, and so on, which are each used by a user making use of the information providing system 100, are each an information terminal used for storing an identifier for uniquely identifying the user. The user portable terminals 102a, 102b, and so on are each referred to hereafter simply as a user portable terminal 102. The user portable terminal 102 of a user is capable of driving the timing providing apparatus 104 to be described later to recognize the user identifier. The user identifier is typically a user ID assigned to the user in a process to register the user as a member. It is desirable to provide a user portable terminal 102 that has such a size and such a weight that the user portable terminal 102 can be carried by the user with ease. Examples of the user portable terminal 102 are a magnetic card, an IC card, a mobile telephone, a PDA (Personal Digital Assistant), a watch having an embedded IC chip, and an accessory. In particular, if the user portable terminal 102 is a terminal capable of carrying out non-contact communications with the timing providing apparatus 104 in order to transmit the user identifier to the timing providing apparatus 104, such a user portable terminal 102 is convenient for the user in that the user needs only to hold the user portable terminal 102 over a location in close proximity to the timing providing apparatus 104. Examples of such a user portable terminal 102 are an IC card, a mobile telephone having IC chips embedded therein, a watch including such chips, and an accessory including such chips. It is to be noted that the non-contact communication between the user portable terminal 102 and the timing providing apparatus 104 is a communication in which the user portable terminal 102 is not brought into physical contact with the timing providing apparatus 104. Even if the user portable terminal 102 is brought into physical contact with the timing providing apparatus 104, the user portable terminal 102 is not brought into electrical contact with the timing providing apparatus 104. Thus, the non-contact communication is a radio communication. It is desirable to mainly carry out a non-contact communication only within a narrow range of the order of about 10 cm in conformity with the NFC (Near Field Communication) standards specifying an RF carrier frequency of 13.56 MHz and a maximum communication speed of 212 Kbps.

It is also desirable to provide a user portable terminal 102 capable of receiving commodity/service information from the information providing server 114 by way of the communication network 112 or the timing providing apparatus 104. If the user portable terminal 102 is terminal receiving commodity/service information from the information providing server 114 by way of the communication network 112, it is desirable to use a terminal connectable to the communication network 112. Examples of such a terminal are a mobile telephone and a PDA.

The information provided by the information providing server 114 to the user by way of the user portable terminal 102 or the timing providing apparatus 104 as commodity/service information. The commodity/service information typically includes features and concrete substances of the commodities/services, a place provided in a store as a place for exhibiting the commodities/services, discount coupons of the commodities/services, a video content used for showing a portion of a movie to the user on a trial basis, and a musical content used for letting the user to listen to a portion of a piece of music on a trial basis.

The timing providing apparatus 104 is connected to the information providing server 114 for providing the user with commodity/service information by the communication network 112. The timing providing apparatus 104 is an information processing apparatus capable of notifying the information providing server 114 of timing to provide the user with such information on commodity/service information. The timing providing apparatus 104 is set in a place capable of providing the user with commodities/services related to the information that is transmitted by the information providing server 114 through the timing providing apparatus to the user portable terminal 102. In the case of this embodiment, the timing providing apparatus 104 is installed at a store offering the commodities and the services. The timing providing apparatus 104 receives the user identifier from the user portable terminal 102 carried by the user visiting the store and transmits the identifier to the information providing server 114. That is to say, the timing providing apparatus 104 is capable of triggering the information providing server 114 to transmit information on commodities/services offered by the store to the user portable terminal 102 carried by the user visiting the store. The timing providing apparatus 104 has a configuration typically including a presented-information outputting unit 106 and a user-identifier receiver unit 110.

The user-identifier receiver unit 110 is a unit for receiving the user identifier from a user portable terminal 102. To put it concretely, the user-identifier receiver unit 110 reads out the user identifier from a magnetic card or receives the user identifier from typically an IC card, a watch having an IC chip embedded therein, an accessory including such a chip, or a mobile telephone by a radio communication or receives the user identifier from a mobile telephone by an infrared communication.

The presented-information outputting unit 106 is a unit for outputting information received from the information providing server 114 as commodity/service information. With such a configuration, the information can be shown to the user even if the user portable terminal 102 does not have a display unit or the like. To put it concretely, for example, the timing providing apparatus 104 displays a movie content received from the information providing server 114 and outputs a musical content as information to be presented to the user. For a case in which the timing providing apparatus 104 receives information on a plurality of commodities/services from the information providing server 114, the timing providing apparatus 104 may be configured to display the information on all the commodities/services, let the user select some commodities/services from the displayed ones, and transmit the information on the selected commodities/services to the user portable terminal 102. It is to be noted that the information providing server 114 may also transmit information directly to the user portable terminal 102 by way of the communication network 112 without passing the information through the timing providing apparatus 104. In this case, typically, a mobile telephone having display means or the like serves as the user portable terminal 102. In addition, if it is not necessary to output information in the timing providing apparatus 104, the presented-information outputting unit 106 may be eliminated from the timing providing apparatus 104.

The timing providing apparatus 104 quickly transmits a user identifier received by the user-identifier receiver unit 110 to the information providing server 114 by way of the communication network 112. A detailed configuration of the timing providing apparatus 104 will be described later.

The communication network 112 is a network having a function to distribute user identifier and commodity/service information used in the embodiment. Examples of the communication network 112 include the Internet. The communication network 112 can be a wire-communication or a radio-communication network.

The information providing server 114 is an information processing apparatus for providing users utilizing the information providing system 100 with commodity/service information. The information providing server 114 receives a user identifier transmitted by the timing providing apparatus 104 by way of the communication network 112 and provides information on every recommended commodity/service, which is recommended according to the user's preference, to a user identified by the identifier by way of the user portable terminal 102 and/or the timing providing apparatus 104.

In accordance with the information providing system 100 having the configuration described above, when a user visits a store offering commodities/services, the timing providing apparatus 104 receives the user identifier from the user portable terminal 102, being notified that the user is visiting the store. Then, the timing providing apparatus 104 transmits the user identifier to the information providing server 114 in order to notify the information providing server 114 that the user is visiting the store. Receiving the user identifier from the timing providing apparatus 104, the information providing server 114 is capable of transmitting information on every recommended commodity/service, which are provided according to each user's preference identified by the identifier, to the user portable terminal 102 by way of the timing providing apparatus 104 or directly. That is to say, with the arrival of the user at the store used as a trigger, some commodities/some services are selected from every commodity/service, which are offered by the store, and information on the selected commodities/services can then be given to the user. As a result, since the user can receive information on its own preference selected from every commodity/service, which are available in the store visited presently by the user, it is quite within the bounds of higher possibility that the information given to the user can be utilized effectively.

Figure 15:
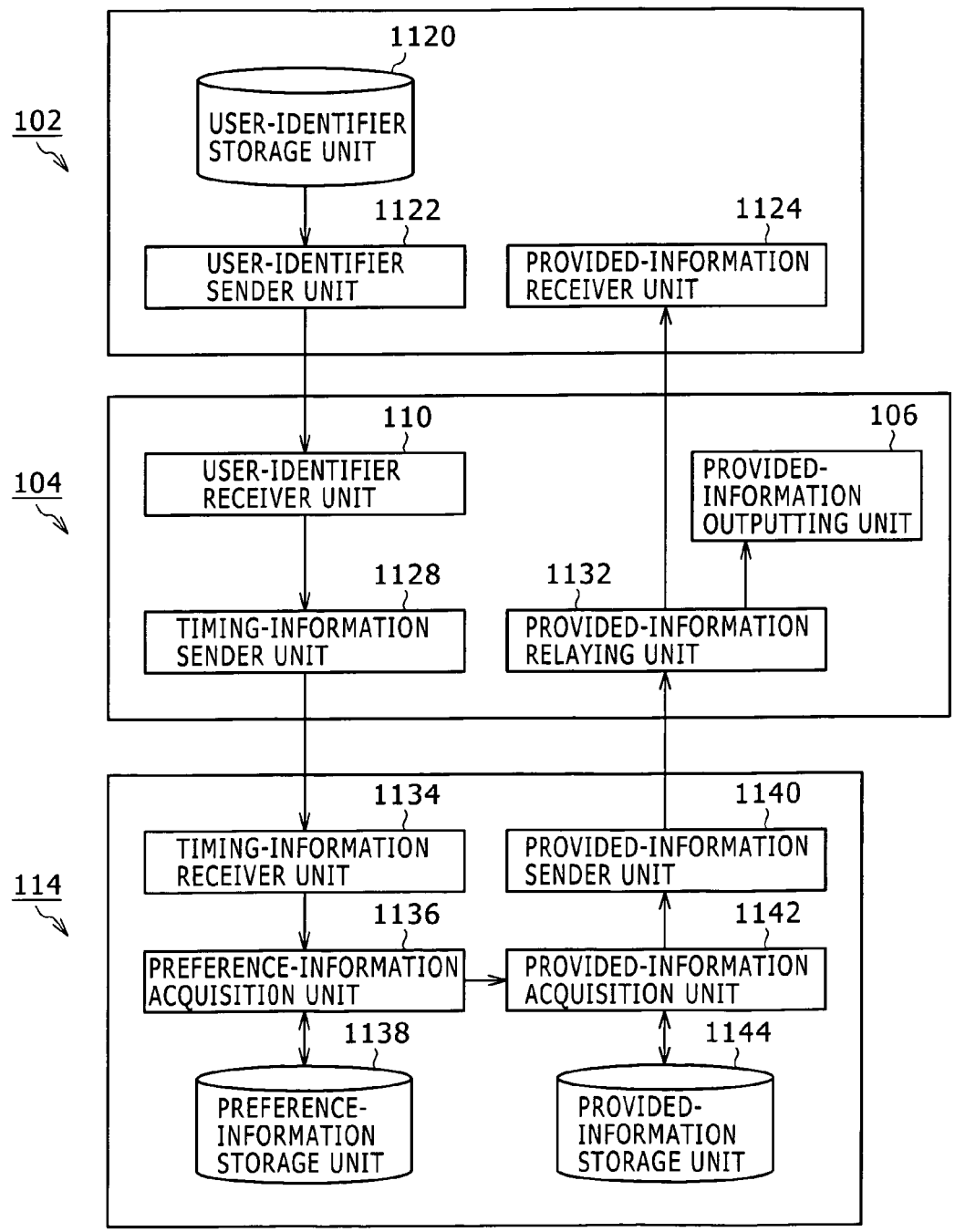
FIG. 15 is a block diagram showing the configurations of a user portable terminal, a timing providing apparatus, and an information providing server, which are included in a first embodiment implementing an information providing system.

The entire configuration of the information providing system 100 has been described so far. Next, by referring to FIG. 15, the following description explains the functional configurations of the user portable terminal 102, the timing providing apparatus 104, and the information providing server 114.

First of all, the hardware configurations of the user portable terminal 102, the timing providing apparatus 104, and the information providing server 114 are described briefly. Typically, the user portable terminal 102, the timing providing apparatus 104, and the information providing server 114 each have a CPU, a ROM, a RAM, and a hard disk.

The CPU is a section functioning as a processing unit as well as a control unit, which are capable of controlling processes carried out by other components employed in the user portable terminal 102, the timing providing apparatus 104, or the information providing server 114. The ROM and the RAM are memories for temporarily storing information such as data related to processing carried out by the CPU and a program executed by the CPU.

The hard disk is configured typically as a hard-disk drive or a flash memory to serve as a storage unit used for storing information including an OS (Operating System) and a variety of application programs. The hard disk has a configuration typically including a user-identifier storage unit 1120, a preference-information storage unit 1138, and a presented-information storage unit 1144, which will be described later. It is to be noted that each of the user-identifier storage unit 1120, the preference-information storage unit 1138, the presented-information storage unit 1144, and other memory portions can also be implemented as a ROM and/or a RAM instead of a portion of the hard disk.

If the user portable terminal 102 is a magnetic card or the like, the CPU and some other components can be eliminated from the user portable terminal 102. If the user portable terminal 102 is a mobile telephone having IC chips, an IC card having such chips or the like, an EEPROM is employed. In this case, the user-identifier storage unit 1120 can be included in the EEPROM.

Next, the functional configurations are explained. The user portable terminal 102 has a configuration typically including the user-identifier storage unit 1120, a user-identifier sender unit 1122, and a presented-information receiver unit 1124. The user-identifier storage unit 1120 is a memory used for storing a user identifier uniquely identifying the user in the information providing system 100. The user-identifier sender unit 1122 is a unit for reading out the user identifier from the user-identifier storage unit 1120 and transmitting the identifier to the timing providing apparatus 104.

The presented-information receiver unit 1124 functions as a unit for receiving information transmitted by the information providing server 114 by way of the timing providing apparatus 104 as commodity/service information.

The timing providing apparatus 104 has a configuration typically including a user-identifier receiver unit 110, a timing-information sender unit 1128, a presented-information outputting unit 106, and a presented-information relaying unit 1132.

The user-identifier receiver unit 110 functions as a unit for receiving the user identifier from the user portable terminal 102 as described above. The user-identifier receiver unit 110 passes on a received user identifier to the timing-information sender unit 1128.

The timing-information sender unit 1128 functions as a unit for transmitting a user identifier received from the user-identifier receiver unit 110 to the information providing server 114. Let us keep in mind that it is desirable to transmit the user identifier from the timing-information sender unit 1128 to the information providing server 114 right after the timing-information sender unit 1128 receives the identifier from the user-identifier receiver unit 110.

The presented-information relaying unit 1132 functions as a unit for receiving commodity/service information from the information providing server 114 as information to be presented to a user. Information received by the presented-information relaying unit 1132 from the information providing server 114 as information to be transmitted to the user portable terminal 102 is based on information to be described later as user's preference. The information based on user's preference may include discount coupons of every commodity/service, which are each recommended by the information providing server 114 as user's preference, features of the commodities/services, or a place provided in a store as a place for exhibiting the commodities/services. In accordance with this configuration, a company offering commodities/services is capable of providing not only information requested by a user, but also information on every commodity/service, which are each recommended as user's preference. Thus, sales of the commodities/services can be promoted.

As described above, the presented-information outputting unit 106 functions as a unit for providing the user with information received from the information providing server 114 as commodity/service information and outputting sounds to be heard by the user.

The information providing server 114 has a configuration typically including a timing-information receiver unit 1134, a preference-information acquisition unit 1136, a preference-information storage unit 1138, a presented-information sender unit 1140, a presented-information acquisition unit 1142, and a presented-information storage unit 1144. The timing-information receiver unit 1134 functions as a unit for receiving a user identifier transmitted by the timing providing apparatus 104 by way of the communication network 112.

The preference-information acquisition unit 1136 functions as a unit for acquiring user's preference information stored in the preference-information storage unit 1138 on the basis of the user identifier received by the timing-information receiver unit 1134. The preference-information storage unit 1138 functions as a memory used for storing user's preference information. To put it concretely, for example, the preference-information storage unit 1138 is used for storing preference information and a user identifier associated with the information for each user identifier. As shown in FIG. 16, the preference-information storage unit 1138 has a configuration typically including a user-identifier column 1150 for storing user IDs, which each identify a user registered as a member, in advance and a preference-information column 1152 used for storing pieces of user's preference information associated with the user identifier identifying the user. The user's preference include preference, which were recorded when the user was registered as a member, and preferences extracted from purchasing records of the user.

The presented-information storage unit 1144 functions as a memory used for storing information to be provided to a user as commodity/service information. To put it concretely, as described earlier, the commodity/service information typically includes features and concrete substances of the commodities/services, places each provided in a store as a place for exhibiting the commodities/services, discount coupons of the commodities/services, a video content used for showing a portion of a movie to the user on a trial basis, and a musical content used for letting the user to listen to a portion of a piece of music on a trial basis.

The presented-information acquisition unit 1142 functions as a unit for acquiring information on each commodity and/or each service, which serve as user's preference, from the presented-information storage unit 1144 on the basis of information acquired by the preference-information acquisition unit 1136 as information on the user's preference. For example, the presented-information acquisition unit 1142 is capable of searching the presented-information storage unit for commodity/service information by using the information, which is acquired by the preference-information acquisition unit 1136 as preference information, as a keyword. Details of this operation are explained concretely by referring to FIG. 16 as follows. Let us assume for example that the timing-information receiver unit 1134 receives a user identifier of 00003 from the timing providing apparatus 104. In this case, the preference-information acquisition unit 1136 acquires information such as 'Animation' and 'Music' from the preference-information storage unit 1138 as user's preference information identified as the user identifier of 00003. Let us also assume for example that the presented-information storage unit 1144 is used for storing information on videos classified by video genre as commodity/service information. An example of the information on videos is coupons for the videos offered by a rental video store. In this case, the presented-information acquisition unit 1142 is capable of acquiring information stored in the presented-information storage unit 1144 as pieces of information pertaining to the animation and music genres respectively.

The presented-information sender unit 1140 functions as a unit for transmitting information acquired by the presented-information acquisition unit 1142 as commodity/service information to the timing providing apparatus 104. In other words, the presented-information sender unit 1140 transmits commodity/service information to the user portable terminal 102 by way of the timing providing apparatus 104.

Figure 17:
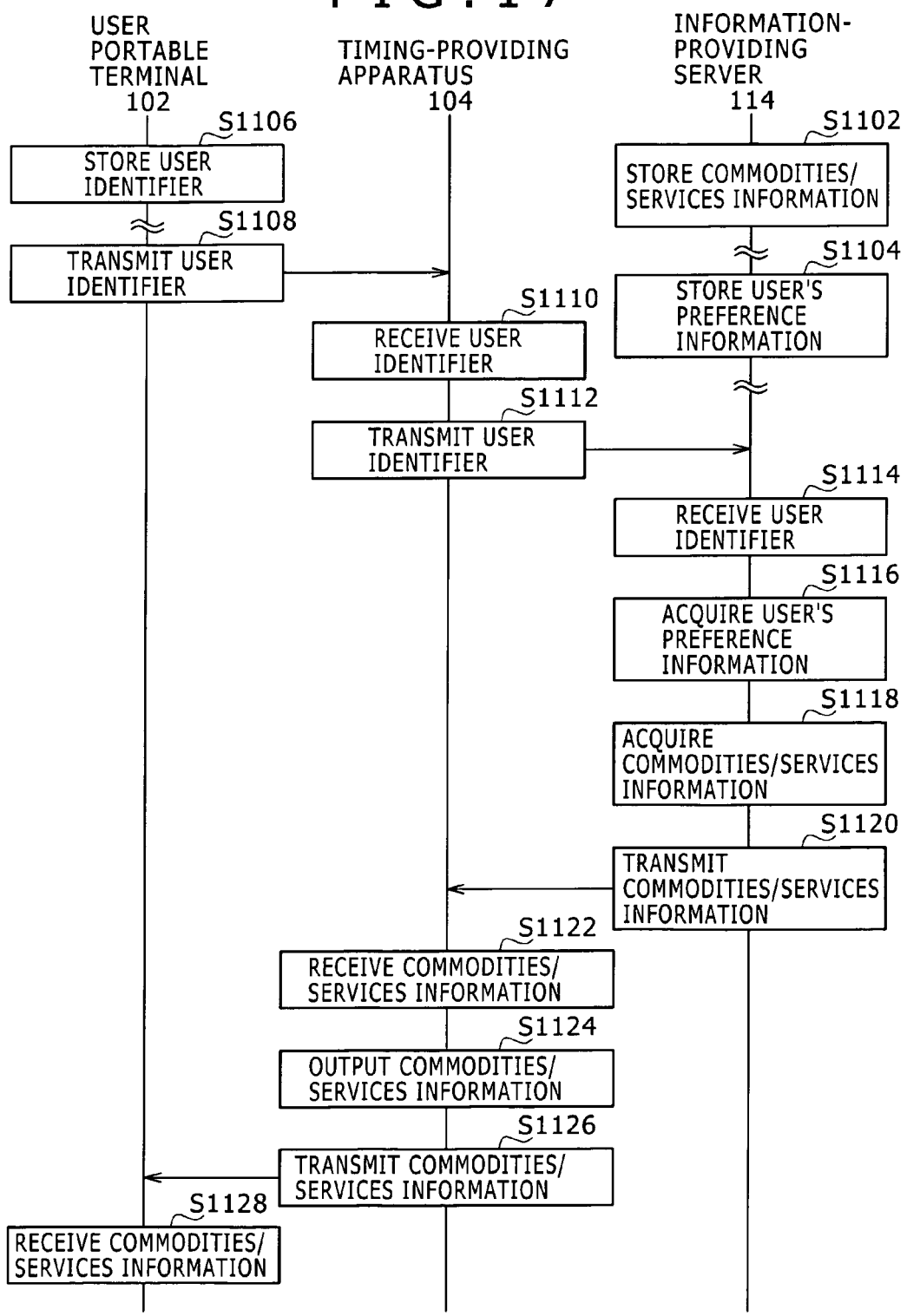
FIG. 17 shows a flowchart representing processing to provide information in the same embodiment.

The functional configurations of the user portable terminal 102, the timing providing apparatus 104, and the information providing server 114 have been explained above. Next, by referring to a flowchart shown in FIG. 17, the following description explains processing carried out by the information providing system 100 according to the embodiment to provide commodity/service information to a user.

The flowchart begins with a step S1102 at which the information providing server 114 stores information on every commodity/service, which can each be provided to the user, in the presented-information storage unit 1144 (S1102). It is to be noted that information to be stored in the presented-information storage unit 1144 may be created in the information providing server 114, transmitted from another computer to the information providing server 114 by way of the communication network 112, or obtained in accordance with another technique. Then, at the next step S1104, the information providing server 114 stores user's preference information in the preference-information storage unit 1138 (S1104). To put it concretely, for example, the stored user's preference information is information based on answers each given by the user as a response to a questionnaire in a process to register the user as a member, purchasing records of the user and/or the like as described before.

At a step S1106, on the other hand, the user portable terminal 102 stores the user identifier (S1106). To put it concretely, for example, the user portable terminal 102 stores a user identifier issued typically in a process to register the user as a member in the user-identifier storage unit 1120. Then, at the next step S1108, when the user arrives at a store, in which the timing providing apparatus 104 has been installed and, when the user holds the user portable terminal 102 over a position in close proximity to the timing providing apparatus 104, for example, the user identifier is capable of being transmitted by the user portable terminal 102 to the timing providing apparatus 104 (S1108).

At a step S1110, the timing providing apparatus 104 receives the user identifier from the user portable terminal 102 (S1110). Then, at the next step S1112, the timing providing apparatus 104 quickly passes on the user identifier to the information providing server 114 (S1112).

At a step S1114, the information providing server 114 receives the user identifier from the timing providing apparatus 104 (S1114). Then, at the next step S1116, the information providing server 114 acquires user's preference information identified by the received user identifier from the preference-information storage unit 1138 (S1116). Subsequently, at the next step S1118, the information providing server 114 acquires information on every commodity/service, which are each regarded as a user's preference on the basis of the user's preference information, from the presented-information storage unit 1144 (S1118). Then, at the next step, the information providing server 114 transmits the commodity/service information to the timing providing apparatus 104 (S1120). It is desirable to have the information providing server 114 carry out the processes of the steps S1114 to S1120 promptly. That is to say, right after receiving the user identifier from the timing providing apparatus 104, it is desirable to have the information providing server 114 transmit the commodity/service information to the user portable terminal 102 by way of the timing providing apparatus 104.

At a step S1122, the timing providing apparatus 104 receives the commodity/service information from the information providing server 114 as information to be provided to the user (S1122). If necessary, the timing providing apparatus 104 outputs the commodity/service information by displaying video information and generating audio information for the commodity/service information (S1124). Then, at the next step S1126, the timing providing apparatus 104 passes on the commodity/service information to the user portable terminal 102 (S1126). At a step S1128, the user portable terminal 102 receives the commodity/service information (S1128). In this way, the user is capable of obtaining typically useful user's preference information itself as information that can be utilized in the store immediately.

It is to be noted that the timing providing apparatus 104 and the information providing server 114 can be integrated to form a single apparatus having the functions of both the timing providing apparatus 104 and the information providing server 114. Even in this case, the single apparatus having such a configuration can be implemented in the information providing system 100 according to the embodiment.

The above description has explained the flowchart representing the processing carried out by the information providing system 100 according to the embodiment to provide commodity/service information to a user.

By providing the information providing system 100 according to the first embodiment with the configuration described above, it is possible to provide a user visiting a store or the like offering commodities/services with information on every commodity/service, which are each inferred to be a information useful to the user, as information readily usable in the store or the like as well as user's preference information. That is to say, it is possible to provide a user with information suitable for the user with timing proper for the user.

Second Embodiment

A second embodiment implements an information-providing system 1200 capable of selecting user's preference information from information on every commodity/service, which are each related to a specific place, when the user passes through the place and capable of providing the user with the user's preference information.

Figure 18:
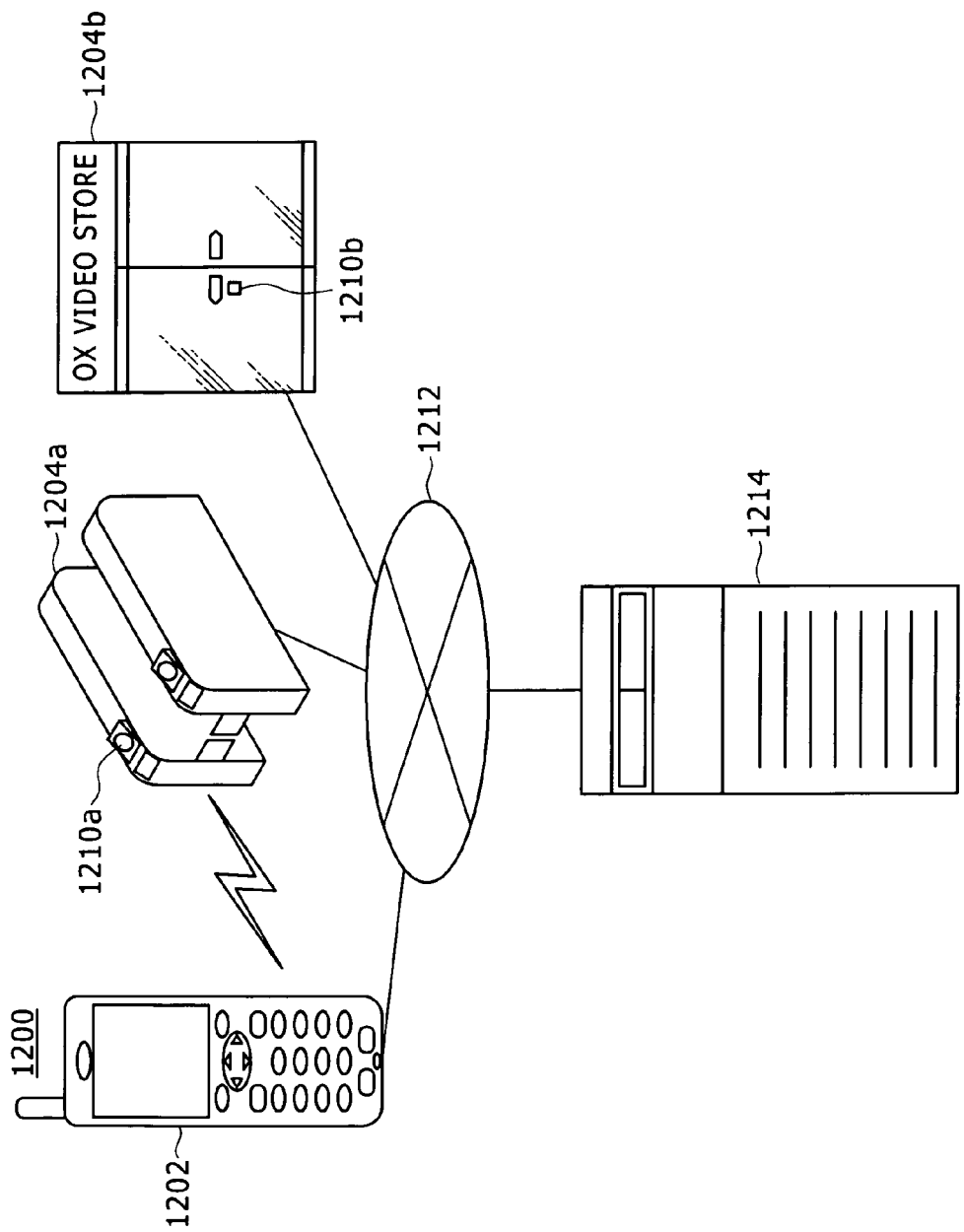
FIG. 18 is an explanatory diagram showing the overall configuration of an information providing system according to a second embodiment.

First of all, the entire configuration of the information-providing system 1200 according to the embodiment is explained by referring to FIG. 18. As shown in the figure, the information-providing system 1200 has a configuration typically including a user portable terminal 1202, timing providing apparatus 1204a, 1204b, land so on, a communication network 1212 as well as an information-providing server 1214.

The user portable terminal 1202 is an information terminal used for storing an identifier for uniquely identifying the user making use of the information-providing system 1200. The user portable terminal 1202 is capable of driving the timing providing apparatus 1204, which will be described later, to recognize the user identifier. The user portable terminal 1202 is capable of receiving commodity/service information from the information-providing server 1214 also to be described later. The user identifier is typically a user ID assigned to the user in a process to register the user as a member. The user portable terminal 1202 functions as a unit that can be connected to the communication network 1212. It is desirable to provide a user portable terminal 1202 that has such a size and such a weight that the user portable terminal 1202 can be carried by the user with ease. Examples of the user portable terminal 1202 are a mobile telephone and a PDA (Personal Digital Assistant). In particular, if the user portable terminal 1202 is a terminal capable of carrying out non-contact communications with the timing-providing apparatus 1204 in order to transmit the user identifier to the timing-providing apparatus 1204, such a user portable terminal 1202 is convenient for the user in that the user needs only to hold the user portable terminal 1202 over a location in close proximity to the timing-providing apparatus 1204. Examples of such a user portable terminal 1202 are a mobile telephone having IC chips embedded therein and a PDA. It is to be noted that the non-contact communication between the user portable terminal 1202 and the timing-providing apparatus 1204 is a communication in which the user portable terminal 1202 is not brought into physical contact with the timing-providing apparatus 1204. Even if the user portable terminal 1202 is brought into physical contact with the timing-providing apparatus 1204, the user portable terminal 1202 is not brought into electrical contact with the timing-providing apparatus 1204.

The timing-providing apparatus 1204a, 1204b, and so on, which are each referred to hereafter simply a timing-providing apparatus 1204, are each connected to the information-providing server 1214 by the communication network 1212 and each function as an information processing apparatus for notifying the information-providing server 1214 of timing to provide information to the user. In this embodiment, the timing-providing apparatus 1204 is incorporated as a part of an automatic ticket gate of a station, an entrance door of a store, or the like as shown in the figure. As an alternative, the timing-providing apparatus 1204 is installed at a special-commodity sales department of a store or any other location in the store. By placing the timing-providing apparatus 1204 at such a place, the timing-providing apparatus 1204 is capable of acquiring the user identifier from the user portable terminal 1202 when the user passes through or visits the place and transmitting the user identifier to the information-providing server 1214 along with an apparatus identifier identifying the timing-providing apparatus 1204. That is to say, the timing-providing apparatus 1204 is capable of providing a trigger to the information providing server 1214. The trigger is to provide information on every commodity/service, which are each relevant to the place to which the timing providing apparatus is set, to a user passing through or visiting the place. The timing-providing apparatus 1204 has user-identifier receiver units 1210a, 1210b, and so on, which are each referred to hereafter simply as a user-identifier receiver unit 1210.

The user-identifier receiver unit 1210 functions as a unit for receiving the user identifier from the user portable terminal 1202. To put it concretely, for example, the user-identifier receiver unit 1210 receives the user identifier from an IC chip, which is embedded in a mobile telephone or a PDA, by a radio communication. As another example, the user-identifier receiver unit 1210 receives the user identifier from a mobile telephone or the like by an infrared communication.

The timing-providing apparatus 1204 quickly transmits a user identifier received by the user-identifier receiver unit 1210 to the information-providing server 1214 by way of the communication network 1212. A detailed configuration of the timing-providing apparatus 1204 will be described later.

The communication network 1212 is a network having a function to distribute the user identifier and commodity/service information. Examples of the communication network 1212 include Internet. The communication network 112 can be a wire-communication or a radio-communication network.

The information-providing server 1214 functions as an information processing apparatus for providing commodity/service information to users utilizing the information-providing system 1200. The information-providing server 1214 receives the user identifier from a timing-providing apparatus 1204, which transmits the identifier to the information-providing server 1214 through the communication network 1212. The information-providing server 1214 also receives the identifier of an apparatus from the timing-providing apparatus 1204, which transmits the identifier to the information-providing server 1214 also through the communication network 1212. The identifier of an apparatus is an identifier for identifying the timing-providing apparatus 1204. The information-providing server 1214 then transmits information on recommended commodities/services identified by the user identifier as user's preference to the user portable terminal 1202 selected respectively from every commodity/service, which are relevant to the timing-providing apparatus 1204 identified by the apparatus identifier.

In accordance with the information-providing system 1200 having the configuration described above, when a user passes through a specific place, the timing-providing apparatus 1204 recognizes the fact that the user has passed through the place by receiving the user identifier from a user portable terminal 1202. Then, the timing-providing apparatus 1204 transmits the user identifier and the identifier of its own to the information-providing server 1214 by associating the identifiers with each other in order to notify the information-providing server 1214 of the fact that the user has passed through the specific place. The information-providing server 1214 receives the user identifier and the identifier of the timing-providing apparatus 1204 from the timing-providing apparatus 1204. Then, the information-providing server 1214 transmits information on recommended commodities/services to the user portable terminal 1202. The recommended commodities/services are selected respectively from every commodity/service, which are each relevant to the timing-providing apparatus 1204 identified by the apparatus identifier according to the user's preference identified by the user identifier. That is to say, the event that the user is passing through the specific place is used as a trigger to provide the user with information on every commodity/service, which is selected respectively from all commodities/services relevant to the place, as commodities/services suitable for the user. As a result, since the user can receive information on its own preference selected from every commodity/service, which are each relevant to the place visited presently by the user, it is quite within the bounds of higher possibility that the information given to the user can be utilized effectively.

Figure 19:
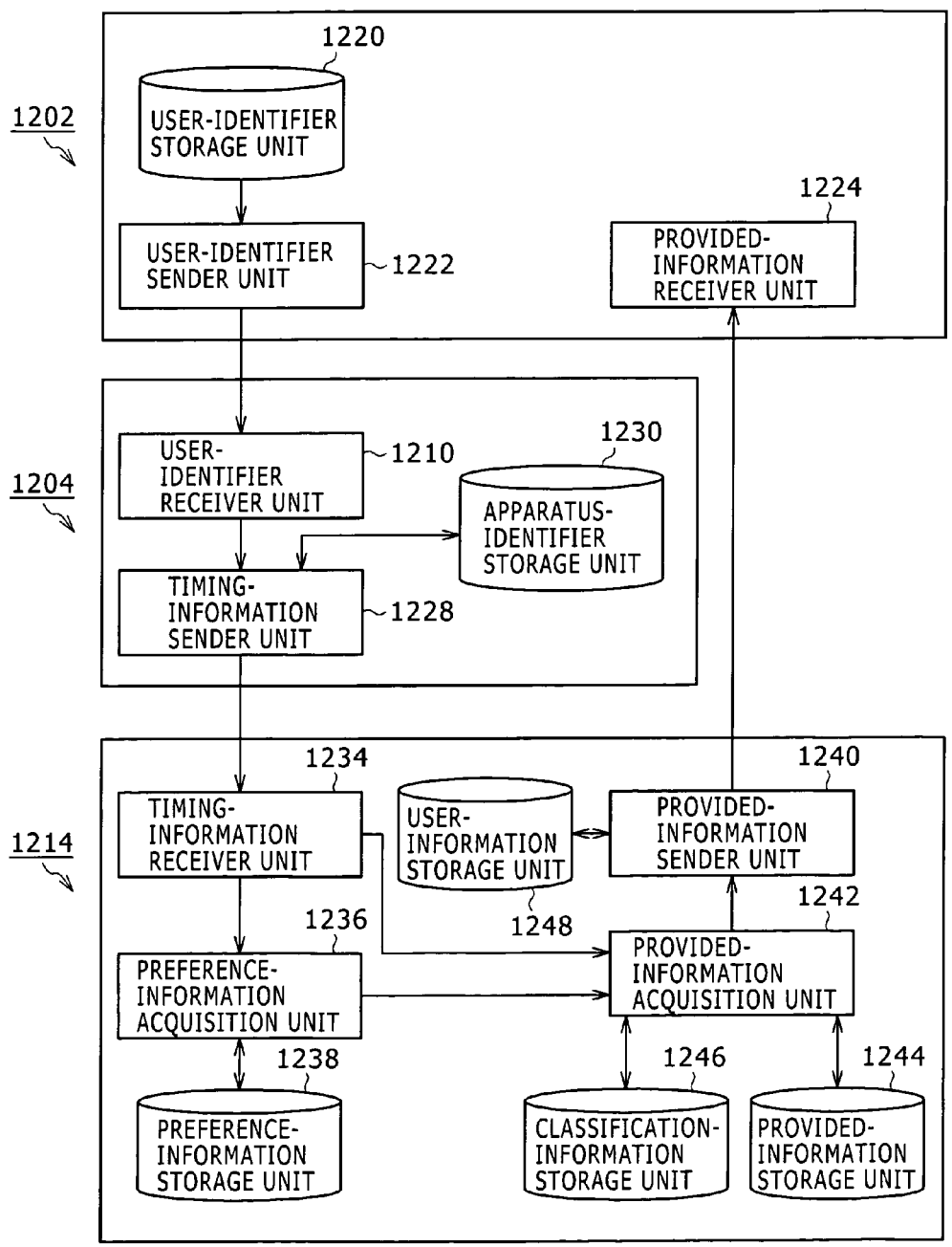
FIG. 19 is a block diagram showing the configurations of a user portable terminal, a timing providing apparatus, and an information providing server, which are included in the same embodiment.

The entire configuration of the information-providing system 1200 has been explained above. Next, by referring to FIG. 19, the following description explains the functional configurations of the user portable terminal 1202, the timing-providing apparatus 1204, and the information-providing server 1214. It is to be noted that, since the hardware configurations are all but the same as those of the corresponding ones according to the first embodiment, the explanation of the hardware configurations is omitted.

The user portable terminal 1202 has a configuration typically including a user-identifier storage unit 1220, a user-identifier sender unit 1222, and a presented-information receiver unit 1224. The user-identifier storage unit 1220 functions as a memory used for storing a user identifier uniquely identifying a user in the preference-information gathering system 1200. The user-identifier sender unit 1222 functions as a unit for acquiring the user identifier from the user-identifier storage unit 1220 and transmits the identifier to the timing-providing apparatus 1204.

The presented-information receiver unit 1224 functions as a unit for receiving information transmitted by the information-providing server 1214 by way of the communication network 1212 as commodity/service information.

The timing-providing apparatus 1204 has a configuration typically including a user-identifier receiver unit 1210, a timing-information sender unit 1228, and an apparatus-identifier storage unit 1230.

The user-identifier receiver unit 1210 functions as a unit for receiving the user identifier from the user portable terminal 1202 and passing on the identifier to the timing-information sender unit 1228.

The apparatus-identifier storage unit 1230 functions as a memory used for storing an identifier uniquely identifying the timing-providing apparatus in the information-providing system 1200. In other words, if a plurality of timing-providing apparatus 1204 exist in the information-providing system 1200, identifiers each unique to one of the timing-providing apparatus 1204 are used for distinguishing the timing-providing apparatus 1204 from each other.

The timing-information sender unit 1228 functions as a unit for transmitting a user identifier received from the user-identifier receiver unit 1210 and the apparatus identifier read out from the apparatus-identifier storage unit 1230 to the information-providing server 1214 by associating the identifiers with each other. It is to be noted that the timing-providing apparatus 1204 may also employ a transmission determining unit (not shown) for producing a result of determination as to whether or not a user identifier can be transmitted to the information-providing server 1214 on the basis of the user identifier.

The information-providing server 1214 has a configuration typically including a timing-information receiver unit 1234, a preference information acquisition unit 1236, a user-information storage unit 1248, a presented-information sender unit 1240, a presented-information acquisition unit 1242, a presented-information storage unit 1244, a classification-information storage unit 1246, and a user information storage unit 1248. Since the preference-information updating unit 1236 and the preference-information storage unit 1238 have all but the same functions as respectively the preference-information acquisition unit 1136 and the preference-information storage unit 1138, which are employed in the first embodiment, no explanations of them are given. In addition, the function of the timing-information receiver unit 1234 is almost the same as that of the timing-information receiver unit 1134 employed in the first embodiment except that the timing-information receiver unit 1234 also receives the apparatus identifier from the timing-providing apparatus 1204 besides the user identifier.

The presented-information storage unit 1244 functions as a memory for storing information on every commodity/service, which is to be provided to users. To put it concretely, the stored commodity/service information typically includes features and concrete substances of the commodities/services, places each provided in a store as a place for exhibiting the commodities/services and discount coupons of the commodities/services. The stored information is classified on the basis of predetermined criteria into categories associated with their respective classification codes to be explained later. The classification codes are also stored along with the information. As will be described later, the predetermined criteria are places related to the commodity/service information.

The classification-information storage unit 1246 functions as a memory for storing, among others, information on each place, at which a timing-providing apparatus 1204 is installed. The classification-information storage unit 1246 and the presented-information storage unit 1244 are explained in detail by referring to FIGS. 20 and 21 respectively.

As shown in FIG. 20, the classification-information storage unit 1246 is used for storing every apparatus identifier, every classification code, and every classification substance by associating each other. The classification-information storage unit 1246 has an apparatus-identifier column 1260 used for storing the identifiers each identifying a timing-providing apparatus 1204. For each of the apparatus identifiers, a classification-substance column 1264 is used for storing an apparatus installation place or at which a timing-providing apparatus 1204 identified by the apparatus identifier is installed. A classification-code column 1262 includes a code obtained as a result of classifying classification substances on the basis of a predetermined reference. In the case of this embodiment, the code is a classification code identifying the classification substance. In accordance with a first row shown in FIG. 20, for example, a timing-providing apparatus 1204 identified by an apparatus identifier of 00001 is installed at the south gate of Shinjuku Station, which is classified as a classification substance identified by a classification code of S01.

On the other hand, as shown in FIG. 21, the presented-information storage unit 1244 is used for storing every classification code mentioned above and pieces of commodity/service information by associating the classification code with the pieces of information with each other. The classification-code column 1262 stores a classification code corresponding to the classification code 1262 in the classification-information storage unit 1246. For each of the classification codes, a commodity/service-information column 1270 is used for storing the pieces of information. As shown in the figure, the pieces of information include a commodity exhibition place and a coupon. To put it concretely, according to FIG. 20 and FIG. 21, the classification code of S01 represents the south gate of Shinjuku Station and information on every commodity/service, which are each available at the south gate of Shinjuku Station. The commodity/service information includes information on new arrivals at I Department Store, information on an S camera store introduced as a new commodity, and a discount coupon offered by M Restaurant.

The presented-information acquisition unit 1242 functions as a unit for acquiring information on every commodity/service, which is suitable for a user, by selecting the information from pieces of commodity/service information. The commodity/service information is information corresponding to a classification code associated with an apparatus identifier received from the timing-providing apparatus 1204. To put it in more detail, the presented-information acquisition unit 1242 receives the identifier of the timing-providing apparatus 1204 from the timing-information receiver unit 1234 and user's preference information from the preference-information updating unit 1236. Then, the presented-information acquisition unit 1242 selects information matching the user's preference information from the information on every commodity/service, which are each relevant to a timing-providing apparatus 1204 identified by the received identifier of the timing-providing apparatus 1204, and acquires the selected information from the presented-information storage unit 1244. In accordance with the configuration described above, the information providing server 1214 is capable of changing information to be provided to a user, depending on the timing providing apparatus identified by an apparatus identifier.

To put it concretely, let us assume for example that the presented-information acquisition unit 1242 receives an apparatus identifier of 00001 and 'electrical appliances' as preference information. In this case, first of all, the presented-information acquisition unit 1242 acquires a classification code of S01 associated with the apparatus identifier of 00001 from the classification-information storage unit 1246.

Then, the presented-information acquisition unit 1242 searches the information stored in the presented-information storage unit 1244 by being put on a row associated with the classification code of S01 as commodity/service information by using the phrase of 'electrical appliances' or a similar phrase as a keyword for information matching the keyword. As a result of the search process, for example, information on an S camera store is obtained.

The presented-information sender unit 1240 functions as a unit for acquiring the user identifier as well as information to be provided to the user as commodity/service information from the presented-information acquisition unit 1242 and transmitting the information to the user. In the process to transmit the information to the user portable terminal 1202 carried by the user, the presented-information sender unit 1240 refers to the user-information storage unit 1248. The user-information storage unit 1248 functions as a memory for storing the identifier of every user and the identifier of every user portable terminal 1202 by associating the identifiers with each other. The user identifier portable terminal 1202 is typically the mail address of the user portable terminal 1202.

The above description has explained the functional configurations of the user portable terminal 1202, the timing-providing apparatus 1204, and the information-providing server 1214. Next, by referring to a flowchart shown in FIG. 22, the following description explains processing carried out by the information-providing system 1200 according to the embodiment to provide a user with commodity/service information.

The flowchart begins with a step S1200 at which the information-providing server 1214 stores a classification information associating the timing-providing apparatus 1204 and the installation place of the timing-providing apparatus 1204 in the classification-information storage unit 1246 (S1200). Then, at the next step S1202, the information-providing server 1214 stores commodity/service information as information that can be provided by the information-providing server 1214 to users in the presented-information storage unit 1244 (S1202). Subsequently, at the next step S1203, the information-providing server 1214 stores information on users in the user-information storage unit 1248 (S1203). The information on users includes the identifier of each user and the mail address of a user portable terminal 1202. Then, the information-providing server 1214 stores the user's preference information in the preference-information storage unit 1238 (S1204). To put it concretely, for example, in a process to register a user as a member, the information-providing server 1214 stores an address, which is received from the user as the mail address of the user portable terminal 1202, in the user-information storage unit 1248 as information on the user. As user's preference information, the information-providing server 1214 stores typically answers each given by the user as a response to a questionnaire in the process to register the user as a member, purchasing records of the user in the preference-information storage unit 1238, and/or the like.

At a step S1206, on the other hand, the user portable terminal 1202 stores the user identifier (S1206). To put it concretely, for example, the user portable terminal 1202 stores a user identifier issued to the user in a process to register the user as a member in the user-identifier storage unit 1220. Then, at the next step S1208, when the user passes through the installation place of the timing-providing apparatus 1204, for example, the user portable terminal 1202 transmits the user identifier to the timing-providing apparatus 1204 (S1208).

At a step S1210, the timing-providing apparatus 1204 receives the user identifier from the user portable terminal 1202 (S1210). Then, at the next step S1212, the timing-providing apparatus 1204 promptly transmits the user identifier and an apparatus identifier identifying the timing-providing apparatus 1204 to the information-providing server 1214 (S1212).

At a step S1214, the information-providing server 1214 receives the user identifier and the apparatus identifier from the timing-providing apparatus 1204 (S1214). Then, at the next step S1216, the information-providing server 1214 acquires user's preference information identified by the user identifier from the preference-information storage unit 1238 (S1216). Subsequently, at the next step S1218, the information-providing server 1214 acquires a classification code associated with the identifier of the timing-providing apparatus 1204 (S1218). Then, at the next step, the information-providing server 1214 acquires information from the presented-information storage unit 1244 as information on every commodity/service, which are each available at the installation place of the timing-providing apparatus 1204 and suitable for the user, on the basis of the classification code and the user's preference information (S1220). Subsequently, at the next step S1222, the information-providing server 1214 transmits the information on every commodity/service to the user portable terminal 1202 (S1222).

At a step S1224, the user portable terminal 1202 receives the information on every commodity/service (S1224). In this way, the user can obtain information on every commodity/service, which is offered at the present location of the user as user's preference.

The above description has explained the flowchart representing the processing carried out by the information-providing system 1200 according to the embodiment to provide a user with commodity/service information.

By providing the information-providing system 1200 according to the embodiment with the configuration described above, a user passing through a specific place can obtain information inferred to be useful for the user each relevant to the specific place and/or serve as user's preference. That is to say, information appropriate for a user can be provided to the user with timing proper for the user. It is to be noted that the functions of the user portable terminal, the timing-providing apparatus, and the information-providing server can be carried out by execution of computer programs, which can be provided by using recording mediums for recording the programs in such a way that the programs can be read out by a computer from the mediums for execution. The above description has explained the information-providing system 1200. Next, an electronic-value distribution system 100 is described.

3. Electronic-Value Distribution System

First Embodiment

A first embodiment implements an electronic-value distribution system 100 capable of distributing electronic coupons each serving as a typical electronic value to a plurality of users by allowing a user to transfer an electronic coupon to another user. In a process to transfer an electronic coupon from a user to another one, the electronic-value distribution system 100 is also capable of reflecting information on a transferred electronic coupon in user's preference information involved in the process.

An electronic value is information provided by a provider of commodities/services to customers as information having a financial value. An example of the electronic value is electrical information representing a discount coupon given by a provider of commodities/services to a customer as a coupon making the customer entitled to a discount on a commodity or a service. Such information is referred to as an electronic coupon. Another example of the electronic value is points given in accordance with the value of a commodity and/or a service by a provider of commodities/services to a customer purchasing a commodity and/or a service as information making the customer entitled to a discount on a commodity or a service in a next shopping or allowing the customer to exchange the information with a gift. Information on an electronic value is typically a keyword serving as the identifier of the value or indicating the substance the value. Thus, information on an electronic value is information indicating what the electronic value is.

First of all, the entire configuration of the electronic-value distribution system 100 according to the embodiment is explained by referring to FIG. 1. The electronic-value distribution system 100 has a configuration typically including user portable terminals 102a and 102b, an electronic-value distribution apparatus 104, a communication network 112 as well as an electronic-value issuing server 114.

The user portable terminals 102a, 102b, and so on are each an information terminal used for storing an identifier for uniquely identifying the user making use of the electronic-value distribution system 100 and for storing electronic coupons. As described above, an electronic coupon is electrical information on a discount coupon on a commodity and/or a service. The user portable terminals 102a, 102b, and so on are each referred to hereafter simply as a user portable terminal 102. The user portable terminal 102 is capable of transmitting the user identifier and an electronic coupon to the electronic-value distribution apparatus 104 to be described later. It is desirable to provide a user portable terminal 102 that has such a size and such a weight that the user portable terminal 102 can be carried by the user with ease. Examples of the user portable terminal 102 are a magnetic card, an IC card, a mobile telephone, a PDA (Personal Digital Assistant), a watch having an embedded IC chip, and an accessory including such a chip.

The user portable terminal 102 according to the embodiment has a storage unit used for storing the user identifier and a storage unit for used storing electronic coupons. The example of the user portable terminal is a card embedded IC chip and mobile telephone. The user portable terminal 102 is capable of carrying out non-contact communications with the electronic-value distribution apparatus 104. The non-contact communication between the user portable terminal 102 and the electronic-value distribution apparatus 104 is a communication in which the user portable terminal 102 is not brought into physical contact with the electronic-value distribution apparatus 104. Even if the user portable terminal 102 is brought into physical contact with the electronic-value distribution apparatus 104, the user portable terminal 102 is not brought into electrical contact with the electronic-value distribution apparatus 104. If the user portable terminal 102 is a terminal capable of carrying out non-contact communications with the electronic-value distribution apparatus 104 in order to transmit the user identifier and an electronic coupon to the electronic-value distribution apparatus 104, such a user portable terminal 102 is convenient for the user in that the user needs only to hold the user portable terminal 102 over a location in close proximity to the electronic-value distribution apparatus 104. Thus, the non-contact communication is a radio communication. Let us keep in mind, however, that it is desirable to mainly carry out a non-contact communication only within a narrow range of the order of about 10 cm in conformity with the NFC (Near Field Communication) standards specifying an RF carrier frequency of 13.56 MHz and a maximum communication speed of 212 Kbps.

The electronic-value distribution apparatus 104 is an information processing apparatus capable of exchanging electronic coupons with the user portable terminal 102 as well as transmitting distribution information of an electronic coupon to the electronic-value issuing server 114, which functions as an apparatus for providing electronic coupons to users, by way of the communication network 112 connecting the electronic-value distribution apparatus 104 to the electronic-value issuing server 114. The electronic-value distribution apparatus 104 allows an electronic coupon to be transferred from any user portable terminal 102 to others among two or more user portable terminals 102 so as to distribute electronic values to users of the terminals 102.

The distribution information of an electronic coupon is typically information indicating which user has transferred an electronic coupon to another user, which electronic coupon has been transferred by a user to another, and which user has received a transferred electronic coupon from another user. To put it concretely, the distribution information of an electronic coupon is a combination of information such as identifiers each identifying a user and keywords, which each represent the identifier and substance of an electronic coupon. By letting the electronic-value distribution apparatus 104 provide distribution information of an electronic coupon to the electronic-value issuing server 114, the electronic-value issuing server 114 is capable of grasping the state of distribution of the electronic coupon and, hence, inferring a change in user's preference. On the basis of a change in user's preference, the electronic-value issuing server 114 is thus capable of determining information such as an electronic coupon to be issued to the user next time.

In the embodiment, the electronic-value distribution apparatus 104 employs a non-contact communication unit 110 for exchanging an electronic coupon with the user portable terminal 102 in a non-contact communication. If the user portable terminal 102 is an IC card having no display unit for displaying the substance of an electronic coupon, for example, the electronic-value distribution apparatus 104 may employ a display unit 106 for displaying the substance of an electronic coupon received from the user portable terminal 102. In addition, the electronic-value distribution apparatus 104 may also employ an electronic-coupon selection unit 108 for letting the user select a specific one from electronic coupons displayed on the display unit 106. Typically, the selected specific electronic coupon is a desired coupon or a coupon that the user wants to transfer to another user. The electronic-coupon selection unit 108 is typically an input unit such as a keyboard, a touch panel, and a mouse. The electronic-coupon selection unit 108 is thus an input unit allowing the user to select a desired electronic coupon among those appearing on the display unit 106.

The communication network 112 is a network having a function to transmit information including the user identifier and an electronic coupon. Examples of the communication network 112 include the Internet. The communication network 112 can be a wire-communication or a radio-communication network.

The electronic-value issuing server 114 is an information processing apparatus for issuing an electronic coupon to a user utilizing the electronic-value distribution system 100 as a coupon according to a user's preference. The electronic-value issuing server 114 is capable of receiving a user identifier and information, which are transmitted by the electronic-value distribution apparatus 104 to the electronic-value issuing server 114 by way of the communication network 112, as respectively an identifier identifying a user and distribution information of an electronic coupon. The electronic-value issuing server 114 is also capable of reflecting the distribution information of an electronic coupon in user's preference and transmitting an electronic coupon according to user's preference to the user portable terminal 102.

By virtue of the configuration described above, the electronic-value distribution system 100 allows an electronic coupon to be transferred from a user portable terminal 102 to another user portable terminal 102 by way of the electronic-value distribution apparatus 104. In addition, by having the electronic-value distribution apparatus 104 transmit the state of a transfer of an electronic coupon to the electronic-value issuing server 114 as distribution information of the electronic coupon, the electronic-value issuing server 114 is capable of knowing the state of distribution of the electronic coupon as a post-issuance state other than the state of utilization of the coupon. By letting the electronic-value issuing server 114 know the state of a transfer of an electronic coupon, the electronic-value issuing server 114 is capable of reflecting a change in user's preference in an electronic coupon issued next time.

Figure 23:
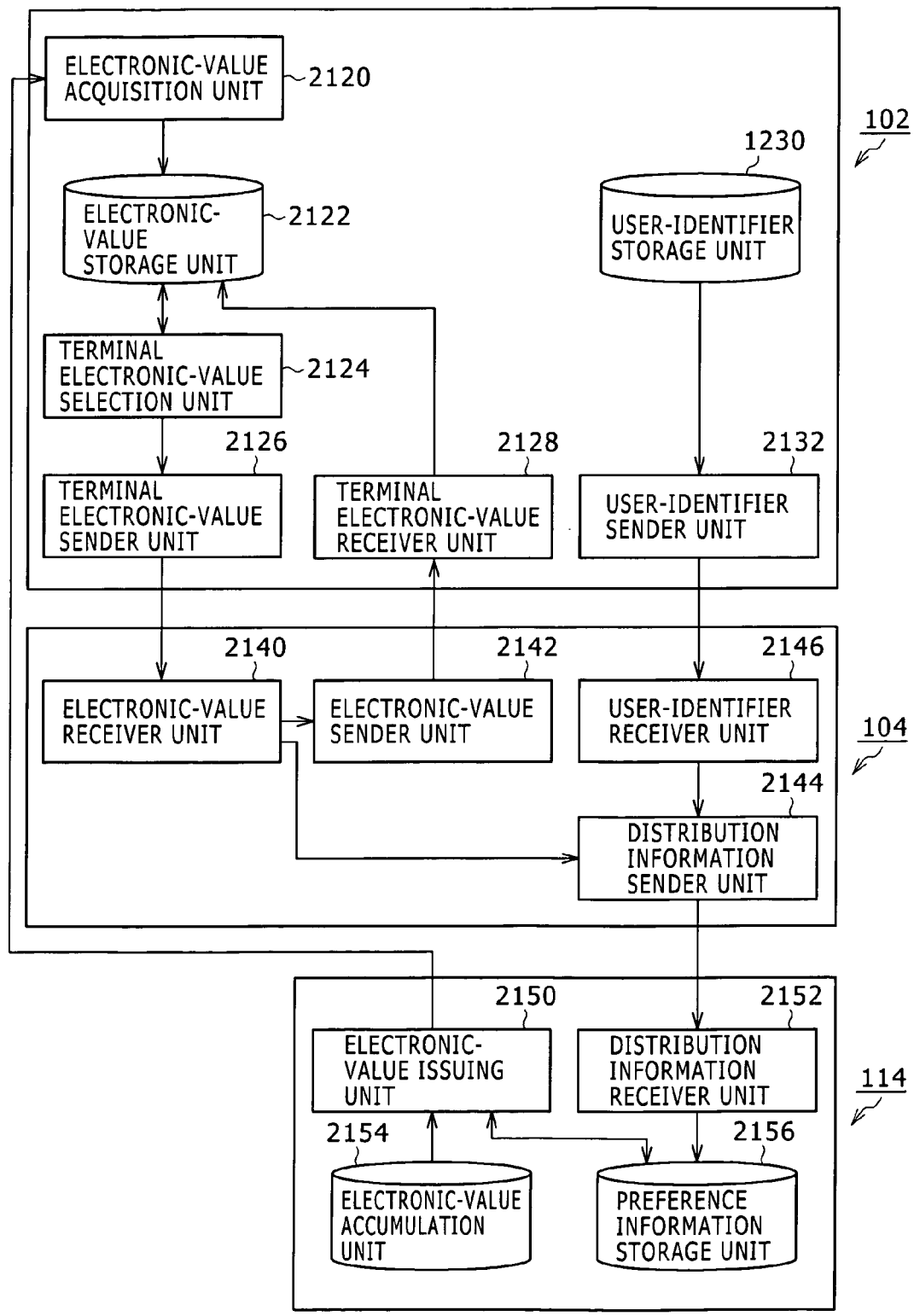
FIG. 23 is a block diagram showing the configurations of a user portable terminal, an electronic-value distribution apparatus, and an electronic-value issuing server, which are included in a first embodiment implementing an electronic-value distribution system.

The entire configuration of the electronic-value distribution system 100 has been described above. It is to be noted that the electronic-value issuing server 114 and the electronic-value distribution apparatus 104 can also be integrated into a single apparatus. Next, the functional configurations of the user portable terminal 102, the electronic-value distribution apparatus 104, and the electronic-value issuing server 114 are explained by referring to FIG. 23.

First of all, the hardware configurations of the user portable terminal 102, the electronic-value distribution apparatus 104, and the electronic-value issuing server 114 are explained briefly. Typically, the user portable terminal 102, the electronic-value distribution apparatus 104, and the electronic-value issuing server 114 each have a CPU, a ROM, a RAM, and a hard disk.

The CPU is a section functioning as a processing unit as well as a control unit, which are capable of controlling processes carried out by other components employed in the user portable terminal 102, the electronic-value distribution apparatus 104, and the electronic-value issuing server 114. The ROM and the RAM are memories for temporarily storing information such as data related to processing carried out by the CPU and a program executed by the CPU.

The hard disk is configured typically as a hard-disk drive or a flash memory to serve as a storage unit used for storing information including an OS (operating System) and a variety of application programs. The hard disk has a configuration typically including an electronic-value storage unit 2122, a user-identifier storage unit 2130, an electronic-value accumulation unit 2154, and a preference-information storage unit 2156, which will be described later. It is to be noted that each of the electronic-value storage unit 2122, the user-identifier storage unit 2130, the electronic-value accumulation unit 2154, the preference-information storage unit 2156, and other memory portions can also be implemented as a ROM and/or a RAM instead of a portion of the hard disk.

In addition, if the user portable terminal 102 is a magnetic card or the like, the CPU and other components may be omitted from the configuration of the user portable terminal 102. If the user portable terminal 202 is a mobile telephone having IC chips, an IC card having such chips or the like, an EEPROM is employed. In this case, the electronic-value storage unit 2122 and the user-identifier storage unit 2130 can be included in the EEPROM.

Next, the functional configurations are explained. The user portable terminal 102 has a configuration typically including an electronic-value acquisition unit 2120, an electronic-value storage unit 2122, a terminal electronic-value selection unit 2124, a terminal electronic-value sender unit 2126, a terminal electronic-value receiver unit 2128, the user-identifier storage unit 2130, and a user-identifier sender unit 2132.

The electronic-value acquisition unit 2120 functions as a unit for acquiring an electronic value from the electronic-value issuing server 114 and storing the value in the electronic-value storage unit 2122. To put it concretely, for example, the electronic-value acquisition unit 2120 receives an electronic coupon, which is transmitted by the electronic-value issuing server 114 as an email or the like to the user portable terminal 102 by way of the communication network 112 and the electronic-value acquisition unit 2120 stores the coupon in the electronic-value storage unit 2122.

The electronic-value storage unit 2122 functions as a memory used for storing electronic values. The electronic-value storage unit 2122 is used for storing electronic coupons, which are each a coupon selected and issued by the electronic-value issuing server 114 from those stored in an electronic-value accumulation unit 2154 employed in the electronic-value issuing server 114 as a coupon agreeing with user's preference. The electronic-value storage unit 2122 and the electronic-value accumulation unit 2154 are described by referring to FIG. 25 as follows.

As shown in FIG. 25, the electronic-value accumulation unit 2154 includes an identifier column 2170, a service column 2172, and an electronic-value column 2174. The identifier column 2170 is used for storing service identifiers each associated with electronic coupons stored on the electronic-value column 2174. The service column 2172 is used for storing service names each associated with one of the service identifiers. For each of the service identifiers, the electronic-value column 2174 is used for storing electronic coupons associated with the identifier. A service identifier is typically an identifier identifying a company issuing electronic coupons to be associated with the service identifier. The name of the company is stored in the service column 2172. Thus, for each of the service identifiers, the electronic-value column 2174 is used for storing electronic coupons issued by a company identified by the service identifier as coupons associated with the identifier. When the electronic-value issuing server 114 issues an electronic coupon to a user registered as a member of a service having its name associated with a service identifier, typically, the electronic-value issuing server 114 selects a coupon from those associated with the service identifier on the basis of user's preference as a coupon to be issued to the user.

The electronic-value storage unit 2122 is used for storing electronic coupons issued by the electronic coupon issuing server 124. As shown in FIG. 25, the electronic-value storage unit 2122 includes an identifier column 2180 and an electronic-value column 2184. The identifier column 2180 is used for storing service identifiers each associated with electronic coupons. For each of the service identifiers, the electronic-value column 2184 is used for storing electronic coupons. To put it concretely, for example, when the electronic-value acquisition unit 2120 receives a service identifier and an electronic coupon from the electronic-value issuing server 114, the electronic coupon is stored on the electronic-value storage unit 2122 by associating with the service identifier.

Let us refer back to FIG. 23 to continue the explanation of the user portable terminal 102. The terminal electronic-value selection unit 2124 functions as a unit for requesting the user to select a desired electronic coupon from those stored in the electronic-value storage unit 2122. To put it concretely, let us assume that the user portable terminal 102 is a mobile telephone, a PDA, or the like and has input means. In this case, the terminal electronic-value selection unit 2124 requests the user to select a desired electronic coupon by operating the input means or the like. The desired electronic coupon is a coupon that the user wants to transfer to another user. Then, the terminal electronic-value selection unit 2124 acquires the selected electronic coupon from the electronic-value storage unit 2122 and supplies the coupon to the terminal electronic-value sender unit 2126. By having the configuration described above, the terminal electronic-value sender unit 2126 is capable of transmitting only an electronic coupon desired by the user even if the electronic-value storage unit 2122 contains a plurality of stored electronic values.

The terminal electronic-value sender unit 2126 functions as a unit for transmitting an electronic coupon received from the terminal electronic-value selection unit 2124 to the electronic-value distribution apparatus 104.

The terminal electronic-value receiver unit 2128 functions as a unit for receiving an electronic coupon from the electronic-value distribution apparatus 104. Thus, as described above, the user portable terminal 102 is capable of transmitting an electronic coupon to the electronic-value distribution apparatus 104 and receiving an electronic coupon from the electronic-value distribution apparatus 104. In this way, a plurality of user portable terminals 102 each having an electronic coupon are capable of exchanging the coupons through the electronic-value distribution apparatus 104.

The user-identifier storage unit 2130 functions as a memory used for storing an identifier uniquely identifying the user. The user-identifier sender unit 2132 functions as a unit for reading out the user identifier from the user-identifier storage unit 2130 and transmitting the identifier to the electronic-value distribution apparatus 104.

The electronic-value distribution apparatus 104 has a configuration typically including an electronic-value receiver unit 2140, an electronic-value sender unit 2142, a distribution-information sender unit 2144, and a user-identifier receiver unit 2146. The electronic-value receiver unit 2140 functions as a unit for receiving an electronic coupon from the user portable terminal 102 and passing on the coupon to the electronic-value sender unit. The electronic-value receiver unit 2140 also supplies information on the received electronic coupon to the distribution-information sender unit 2144. As described before, the information on the received electronic coupon includes an identifier identifying the coupon and a keyword representing the substance of the coupon.

The electronic-value sender unit 2142 functions as a unit for transmitting an electronic coupon received from the electronic-value receiver unit to a user portable terminal 102.

The user-identifier receiver unit 2146 functions as a unit for receiving the user identifier from a user portable terminal 102 and passing on the identifier to the distribution-information sender unit. When the electronic-value receiver unit receives an electronic coupon from the user portable terminal 102, the user-identifier receiver unit 2146 also receives the user identifier from the same user portable terminal 102 and passes on the identifier to the distribution-information sender unit 2144 as the user identifier serving as the sender of the coupon. In addition, when the electronic-value sender unit 2142 transmits an electronic coupon to a user portable terminal 102 serving as the recipient of the transferred coupon, the user-identifier receiver unit 2146 receives the user identifier from the recipient of the transferred coupon and passes on the identifier to the distribution-information sender unit 2144 as the user identifier serving as the recipient of the transferred coupon.

The distribution-information sender unit 2144 functions as a unit for receiving information on an electronic coupon from the electronic-value receiver unit 2140. Also, the distribution-information sender unit 2144 functions as a unit for receiving the user identifier carrying a user portable terminal 102 serving as the sender of the coupon from the user-identifier receiver unit 2146 and the user identifier carrying a user portable terminal 102 serving as the receiver of the coupon. Then, the distribution-information sender unit 2144 transmits the three pieces of information to the electronic-value issuing server 114 by associating the pieces of information with each other to form distribution information of electronic coupons.

It is to be noted that the distribution information transmitted by the distribution-information sender unit 2144 to the electronic-value issuing server 114 may include only either the user identifier carrying a user portable terminal 102 serving as the sender of a received electronic coupon or the user identifier carrying a user portable terminal 102 serving as the receiver of a transferred coupon.

In addition, the electronic-value distribution apparatus 104 may include the electronic-value selection unit (not shown) described above.

The electronic-value issuing server 114 has a configuration typically including an electronic-value issuing unit 2150, a distribution-information receiver unit 2152, the electronic-value accumulation unit 2154, and the preference-information storage unit 2156. The distribution-information receiver unit 2152 functions as a unit for receiving distribution information of electronic coupons from the electronic-value distribution apparatus 104 and updating information stored in the preference-information storage unit 2156 as user's preference information on the basis of the received distribution information of electronic coupons. By referring to FIG. 24, the following description explains a typical process carried out by the distribution-information receiver unit 2152 to reflect the distribution information of electronic coupons in the user's preference information.

As shown in FIG. 24, the preference-information storage unit 2156 includes a user-identifier column 2160 and a preference-information column 2162 associated each other. The user-identifier column 2160 is used for storing user IDs of users, which are each registered as a member in advance. The preference-information column 2162 is used for storing user's preference information. The user's preference information is information based on answers each given by the user as a response to a questionnaire or the like for example in a process to register the user as a member, purchasing records of the user, and/or a result of reflecting distribution information as will be described later.

As described above, the distribution-information sender unit 2152 updates the preference-information storage unit 2156. In an example shown in FIG. 24, the distribution-information sender unit 2152 receives distribution information from the electronic-value distribution apparatus 104. The distribution information includes the user identifier "0004" of originating the transferred electronic coupon, the user identifier "0003" of receiving the transferred electronic coupon, and the information "Foreign SF" of electronic coupon. In this case, the distribution-information sender unit 2152 deletes the "Foreign SF" electronic-coupon information from the user's preference information identified by the identifier of 00004 as a user of originating the transferred electronic coupon. On the other hand, the distribution-information sender unit 2152 adds the Foreign SF electronic-coupon information to the user's preference information identified by the identifier of 00003 as a user of receiving the transferred electronic coupon.

The electronic-value issuing unit 2150 functions as a unit for acquiring user's preference information from the preference-information storage unit 2156, acquiring an electronic coupon according to the user's preference information from the electronic-value accumulation unit 2154, and transmitting the coupon to a user portable terminal 102. By referring to FIGS. 24 and 25, the following description concretely explains a typical process to determine an electronic coupon to be issued to a user on the basis of user's preference information.

Let us assume for example that an attempt is made to issue an electronic coupon to a user identified by the identifier of 00003. In this case, first of all, the electronic-value issuing unit 2150 acquires user-preference information associated with the user identifier of 00003 from the preference-information storage unit 2156. For example, the user-preference information associated with the user identifier of 00003 includes Foreign SF and Foreign animation. Then, the electronic-value issuing unit 2150 searches the electronic-value accumulation unit 2154 by using keywords such as Foreign film, SF, and Foreign animation for electronic values corresponding to the keywords. Let us assume for example that the electronic-value issuing unit 2150 finds a foreign-animation discount coupon in the search process. In this case, the electronic-value issuing unit 2150 transmits the foreign-animation discount coupon to the user portable terminal 102 carried by the user identified by the identifier of 00003.

It is to be noted that the user-preference information acquired from the preference-information storage unit 2156 can also be used as a basis for carrying out a data-mining process or the like in order to recognize a trend of user's preference. Then, the electronic-value accumulation unit 2154 can be searched for an electronic coupon matching the trend of user's preference. As an alternative, instead of acquiring an electronic coupon from the electronic-value accumulation unit, an electronic coupon can also be acquired typically from an information processing apparatus employed by a company connected to the electronic-value issuing server 114 by the communication network 112 as a company for issuing electronic coupons to users.

Figure 26:
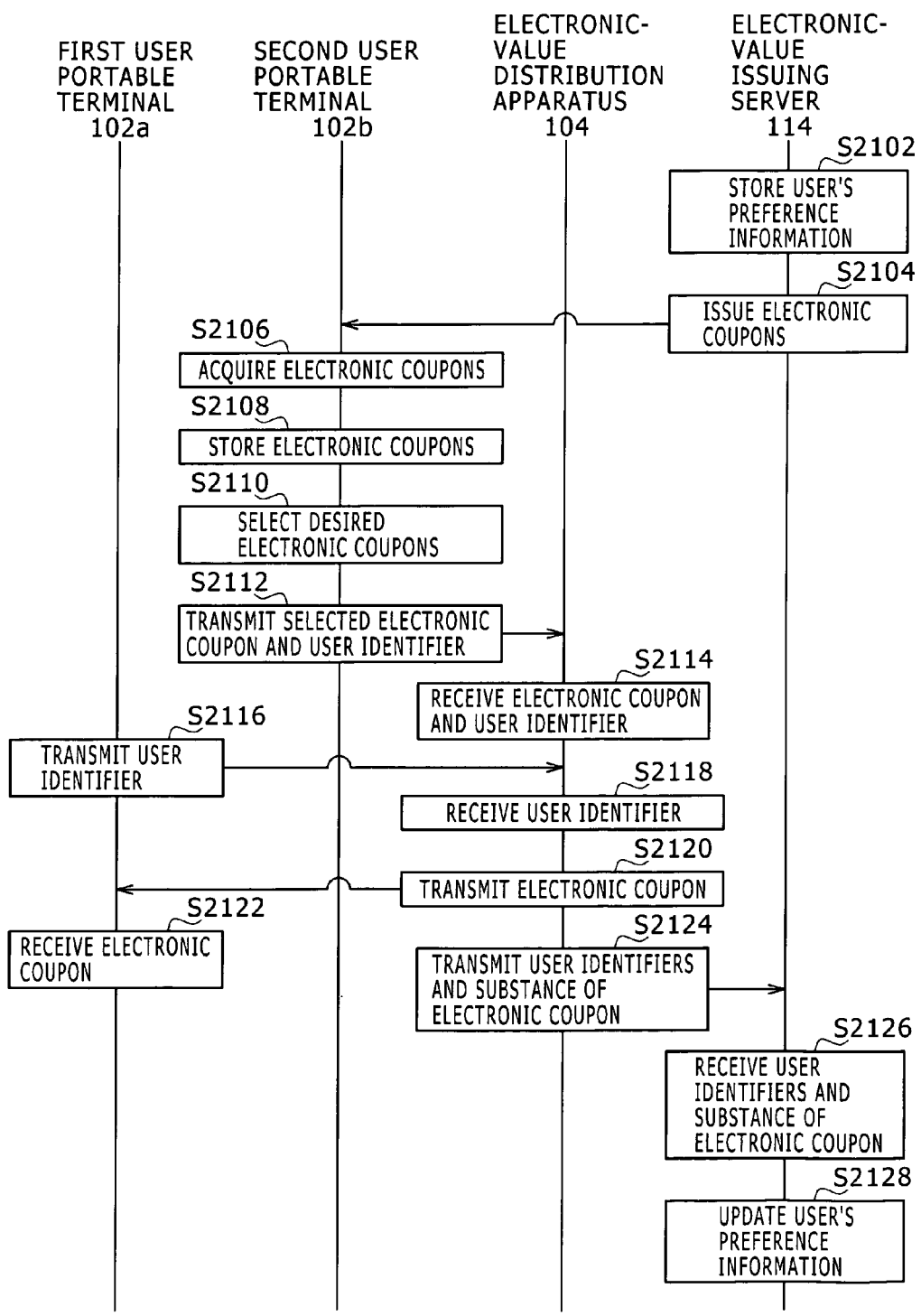
FIG. 26 shows a flowchart representing processing to distribute electronic values to users in the same embodiment.

The above description has explained the functional configurations of the user portable terminal 102, the electronic-value issuing server 114, and the electronic-value distribution apparatus 104. Next, by referring to a flowchart shown in FIG. 26, the following description explains processing carried out in the electronic-value distribution system 100 according to the embodiment to exchange an electronic coupon between user portable terminals 102 and processing to transmit distribution information of the electronic coupon.

The flowchart begins with a step S2102 at which the electronic-value issuing server 114 stores user's preference information in the preference-information storage unit 2156 (S2102). Then, for example, the electronic-value issuing server 114 transmits electronic coupons to a second user portable terminal 102*b* as coupons each matching a user's preference identified by a user identifier (S2104). At a step S2106, the second user portable terminal 102*b* receives the electronic coupons (S2106) and stores the coupons in the electronic-value storage unit 2122 (S2108).

Then, the user selects a desired coupon from those stored in the electronic-value storage unit 2122 for example by operating an input unit employed in the second user portable terminal 102 (S2110). Subsequently, the second user portable terminal 102*b* transmits the electronic coupon selected by the user to the electronic-value distribution apparatus 104 (S2112). At a step S2114, the electronic-value distribution apparatus 104 receives the electronic coupon and the user identifier from the second user portable terminal 102*b* (S2114). Then, a first user portable terminal 102*a* supposed to receive the electronic coupon transmitted from the second user portable terminal 102*b* to the electronic-value distribution apparatus 104 transmits the user identifier (S2116). At a step S2118, the electronic-value distribution apparatus 104 receives the user identifier from the first user portable terminal 102*a* (S2118). Then, the electronic-value distribution apparatus 104 transmits the electronic coupon received from the second user portable terminal 102*b* to the first user portable terminal 102*a* (S2120). At a step S2122, the first user portable terminal 102*a* receives the electronic coupon from the electronic-value distribution apparatus 104 (S2122). At this step, the process to transfer the electronic coupon from the second user portable terminal 102*b* to the first user portable terminal 102*a* is ended.

Then, the electronic-value distribution apparatus 104 transmits the user identifier received from the second user portable terminal 102*b*, the user identifier received from the first user portable terminal 102*a* and information on the transferred electronic coupon to the electronic-value issuing server 114 by associating the identifiers and the information with each other (S2124). At a step S2126, the electronic-value issuing server 114 receives the two user identifiers and the information on the transferred electronic coupon from the electronic value distribution apparatus 104 (S2126). Then, the electronic-value issuing server 114 updates the preference-information storage unit 2156 on the basis of the two user identifiers and the information on the transferred electronic coupon (S2128).

The above description has explained the processing carried out in the electronic-value distribution system 100 according to the embodiment to exchange an electronic coupon between the user portable terminals 102 and the processing to transmit distribution information of the electronic coupon.

By providing the electronic-value distribution system 100 according to the first embodiment with the configuration described above, 2 or more users are capable of transferring and exchanging an electronic coupon from one to another by using the user portable terminals 102 and the electronic-value distribution apparatus 104 in order to distribute coupons to them. In addition, by having the electronic-value distribution apparatus 104 transmit information on an electronic coupon transferred in a transfer process and the identifiers of users involved in the transfer process to the electronic-value issuing server 114, the electronic-value issuing server 114 is capable of grasping the state of distribution of an exchanged or transferred electronic coupon. As a result, the electronic-value issuing server 114 is capable of reflecting the state of the distribution in user's preference information referred at the time of issuing electronic coupon.

Second Embodiment

A second embodiment implements an electronic-value distribution system 2200 which handles an electronic coupon as a typical electronic value, allows a user to exchange an unneeded electronic coupon with a desired electronic coupon, and is capable of reflecting information on an electronic coupon exchanged during an exchange process in user's preference information involved in the exchange process.

Since the entire configuration of the electronic-value distribution system 2200 is all but the same as the configuration of the electronic-value distribution system 100 according to the first embodiment, no explanation of the entire configuration of the electronic-value distribution system 2200 is given. It is to be noted that, in the case of the second embodiment, reference numerals 2202, 2204, and 2214 denote respectively the user portable terminal, the electronic-value distribution apparatus, and the electronic-value issuing server.

Figure 27:
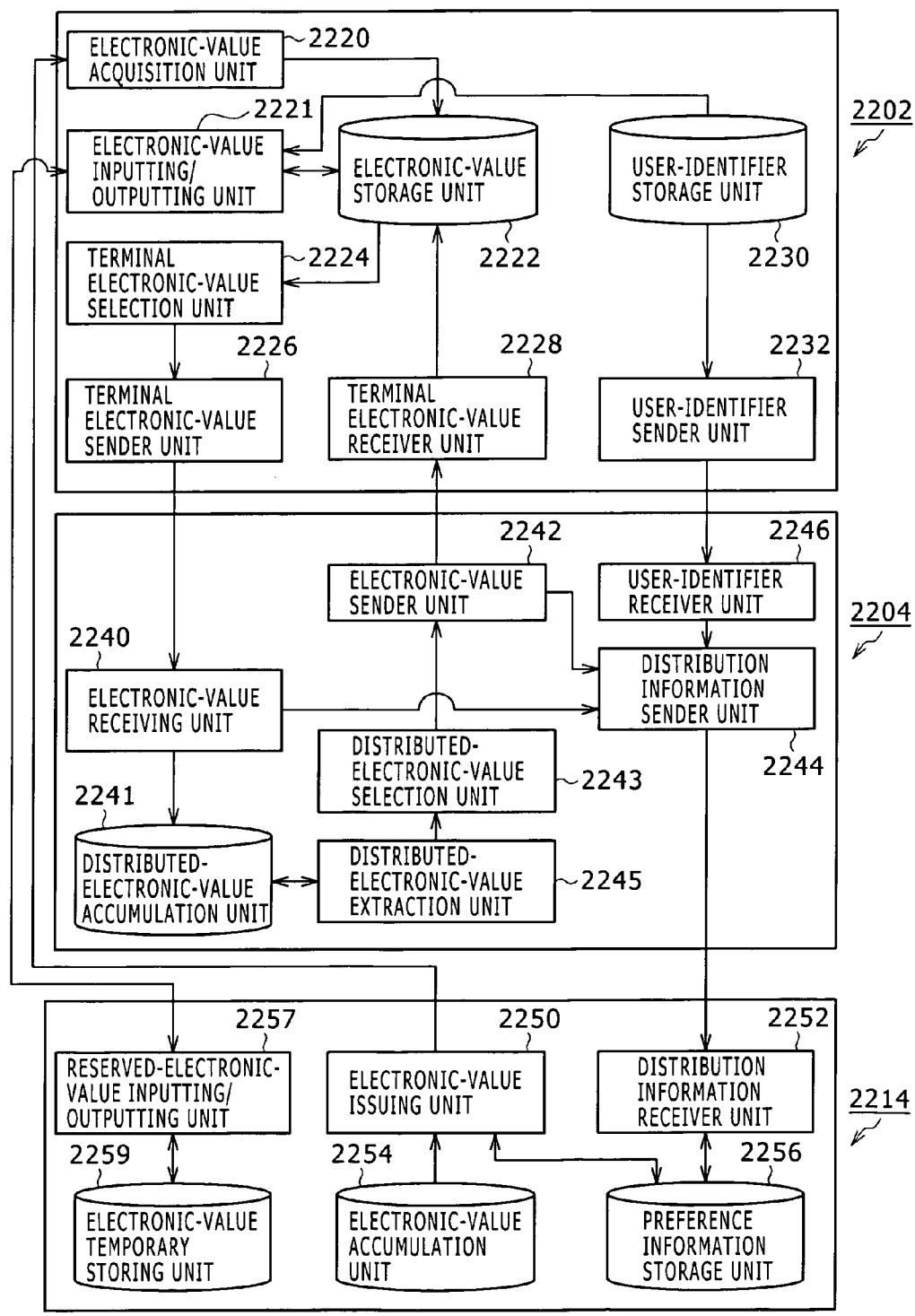
FIG. 27 is a block diagram showing the configurations of a user portable terminal, an electronic-value distribution apparatus, and an electronic-value issuing server, which are included in a second embodiment implementing an electronic-value distribution system.

First of all, the functional configurations of the user portable terminal 2202, electronic-value distribution apparatus 2204, and electronic-value issuing server 2214, which are employed in the second embodiment, are discussed by referring to FIG. 27. It is to be noted that, since the hardware configurations are all but the same as that employed in the first embodiment, no explanation of the hardware configurations is given.

The user portable terminal 2202 has a configuration typically including an electronic-value acquisition unit 2220, an electronic-value inputting/outputting unit 2221, an electronic-value storage unit 2222, a terminal electronic-value selection unit 2224, a terminal electronic-value sender unit 2226, a terminal electronic-value receiver unit 2228, a user-identifier storage unit 2230, and a user-identifier sender unit 2232.

Since the configurations of the electronic-value acquisition unit 2220, the electronic-value storage unit 2222, the terminal electronic-value selection unit 2224, the terminal electronic-value sender unit 2226, the terminal electronic-value receiver unit 2228, the user-identifier storage unit 2230, and the user-identifier sender unit 2232 are all but the same as those of their counterparts employed in the user portable terminal 102 according to the first embodiment, no explanations of them are given.

The electronic-value inputting/outputting unit 2221 functions as a unit for acquiring an electronic coupon from the electronic-value storage unit 2222, transmitting the coupon to the electronic-value issuing server 2214, acquiring an electronic coupon from the electronic-value issuing server 2214, and storing the coupon in the electronic-value storage unit 2222. However, the electronic coupon received by the electronic-value inputting/outputting unit 2221 from the electronic-value issuing server 2214 is a coupon received before by the electronic-value acquisition unit 2220 from the electronic-value issuing server 2214, stored in the electronic-value storage unit 2222, and transmitted by the electronic-value inputting/outputting unit 2221 to the electronic-value issuing server 2214. That is to say, the electronic coupon received by the electronic-value inputting/outputting unit 2221 from the electronic-value issuing server 2214 is not a coupon newly issued, but a coupon already issued from the electronic-value issuing server 2214. For example, when too many electronic coupons are stored in the electronic-value storage unit 2222, exceeding the storage capacity of the electronic-value storage unit 2222, the electronic-value inputting/outputting unit 2221 transmits a coupon stored temporarily in the electronic-value issuing server 2214.

By providing the configuration described above, the user can store only electronic coupons required soon in the electronic-value storage unit 2222 employed in the user portable terminal 2202 and temporarily keep coupons, which are needed but not used soon, in the electronic-value issuing server 2214. The user can then acquire such a coupon from the electronic-value issuing server 2214 and store the coupon in the electronic-value storage unit 2222 when the coupon becomes necessary. Thus, the user is capable of utilizing a number of electronic coupons without regard to the storage size of the electronic-value storage unit 2222 in the user portable terminal 2202, that is, even if the storage capacity of the electronic-value storage unit 2222 is relatively small.

The electronic-value distribution apparatus 2204 has a configuration typically including an electronic-value receiver unit 2240, a distributed-electronic-value accumulation unit 2241, an electronic-value sender unit 2242, a distributed-electronic-value selection unit 2243, a distributed-electronic-value extraction unit 2245, a user-identifier receiver unit 2246, and a distribution-information sender unit 2244.

The electronic-value receiver unit 2240 functions as a unit for receiving an electronic coupon from the user portable terminal 2202 and storing the coupon in the distributed-electronic-value accumulation unit. In addition, the electronic-value receiver unit 2240 supplies information on the electronic coupon received from the user portable terminal 2202 to the distribution-information sender unit 2244.

The distributed-electronic-value accumulation unit 2241 functions as a memory used for accumulating electronic coupons received by the electronic-value receiver unit 2240. In addition, the distributed-electronic-value accumulation unit 2241 is used for accumulating not only electronic coupons received by the electronic-value receiver unit 2240 from the user portable terminal 2202, but also electronic coupons received by the electronic-value distribution apparatus 2204 from the electronic-value issuing server 2214 if necessary. To put it concretely, the distributed-electronic-value accumulation unit 2241 typically has a configuration, which is about the same as that of the electronic-value accumulation unit 2154 explained before by referring to FIG. 25. As shown in the figure, the distributed-electronic-value accumulation unit 2241 thus stores a service identifier of the electronic coupon, a service name corresponding to the identifier, and an electronic coupon.

The distributed-electronic-value extraction unit 2245 functions as a unit for extracting an electronic coupon from the distributed-electronic-value accumulation unit 2241 as a coupon that can be transmitted to the user portable terminal 2202 as a replacement of another electronic coupon received by the electronic-value receiver unit 2240 from the user portable terminal 2202. To put it concretely, the distributed-electronic-value extraction unit 2245 extracts an electronic coupon, which has been issued by the same company issuing the other electronic coupon as evidenced by the fact that the electronic coupon and the other electronic coupon are both associated with the same service identifier. As an alternative, if different companies set predetermined electronic coupons as coupons exchangeable with each other in advance, the distributed-electronic-value extraction unit 2245 is allowed to extract an electronic coupon as a replacement, not only which has been issued by the same company, but also which has been issued by a company other than a company issuing the other electronic coupon as a coupon usable as a replacement for the other coupon. As another alternative, instead of identifying specific electronic coupons as coupons replaceable with each other as described above, the distributed-electronic-value accumulation unit 2241 can also be configured to function as a memory for storing only electronic coupons that can each be used as a replacement. With such a configuration, the distributed-electronic-value extraction unit 2245 can extract any electronic coupon from the distributed-electronic-value accumulation unit 2241.

The distributed-electronic-value selection unit 2243 functions as a unit for letting the user select a desired electronic coupon from those, which have been extracted by the distributed-electronic-value extraction unit 2245 from the distributed-electronic-value accumulation unit 2241 as described above. To put it concretely, let us assume for example that the distributed-electronic-value extraction unit 2245 extracts a plurality of electronic coupons from the distributed-electronic-value accumulation unit 2241 as coupons each transmittable to the user portable terminal 2202 for replacing another electronic coupon received by the electronic-value distribution apparatus 2204 from the user portable terminal 2202. In this case, the distributed-electronic-value selection unit 2243 displays the extracted electronic coupons on a display unit employed in the electronic-value distribution apparatus 2204 and lets the user select one of the displayed coupons by operating typically an electronic-coupon selection unit employed in the electronic-value distribution apparatus 2204.

The electronic-value sender unit 2242 functions as a unit for transmitting an electronic coupon received from the distributed-electronic-value selection unit 2243 to the user portable terminal 2202 as a coupon selected by the user. The electronic-value sender unit 2242 also has a function to provide the distribution-information sender unit 2244 with information on the electronic coupon transmitted to the electronic-value sender unit 2242.

The user-identifier receiver unit 2246 functions as a unit for receiving the user identifier from the user portable terminal 2202 and passing on the identifier to the distribution-information sender unit. When the electronic-value receiver unit receives an electronic coupon from the user portable terminal 2202, the user-identifier receiver unit receives the user identifier from the user portable terminal 2202 and passes on the identifier to the distribution-information sender unit 2244 as the user identifier exchanging the coupon.

The distribution-information sender unit 2244 functions as a unit for receiving information on a received electronic coupon from the electronic-value receiver unit 2240, for receiving the user identifier carrying a user portable terminal 2202 serving as the receiver of the received coupon from the user-identifier receiver unit 2246, for receiving information on a transmitted electronic coupon from the electronic-value sender unit 2242, and for transmitting the three pieces of information to the electronic-value issuing server 2214 by associating the three pieces of information with each other to form distribution information.

It is to be noted that the information transmitted by the distribution-information sender unit 2244 to the electronic-value issuing server 2214 as the distribution information may include either the information on an electronic coupon received from the user portable terminal 2202 or the information on an electronic coupon transmitted to the user portable terminal 2202.

The electronic-value issuing server 2214 has a configuration typically including an electronic-value issuing unit 2250, a distribution information receiver unit 2252, an electronic-value accumulation unit 2254, a preference-information storage unit 2256, a reserved-electronic-value inputting/outputting unit 2257, and an electronic-value temporary storage unit 2259.

Since the electronic-value issuing unit 2250, the distribution information receiver unit 2252, and the preference-information storage unit 2256 have all but the same configurations as their respective counterparts employed in the electronic-value issuing server 114 according to the first embodiment, no explanations are given.

The distribution information receiver unit 2252 functions as a unit for receiving distribution information from the electronic-value distribution apparatus 2204 and updating information stored in the preference-information storage unit 2256 as user's preference information on the basis of the distribution information of electronic coupons. In the case of the first embodiment, the distribution information receiver unit 2252 receives the user identifier serving as the sender of the coupon, the user identifier serving as the receiver of the coupon, and information on the coupon itself. In the case of the second embodiment, on the other hand, the distribution information includes information on the replaced coupon received by the electronic-value distribution apparatus 2204 from a user portable terminal 2202, information on the coupon transmitted to the user portable terminal 2202, and the user identifier carrying the user portable terminal 2202.

Thus, the distribution information receiver unit 2252 updates the preference information associated with the user identifier stored in the preference-information storage unit 2256 on the basis of the received user identifier. To put it concretely, for example, an electronic coupon received by the electronic-value distribution apparatus 2204 as a coupon to be replaced from the user portable terminal 2202 is a coupon no longer needed by a user. In this case, if information on the received electronic coupon is stored as user's preference information, the information is deleted from the user's preference information since the user can be assumed to have no interest in the coupon anymore. As another example, let us assume that a replacement electronic coupon transmitted by the electronic-value distribution apparatus 2204 to the user portable terminal 2202 is a coupon needed by a user. In this case, the information on the transmitted electronic coupon is added to the user's preference information since the user can be assumed to have interest in the coupon.

As described above, by updating the user's preference information as described above, it is possible to reflect changes in user's preference in the user's preference information managed by the electronic-value issuing server 2214. Thus, an electronic coupon better matching user's preference can be issued to the user.

The reserved-electronic-value inputting/outputting unit 2257 functions as a unit for receiving an electronic coupon from the user portable terminal 2202 and storing the coupon in the electronic-value temporary storage unit 2259. In addition, the reserved-electronic-value inputting/outputting unit 2257 also has a function to acquire an electronic coupon from the electronic-value temporary storage unit 2259 and transmit the coupon to the user portable terminal 2202 in accordance with a request received from the user portable terminal 2202.

The electronic-value temporary storage unit 2259 functions as a memory used for storing an electronic coupon received by the reserved-electronic-value inputting/outputting unit 2257 from the user portable terminal 2202 by including the coupon in a coupon group associated with a user. To put it concretely, the electronic-value issuing unit 2250 typically includes a user-identifier column 2260 used for storing the identifiers of users and an electronic-value column 2262 used for storing electronic coupons associated with each of the user identifiers as shown in FIG. 28. Electronic coupons stored on the electronic-value temporary storage unit 2259 are each a coupon already issued by the electronic-value issuing unit 2250 before to a user identified by the user identifier. Such electronic coupons are stored merely on a temporary basis because too many electronic coupons have to be stored in the electronic-value storage unit 2222 employed in the user portable terminal 2202 so that the storage capacity of the electronic-value storage unit 2222 becomes insufficient. In accordance with this configuration, user can temporary store an electronic coupon or the like not needed soon in the electronic-value temporary storage unit.

In addition, the reserved-electronic-value inputting/outputting unit 2257 may also store a user identifier, received electronic coupon, a transmitted electronic coupon, and an electronic-coupon transmitting and receiving date/time on a log of electronic-value inputs/outputs. By storing them on a log, the electronic-value issuing server 2214 is capable of grasping the input/output states of electronic coupons issued to each user.

The above description has explained the functional configurations of the user portable terminal 2202, electronic-value distribution apparatus 2204, and electronic-value issuing server 214. Next, by referring to a flowchart shown in FIG. 29, the following description explains processing carried out by the electronic-value distribution apparatus 2204 employed in the electronic-value distribution system 2200 according to the embodiment to replace an electronic coupon with another and to process distribution information.

The flowchart begins with a step S2200 at which the electronic-value distribution apparatus 2204 accumulates electronic coupons received from a plurality of user portable terminals in the distributed-electronic-value accumulation unit 2241 (S2200). At a step S2202, on the other hand, the electronic-value issuing server 2214 stores user's preference information in the preference-information storage unit 2256 (S2202). Then, the electronic-value issuing server 2214 transmits an electronic coupon meeting user's preference identified by a user identifier associated with the user portable terminal 2202 (S2204). At a step S2206, the user portable terminal 2202 receives the electronic coupon (S2206). Then, the user portable terminal 2202 stores the electronic coupon in the electronic-value storage unit 2222 (S2208).

Subsequently, the user carrying the user portable terminal 2202 selects an unneeded electronic coupon from those stored in the electronic-value storage unit 2222 by typically operating, for example, an input unit employed in the user portable terminal 2202 (S2210). Then, the user portable terminal 2202 transmits the electronic coupon selected by the user to the electronic-value distribution apparatus 2204 (S2212). At a step S2214, the electronic-value distribution apparatus 2204 receives the electronic coupon and the user identifier from the user portable terminal 2202 (S2214). Subsequently, the electronic-value distribution apparatus 2204 stores the electronic coupon in the distributed-electronic-value accumulation unit 2241 (S2216). Then, the electronic-value distribution apparatus 2204 extracts electronic coupons each usable as a replacement of the received electronic coupon from the distributed-electronic-value accumulation unit 2241 (S2218). Subsequently, the electronic-value distribution apparatus 2204 lets the user select one of the electronic coupons each usable as a replacement of the received electronic coupon (S2220). Then, the electronic-value distribution apparatus 2204 transmits the electronic coupon selected by the user to the user portable terminal 2202 (S2222). At a step S2224, the user portable terminal 2202 receives the electric coupon desired by the user from the electronic-value distribution apparatus 2204, ending the processing to replace an unneeded electronic coupon with a desired one (S2224).

At a step S2226, the electronic-value distribution apparatus 2204 transmits three pieces of information, i.e, the information on the received electronic coupon, the information on the transmitted electronic coupon, and the user identifier, to the electronic-value issuing server 2214 by associating the three pieces of information with each other (S2226).

At a step S2228, the electronic-value issuing server 2214 receives the user identifier and the two pieces of information on the electronic coupons from the electronic-value distribution apparatus 2204 (S2228). Then, the electronic-value issuing server 2214 updates the preference-information storage unit 2256 on the basis of the user identifier and the information on the electronic coupons (S2230).

The above description has explained processing carried out by the electronic-value distribution apparatus 2204 employed in the electronic-value distribution system 2200 according to the embodiment to replace an electronic coupon with another and to process the distribution information.

By configuring the electronic-value distribution system 2200 according to the second embodiment as described above, the user is capable of replacing an unneeded electronic coupon with a desired one by using the user portable terminal 2202 and the electronic-value distribution apparatus 2204. In addition, the electronic-value distribution apparatus 2204 transmits the user identifier carrying out the operation to replace the unneeded electronic coupon with the desired one, the information on the unneeded coupon, and the information on the desired coupon to the electronic-value issuing server 2214. The electronic-value issuing server 2214 is capable of knowing the replacement of the unneeded electronic coupon with the desired one and grasping the state of distributions of the coupons. Thus, the electronic-value issuing server 2214 is capable of reflecting the state of distributions of the coupons in the preference information, which is referred to in a process to issue an electronic coupon.

In the embodiments described above, electronic coupons are each handled as a typical electronic value. It is to be noted, however, that the electronic value is by no means limited to an electronic coupon. The electronic value can be any information provided by a commodity/service provider to customers as long as the information has a financial value. An example of the electronic value is points given by a commodity/service provider to a customer purchasing a commodity or a service in accordance with the price of a commodity and/or a service as information making the customer entitled to a discount on a commodity or a service in a next shopping activity or allowing the customer to exchange the points with a gift. Another example of the electronic value is points that can be distributed to users or the like and exchanged between the users. It is to be noted that the functions of the electronic-value distribution apparatus, the electronic-value issuing server, and the user portable terminal can each be carried out by execution of a computer program presentable to the user by recording the program on a recording medium, which can be read by a computer. The above explanation has explained electronic-value distribution systems.

The preferred embodiments of the present invention have been described by referring to diagrams. It is needless to say, however, that the scope of the present invention is by no means limited to the preferred embodiments. It is obvious that a person skilled in the art is capable of coming up with a variety of embodiment changes and embodiment corrections within domains defined in the range of claims appended to this patent specification. Nevertheless, such changes and corrections are naturally interpreted as changes and corrections falling within the technological range.

INDUSTRIAL APPLICABILITY

The present invention can be applied to a preference-information gathering system, an information searching apparatus, a user portable terminal, a passed-place-information sender apparatus, and a preference-information gathering apparatus. In particular, the present invention can be applied to for example a preference-information gathering system for gathering information on every commodity/service, which are each inferred to be a commodity/service of interest to a user.

The invention claimed is:

1. A preference-information gathering system for updating user preference profiles, said preference-information gathering system comprising:
   a user portable terminal; and
   a preference-information management server connectable via a communication network to said user portable terminal, the preference-information management server managing said user preference profiles,
   the user portable terminal including
      a commodity/service-identifier inputting unit configured to input an identifier identifying a commodity and/or a service independent of a purchasing process for the commodity and/or service, wherein the purchasing process includes a selection of the commodity and/or service for purchase,
      a commodity/service-identifier storage unit configured to store said commodity/service identifier, and
      a commodity/service-information sender unit configured to transmit said commodity/service identifier and a user identifier, the user identifier identifying said user to said preference-information management server by associating said commodity/service identifier and said user identifier with each other,
   said preference-information management server including
      a preference-information storage unit configured to store said user preference profiles for each of said users, a user preference profile of said user preference profiles including an initial commodity/service identifier,
      a commodity/service-information receiver unit configured to receive said commodity/service identifier and said user identifier from said user portable terminal, and
      a preference-information updating unit configured to generate an updated user-preference profile based on said received commodity/service identifier, said received user identifier, and the respective user preference profile previously stored in the preference-information storage unit, said updating unit configured to generate the updated user-preference profile independently of the initial commodity/service identifier stored in the user preference profile, and said updating unit configured to generate the updated user preference profile by determining characteristics corresponding to said received commodity/service identifier and modifying the user preference profile, previously stored in the preference-information storage unit and selected based on the user identifier, based on the determined characteristics.

2. The preference-information gathering system according to claim 1, wherein the commodity/service identifier inputting unit is configured to input the identifier identifying the commodity and/or service independent of a process which results in a purchase of the commodity and/or service without a re-selection of the commodity and/or service.

3. A user portable terminal connectable by a communication network to a preference-information management server for managing user preference profiles and for updating user preference profiles in said preference-information management server,
   said user portable terminal comprising:
      a commodity/service-identifier inputting unit configured to input an identifier identifying a commodity and/or a service independent of a purchasing process for the commodity and/or service, wherein the purchasing process includes a selection of the commodity and/or service for purchase;
      a commodity/service-identifier storage unit configured to store said commodity/service identifier; and
      a commodity/service-information sender unit configured to transmit said commodity/service identifier and a user identifier identifying said user to said preference-information management server, said commodity/service identifier and said user identifier associated with each other, the preference-information management server storing a user preference profile for a user that includes an initial commodity/service identifier, and generating an updated user-preference profile based on said commodity/service identifier, said user identifier, and the user preference profile previously stored in the preference-information management server, said preference-information management server generating the updated user-preference profile independently of the initial commodity/service identifier stored in the user preference profile, and generating the updated user preference profile by including determining characteristics corresponding to said commodity/service identifier and modifying the user preference profile, previously stored in the preference-information management server and selected based on the user identifier, based on the determined characteristics.

4. A non-transitory computer readable medium having stored thereon a computer program that when executed by a computer of a user portable terminal that is connected by a communication network to a preference-information management server for managing user preference profiles, and for updating user preference profiles in said preference-information management server, causes the computer to execute a method comprising:
   inputting an identifier identifying a commodity and/or a service independent of a purchasing process for the commodity and/or service, wherein the purchasing process includes a selection of the commodity and/or service for purchase;
   storing said commodity/service identifier; and
   transmitting said commodity/service identifier and a user identifier identifying said user to said preference-information management server, said commodity/service identifier and said user identifier associated with each other, the preference-information management server storing a user preference profile for a user that includes an initial commodity/service identifier, and generating an updated user-preference profile based on said commodity/service identifier, said user identifier, and the user preference profile previously stored in the preference-information management server, said preference-information management server generating the updated user-preference profile independently of the initial commodity/service identifier stored in the profile, and generating the updated user preference profile by including determining characteristics corresponding to said commodity/service identifier and modifying the user preference profile, previously stored in the preference-information management server and selected based on the user identifier, based on the determined characteristics.

5. A preference-information updating method for updating user preference profiles, said preference-information updating method implemented using a user portable terminal and a preference-information management server for managing said user preference profiles, the method comprising:

inputting an identifier identifying a commodity and/or a service independent of a purchasing process for the commodity and/or service, wherein the purchasing process includes a selection of the commodity and/or service for purchase;

storing said commodity/service identifier in a commodity/service-identifier storage unit;

transmitting said commodity/service identifier and a user identifier identifying said user to said preference-information management server, said commodity/service identifier and said user identifier associated with each other;

receiving said commodity/service identifier and said user identifier from said user portable terminal;

generating an updated user-preference profile based on said received commodity/service identifier, said received user identifier, and a user preference profile that includes an initial commodity/service identifier and that is previously stored in the preference-information management server, said generating said user preference profile independently of the initial commodity/service identifier stored in the profile and said generating the updated user preference profile by including determining characteristics corresponding to said received commodity/service identifier and modifying the user preference profile, previously stored in the preference-information management server and selected based on the user identifier, based on the determined characteristics.

6. The preference-information updating method according to claim 5, wherein said identifier identifying a commodity and/or a service is included in either a two-dimensional barcode or an IC tag.

7. The preference-information updating method according to claim 5, wherein said user-preference profile includes categories of commodity/service.

8. The preference-information updating method according to claim 5, wherein said user-preference profile includes places of business.

9. The preference-information updating method according to claim 5, further comprising:

recommending a commodity or service based on the updated user-preference profile.

* * * * *

UNITED STATES PATENT AND TRADEMARK OFFICE
CERTIFICATE OF CORRECTION

| | |
|---|---|
| PATENT NO. | : 8,612,309 B2 |
| APPLICATION NO. | : 11/547254 |
| DATED | : December 17, 2013 |
| INVENTOR(S) | : Kimiko Tsurumaki et al. |

Page 1 of 1

It is certified that error appears in the above-identified patent and that said Letters Patent is hereby corrected as shown below:

On the title page, Item (30), the Foreign Application Priority Data Information has been omitted. Item (30) should read:

--(30)    Foreign Application Priority Data

| | | |
|---|---|---|
| Apr. 9, 2004 | (JP) | 2004-115638 |
| Apr. 9, 2004 | (JP) | 2004-115653 |
| Apr. 13, 2004 | (JP) | 2004-117481-- |

Signed and Sealed this
First Day of April, 2014

Michelle K. Lee
*Deputy Director of the United States Patent and Trademark Office*